US012096013B2

United States Patent
Zhang et al.

(10) Patent No.: US 12,096,013 B2
(45) Date of Patent: Sep. 17, 2024

(54) SIGNALING FOR TRANSFORM SKIP MODE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/172,484

(22) Filed: Feb. 22, 2023

(65) Prior Publication Data

US 2023/0209072 A1    Jun. 29, 2023

Related U.S. Application Data

(63) Continuation of application No. 17/675,796, filed on Feb. 18, 2022, now Pat. No. 11,595,671, which is a
(Continued)

(30) Foreign Application Priority Data

Aug. 20, 2019   (WO) ................ PCT/CN2019/101555

(51) Int. Cl.
*H04N 19/33*     (2014.01)
*H04N 19/11*     (2014.01)
(Continued)

(52) U.S. Cl.
CPC ............. *H04N 19/33* (2014.11); *H04N 19/12* (2014.11); *H04N 19/124* (2014.11);
(Continued)

(58) Field of Classification Search
CPC ...... H04N 19/33; H04N 19/12; H04N 19/124; H04N 19/136; H04N 19/157;
(Continued)

(56) References Cited

U.S. PATENT DOCUMENTS 9,900,593 B2    2/2018   Xiu
10,057,594 B2   8/2018   Xiu
(Continued)

FOREIGN PATENT DOCUMENTS

CN    103404141 A    11/2013
CN    103796015 A     5/2014
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Joseph Suh
(74) *Attorney, Agent, or Firm* — Conley Rose, P.C.

(57) ABSTRACT

A video processing method includes performing a conversion between a video block of a video and a coded representation of the video. The coded representation conforms to a format rule. The format rule specifies that applicability of a transform skip mode to the video block is determined by a coding condition of the video block. The format rule also specifies that a syntax element indicative of applicability of the transform skip mode is omitted from the coded representation. The transform skip mode includes skipping applying a forward transform to at least some coefficients prior to encoding into the coded representation, or during decoding, skipping applying an inverse transform to at least some coefficients prior to decoding from the coded representation.

19 Claims, 27 Drawing Sheets

Related U.S. Application Data continuation of application No. PCT/CN2020/110260, filed on Aug. 20, 2020.

(51) Int. Cl.
*H04N 19/12* (2014.01)
*H04N 19/124* (2014.01)
*H04N 19/136* (2014.01)
*H04N 19/157* (2014.01)
*H04N 19/159* (2014.01)
*H04N 19/167* (2014.01)
*H04N 19/176* (2014.01)
*H04N 19/18* (2014.01)
*H04N 19/30* (2014.01)
*H04N 19/50* (2014.01)
*H04N 19/61* (2014.01)
*H04N 19/70* (2014.01)

(52) U.S. Cl.
CPC ......... *H04N 19/136* (2014.11); *H04N 19/157* (2014.11); *H04N 19/159* (2014.11); *H04N 19/167* (2014.11); *H04N 19/176* (2014.11); *H04N 19/18* (2014.11); *H04N 19/30* (2014.11); *H04N 19/50* (2014.11); *H04N 19/61* (2014.11); *H04N 19/70* (2014.11); *H04N 19/11* (2014.11)

(58) Field of Classification Search
CPC ............... H04N 19/159; H04N 19/167; H04N 19/176; H04N 19/18; H04N 19/30; H04N 19/50; H04N 19/61; H04N 19/70; H04N 19/11; H04N 19/172; H04N 19/174; H04N 19/109; H04N 19/132
See application file for complete search history.

(56) References Cited

U.S. PATENT DOCUMENTS

| | | | |
|---|---|---|---|
| 10,116,937 B2 | 10/2018 | Li | |
| 10,200,700 B2 | 2/2019 | Zhang | |
| 10,277,910 B2 | 4/2019 | Xiu | |
| 10,382,778 B2 | 8/2019 | Huang | |
| 10,404,988 B2 | 9/2019 | Ye | |
| 10,469,847 B2 | 11/2019 | Xiu | |
| 10,477,214 B2 | 11/2019 | Zhang | |
| 10,567,769 B2 | 2/2020 | Li | |
| 11,172,216 B1 | 11/2021 | Zhang | |
| 11,206,406 B1 | 12/2021 | Zhang | |
| 2010/0091842 A1 | 4/2010 | Ikeda | |
| 2010/0239006 A1 | 9/2010 | Ng | |
| 2010/0329329 A1 | 12/2010 | Reznik | |
| 2013/0170555 A1 | 7/2013 | Zhang | |
| 2013/0177084 A1 | 7/2013 | Wang | |
| 2013/0294524 A1 | 11/2013 | Van der Auwera | |
| 2013/0336395 A1 | 12/2013 | Joshi | |
| 2014/0086311 A1 | 3/2014 | Lou | |
| 2014/0254661 A1 | 9/2014 | Saxena | |
| 2014/0369408 A1 | 12/2014 | Tanaka | |
| 2015/0043637 A1 | 2/2015 | Morigami | |
| 2015/0078442 A1 | 3/2015 | Lim | |
| 2015/0189289 A1 | 7/2015 | Kim | |
| 2015/0264403 A1 | 9/2015 | Chong | |
| 2016/0014412 A1 | 1/2016 | Hinz | |
| 2016/0088302 A1 | 3/2016 | Zheng | |
| 2017/0280163 A1* | 9/2017 | Kao | H04N 19/70 |
| 2018/0014017 A1 | 1/2018 | Li | |
| 2018/0131952 A1 | 5/2018 | Xiu | |
| 2018/0278958 A1 | 9/2018 | Hsiang | |
| 2018/0343463 A1 | 11/2018 | Xiu | |
| 2018/0352226 A1 | 12/2018 | An | |
| 2019/0098301 A1* | 3/2019 | Lee | H04N 19/114 |
| 2019/0191185 A1 | 6/2019 | Ehmann | |
| 2019/0246142 A1 | 8/2019 | Zhao | |
| 2020/0154127 A1* | 5/2020 | Lee | H04N 19/513 |
| 2020/0169732 A1 | 5/2020 | Li | |
| 2020/0374523 A1* | 11/2020 | Thirumalai | H04N 19/112 |
| 2021/0021856 A1 | 1/2021 | Zheng | |
| 2021/0021865 A1 | 1/2021 | Zheng | |
| 2021/0105463 A1 | 4/2021 | Zhang | |
| 2021/0120233 A1 | 4/2021 | Zhang | |
| 2021/0120257 A1 | 4/2021 | Xiu | |
| 2021/0168366 A1 | 6/2021 | Li | |
| 2021/0194563 A1 | 6/2021 | Zhang | |
| 2021/0227252 A1 | 7/2021 | Zheng | |
| 2021/0227254 A1 | 7/2021 | Zheng | |
| 2021/0321140 A1 | 10/2021 | Zhang | |
| 2021/0352309 A1 | 11/2021 | Liu | |
| 2021/0385439 A1 | 12/2021 | Zhu | |
| 2021/0385469 A1 | 12/2021 | Deng | |
| 2021/0385500 A1 | 12/2021 | Zhang | |
| 2021/0392324 A1 | 12/2021 | Wang | |
| 2021/0392351 A1 | 12/2021 | Deng | |
| 2021/0392381 A1 | 12/2021 | Wang | |
| 2021/0400310 A1 | 12/2021 | Zhang | |
| 2022/0007057 A1 | 1/2022 | Liu | |
| 2022/0174280 A1 | 6/2022 | Zhang | |
| 2022/0174298 A1 | 6/2022 | Zhang | |
| 2022/0174299 A1 | 6/2022 | Zhang | |

FOREIGN PATENT DOCUMENTS

| | | |
|---|---|---|
| CN | 104185990 | 12/2014 |
| CN | 104521232 A | 4/2015 |
| CN | 106105206 A | 11/2016 |
| CN | 107925773 A | 4/2018 |
| CN | 109076226 A | 12/2018 |
| CN | 109417621 A | 3/2019 |
| CN | 109644269 A | 4/2019 |
| CN | 109661820 A | 4/2019 |
| CN | 114270817 B | 7/2024 |
| EP | 3644606 A1 | 4/2020 |
| GB | 2587982 A | 4/2021 |
| IN | 201747007972 | 9/2017 |
| KR | 20150129715 A | 11/2015 |
| KR | 20190013380 A | 2/2019 |
| WO | 2012142792 A1 | 10/2012 |
| WO | 2013003741 A1 | 1/2013 |
| WO | 2013109127 A1 | 7/2013 |
| WO | 2017195666 A1 | 11/2017 |
| WO | 2018038554 A1 | 3/2018 |
| WO | 2018067051 A1 | 4/2018 |
| WO | 2018142903 A1 | 8/2018 |
| WO | 2019022099 A1 | 1/2019 |
| WO | 2019230670 A1 | 12/2019 |
| WO | 2020167905 A1 | 8/2020 |
| WO | 2020218564 A1 | 10/2020 |
| WO | 2020247518 A1 | 12/2020 |
| WO | 2021006632 A1 | 1/2021 |

OTHER PUBLICATIONS https://vcgit.hhi.fraunhofer.de/jvet/VVCSoftware_VTM/tags/VTM-4.0, May 11, 2022.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.
Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.
Chubach et al. "CE7-related: Support of Quantization Matrices for VVC," Joint Video Experts Team (JVET) of ITU-T SG 16 WP 3 and ISO/IEC JTC 1/SC 29/1/VG 11 14th Meeting: Geneva, CH, Mar. 19-27, 2019, document JVET-N0847, 2009.
Said et al. "CE5: Per-Context CABAC Initialization with Single Window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0413, 2019.

(56) References Cited

OTHER PUBLICATIONS

"Information Technology—High Efficiency Coding and Media Delivery in Heterogeneous Environments—Part 2: High Efficiency Video Coding" Apr. 20, 2018, ISO/DIS 23008, 4th Edition.

Chen et al. "Algorithm Description of Joint Exploration Test Model 7 (JEM 7)," Joint Video Exploration Team (JVET) of ITU-T SG 16 WP 3 and 1SO/IEC JTC 1/SC 29/WG 11, 7th Meeting: Torino, IT, Jul. 13-21, 2017, document JVET-G1001, 2017.

Karczewicz et al. "Geometry Transformation-based Adaptive In-Loop Filter," 2016 IEEE, Picture Coding Symposium (PCS), 2016.

Jang et al. "Signaling for Primary Transform and Transform Skip," Joint Video Exploration Team (JVET) of ITU-T SG 16 WP 3 and ISO/IEC JTC 1/SC 29/WG 11 5th Meeting: Geneva, CH, Jan. 12-20, 2017, document JVET-E0037, 2017.

Paluri et al. "AHG17: APS Support for Default and User Defined Scaling Matrices," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0299, 2019.

Toma et al. "AHG10: Quantization Matrices for MTS," Joint Video Exploration Team (JVET) of ITU-T SG 16 WP 3 and ISO/IEC JTC 1/SC 29/WG 11 13th Meeting: Marrakesh, MA, Jan. 9-18, 2019, document JVET-M0083, 2019.

Karczewicz, M., et al., "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Tomonori et al. "Non-CE7: Harmonization of Scaling Matrix and LFNST," Joint Video Experts Team (JVET)of ITU-T SG 16 WP 3 and ISO/IEC JTC 1/SC 29/WG 11 15th Meeting: Gothenburg, SE, Jul. 3-12, 2019, document JVET-O0383, 2019.

Chubach, O., et al., "CE7-Related: Support of Signalling Default and User-Defined Scaling Matrices," Joint Video Experts Team (JVET) of ITU-T SG 16 WP 3 and ISO/IEC JTC 1/SC 29/WG 11 14th Meeting: Geneva, CH, Mar. 19-27, 2019, document JVET-M0090, 2019.

Sarwer et al. "Non-CE7: Simplification of Transform Skip Residual Coding," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET O0619, 2019.

Tsukuba et al. "CE8: Chroma Transform Skip (CE8-3.2)," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0081, 2019.

Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.

JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 33 pages.

Document: JVET-O0267-v1, Chubach, O., et al., "AHG15: Clean-ups for scaling matrices," Joint Video Experts Team (JVET) of ITU-T SG 16 WP 3 and ISO/IEC JTC 1/SC 29/WG 11JVET-O0267-v115th Meeting: Gothenburg, SE, Jul. 3-12, 2019, 4 pages.

Document: JVET-O0206-v1, Yoo, S., et al., "CE8-related : Unified condition between BDPCM and transform skip," Joint Video Experts Team (JVET) of ITU-T SG 16 WP 3 and ISO/IEC JTC 1/SC 29/WG 11 15th Meeting: Gothenburg, SE, Jul. 3-12, 2019, 2 pages.

Extended European Search Report from European Patent Application No. 20856499.4 dated Sep. 22, 2022 (11 pages).

Examination Report from Indian Patent Application No. 202247004099 dated Jun. 23, 2022 (7 pages).

Non-Final Office Action from U.S. Appl. No. 17/675,843 dated Jun. 10, 2022.

Notice of Allowance from U.S. Appl. No. 17/675,880 dated Aug. 17, 2022.

International Search Report and Written Opinion from International Patent Application No. PCT/CN2020/110229 dated Nov. 23, 2020 (11 pages).

International Search Report and Written Opinion from International Patent Application No. PCT/CN2020/110260 dated Nov. 24, 2020 (9 pages).

International Search Report and Written Opinion from International Patent Application No. PCT/CN2020/110275 dated Nov. 25, 2020 (9 pages).

Non-Final Office Action from U.S. Appl. No. 17/675,880 dated Apr. 25, 2022.

Non-Final Office Action from U.S. Appl. No. 17/675,796 dated Jun. 27, 2022.

Extended European Search Report from European Application No. 20855686.0 dated Feb. 14, 2023.

Document: JVET-O2001-vD, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 474 pages.

Chinese Notice of Allowance from Chinese Patent Application No. 202080059166.4 dated Apr. 17, 2024, 7 pages. With English Translation.

Document: JVET-N0847-v1, Chubach, O., et al., "CE7-related : Support of quantization matrices for VVC," Joint Video Experts Team (JVET) of ITU-T SG 16 WP 3 and ISO/IEC JTC 1/SC 29/WG 11 14tn Meeting: Geneva, CH Mar. 19-27, 2017, 4 pages.

Chinese Office Action from Chinese Patent Application No. 202080059117.0 dated Jun. 27, 2024, 16 pages.

* cited by examiner

SIGNALING FOR TRANSFORM SKIP MODE

CROSS REFERENCE TO RELATED APPLICATIONS

This application is a continuation of U.S. application Ser. No. 17/675,796, filed on Feb. 18, 2022, which is a continuation of International Patent Application No. PCT/CN2020/110260, filed on Aug. 20, 2020, which claims the priority to and benefits of International Patent Application No. PCT/CN2019/101555, filed on Aug. 20, 2019. All the aforementioned patent applications are hereby incorporated by reference in their entireties.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video coding and decoding that use scaling matrices and/or transform matrices.

In an example aspect, a method of video processing is disclosed. The method includes performing a conversion between a video block of a video and a coded representation of the video, wherein the coded representation conforms to a format rule, wherein the format rule specifies that applicability of a transform skip mode to the video block is determined by a coding condition of the video block, wherein the format rule specifies that a syntax element indicative of applicability of the transform skip mode is omitted from the coded representation, and wherein the transform skip mode includes, skipping applying a forward transform to at least some coefficients prior to encoding into the coded representation, or during decoding, skipping applying an inverse transform to at least some coefficients prior to decoding from the coded representation.

In another example aspect, a method of video processing is disclosed. The method includes comprises determining, for a conversion between two adjacent video blocks of a video and a coded representation of the video, whether an in-loop filter or a post-reconstruction filter is to be used for the conversion depending on whether a forward transform or an inverse transform is used for the conversion, wherein the forward transform includes, skipping applying the forward transform to at least some coefficients prior to encoding into the coded representation, or during decoding, skipping applying the inverse transform to at least some coefficients prior to decoding from the coded representation; and performing the conversion based on the use of the in-loop filter or the post-reconstruction filter.

In another example aspect, a method of video processing is disclosed. The method includes determining, for a conversion between a video block of a video and a coded representation of the video, factors of a scaling tool based on a coding mode of the video block; and performing the conversion using the scaling tool, wherein the use of the scaling tool comprises: scaling at least some coefficients representing the video block during encoding or descaling at least some coefficients from the coded representation during decoding.

In another example aspect, a method of video processing is disclosed. The method includes determining, for a conversion between a video block of a video and a coded representation of the video, to disable use of a scaling tool due to a block differential pulse code modulation (BDPCM) coding tool or a quantized residual BDPCM (QR-BDPCM) coding tool for the conversion of the video block; and performing the conversion without using the scaling tool, wherein the use of the scaling tool comprises: scaling at least some coefficients representing the video block during encoding or descaling at least some coefficients from the coded representation during decoding.

In another example aspect, a method of video processing is disclosed. The method includes selecting, for a conversion between video blocks of a video and a coded representation of the video, scaling matrices based on a transform matrix selected for the conversion, wherein the scaling matrices are used to scale at least some coefficients of the video blocks, and wherein the transform matrices are used to transform the at least some coefficients of the video blocks during the conversion; and performing the conversion using the scaling matrices.

In another example aspect, a method of video processing is disclosed. The method includes determining, according to a rule, whether to apply a scaling matrix based on whether a secondary transform matrix is applied to a portion of a video block of a video, wherein the scaling matrix is used to scale at least some coefficients of the video block, and wherein the secondary transform matrix is used to transform at least some residual coefficients of the portion of the video block during the conversion; and performing a conversion between the video block of the video and a bitstream representation of the video using the selected scaling matrix.

In another example aspect, a method of video processing is disclosed. The method includes determining, for a video block that has a non-square shape, a scaling matrix for use in a conversion between the video block of a video and a coded representation of the video, wherein a syntax element in the coded representation signals the scaling matrix, and wherein the scaling matrix is used to scale at least some coefficients of the video blocks during the conversion; and performing the conversion based on the scaling matrix.

In another example aspect, a method of video processing is disclosed. The method includes performing a conversion between a video block of a video and a coded representation of the video, wherein the video block comprises a first number of positions at which a scaling matrix is applied during the conversion and a second number of positions at which the scaling matrix is not applied during the conversion based on a rule.

In another example aspect, a method of video processing is disclosed. The method includes determining that a scaling matrix is to be applied during a conversion between a video block of a video and a coded representation of the video; and performing the conversion based on the scaling matrix, wherein the coded representation indicates a number of elements of the scaling matrix, and wherein the number depends on whether coefficient zeroing out is applied to coefficients of the video block.

In another example aspect, a method of video processing is disclosed. The method includes performing a conversion between a video block of a video and a coded representation of the video according to a rule, wherein the video block is represented in the coded representation after zeroing out all but top-left M×N transform coefficients after applying a K×L transform matrix to transform coefficients of the video block, wherein the coded representation is configured to exclude signaling of elements of a scaling matrix at positions corresponding to the zeroing out, wherein the scaling matrix is used for scaling the transform coefficients.

In another example aspect, a method of video processing is disclosed. The method includes determining, during a conversion between a video block of a video and a coded representation of the video, based on a rule whether a single quantization matrix is to be used based on a size of the video block, wherein all video blocks having the size use the single quantization matrix; and performing the conversion using the quantization matrix.

In another example aspect, a method of video processing is disclosed. The method includes determining, for a conversion between a coded representation of a video block of a video and the video block, based on a coded mode information, whether a transform skip mode is enabled for the conversion; and performing the conversion based on the determining; wherein, in the transform skip mode, application of a transform to at least some coefficients representing the video block is skipped during the conversion.

In another example aspect, another method of video processing is disclosed. The method includes determining to use a scaling matrix for a conversion between a coded representation of a video block and the video block due to a use of a block differential pulse code modulation (BDPCM) or a quantized residual BDPCM (QR-BDPCM) mode for the conversion; and performing the conversion using the scaling matrix; wherein the scaling matrix is used to scale at least some coefficients representing the video block during the conversion.

In another example aspect, another method of video processing is disclosed. The method includes determining to disable use of a scaling matrix for a conversion between a coded representation of a video block and the video block due to a use of a block differential pulse code modulation (BDPCM) or a quantized residual BDPCM (QR-BDPCM) mode for the conversion; and performing the conversion using the scaling matrix; wherein the scaling matrix is used to scale at least some coefficients representing the video block during the conversion.

In another example aspect, another method of video processing is disclosed. The method includes determining, for a conversion between a coded representation of a video block of a video and the video block, an applicability of an in-loop filter depending on whether a transform skip mode is enabled for the conversion; and performing the conversion based on the applicability of the in-loop filter; wherein, in the transform skip mode, application of a transform to at least some coefficients representing the video block is skipped during the conversion.

In another example aspect, another method of video processing is disclosed. The method includes selecting a scaling matrix for a conversion between video blocks of a video and a coded representation of the video blocks such that a same scaling matrix is selected for inter coding and intra block copy coding based conversion, and performing the conversion using the selected scaling matrix, wherein the scaling matrix is used to scale at least some coefficients of the video blocks.

In another example aspect, another method of video processing is disclosed. The method includes selecting a scaling matrix for a conversion between video blocks of a video and a coded representation of the video blocks based on a transform matrix selected for the conversion, and performing the conversion using the selected scaling matrix, wherein the scaling matrix is used to scale at least some coefficients of the video blocks and wherein the transform matrix is used to transform at least some coefficients of the video block during the conversion.

In another example aspect, another method of video processing is disclosed. The method includes selecting a scaling matrix for a conversion between video blocks of a video and a coded representation of the video blocks based on a secondary transform matrix selected for the conversion, and performing the conversion using the selected scaling matrix, wherein the scaling matrix is used to scale at least some coefficients of the video blocks and wherein the secondary transform matrix is used to transform at least some residual coefficients of the video block during the conversion.

In another example aspect, another method of video processing is disclosed. The method includes determining, for a video block that has a non-square shape, a scaling matrix for use in a conversion between the video block and a coded representation of the video block, wherein a syntax element in the coded representation signals the scaling matrix; and performing the conversion based on the scaling matrix, wherein the scaling matrix is used to scale at least some coefficients of the video blocks during the conversion.

In another example aspect, another method of video processing is disclosed. The method includes determining that a scaling matrix is to be applied partially during a conversion between a coded representation of a video block and the video block; and performing the conversion based by partially applying the scaling matrix such that the scaling matrix is applied in a first set of positions and disabled at remaining positions in the video block.

In another example aspect, another method of video processing is disclosed. The method includes determining that a scaling matrix is to be applied during a conversion between a coded representation of a video block and the video block; and performing the conversion based on the scaling matrix; wherein the coded representation signals a number of elements of the scaling matrix, wherein the number depends on application of coefficient zeroing out in the conversion.

In another example aspect, another method of video processing is disclosed. The method includes determining, during a conversion between a video block and a coded representation of the video block, a single quantization matrix to use based on a size of the video block being of a specific type; and performing the conversion using the quantization matrix.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
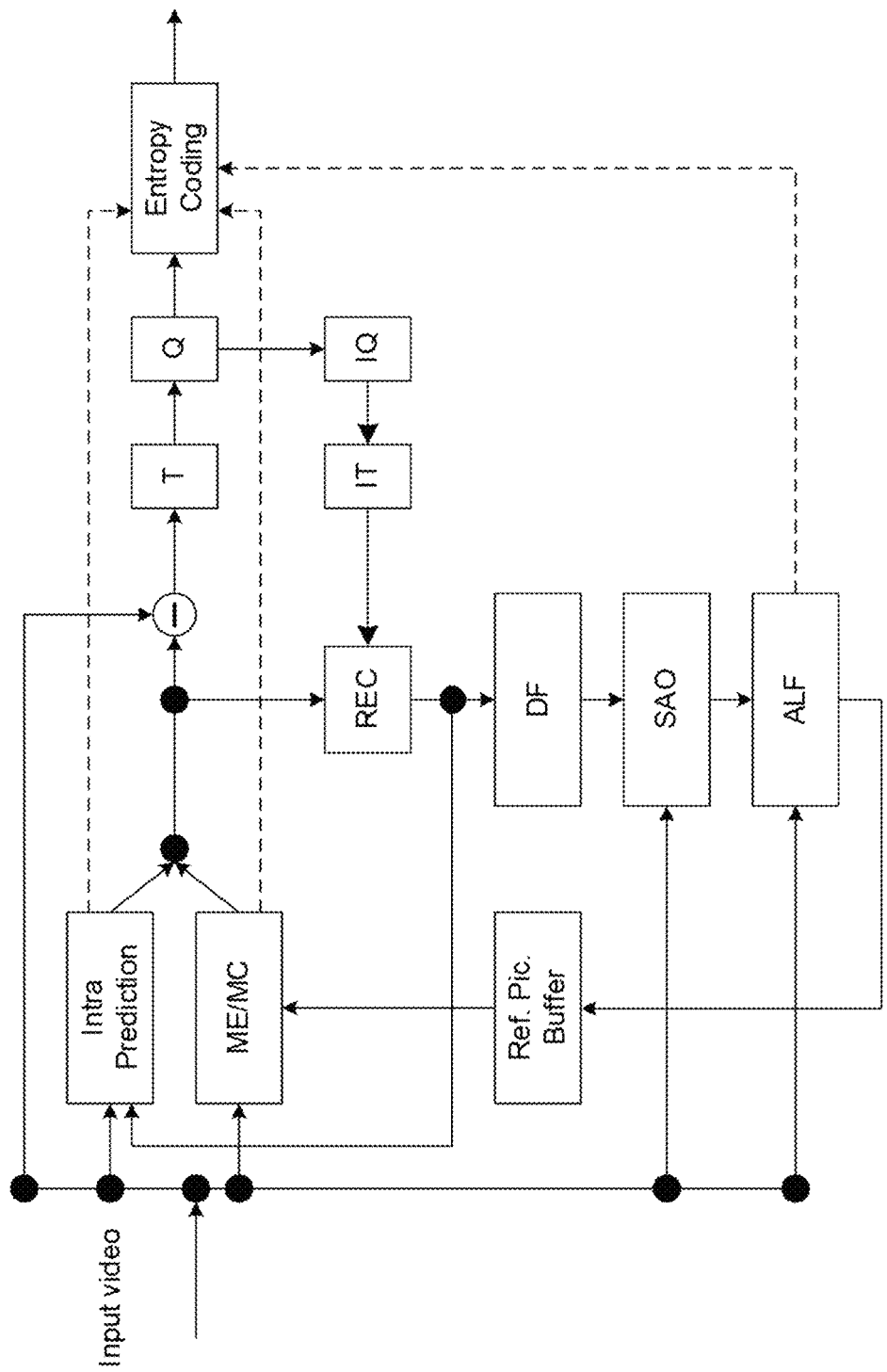
FIG. 1 is a block diagram of an example video encoder implementation.

Embodiments of the disclosed technology may be applied to existing video coding standards (e.g., high efficiency video coding (HEVC), H.265) and future standards to improve compression performance. Section headings are used in the present disclosure to improve readability of the description and do not in any way limit the discussion or the embodiments (and/or implementations) to the respective sections only.

1. Summary

This disclosure is related to image/video coding technologies. Specifically, it is related to quantization matrix in image/video coding. It may be applied to the existing video coding standard like HEVC, or the standard Versatile Video Coding (VVC) to be finalized. It may be also applicable to future video coding standards or video codec.

2. Background

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 5) could be found at:

http://phenix.it-sudparis.eu/jvet/doc_end_user/current_document.php?id=6640

The latest reference software of VVC, named VTM, could be found at:

https://vcgit.hhi.fraunhofer.de/jvet/VVCSoftware_VTM/tags/VTM-4.0

2.1. Color Space and Chroma Subsampling

Color space, also known as the color model (or color system), is an abstract mathematical model which simply describes the range of colors as tuples of numbers, typically as 3 or 4 values or color components (e.g., red green blue, RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference 2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In Joint. Photographic Experts Group (JPEG)/JPEG File Interchange Format (JFIF), H.261, and MPEG-1, Cb and Cr are sited interstitially, halfway between alternate luma samples, In 4:2:0 DV, Cb and Cr are co-sited in the horizontal direction. In the vertical direction, they are co-sited on alternating lines, 2.2. Coding Flow of a Typical Video Codec FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3. Quantization Matrix

The well-known spatial frequency sensitivity of the human visual system (HVS), has been a key driver behind many aspects of the design of modern image and video coding algorithms and standards including JPEG, MPEG2, H.264/AVC High Profile and the HEVC.

The quantization matrix used in MPEG2 is an 8×8 matrix. In H.264/AVC, the quantization matrix block size includes both 4×4 and 8×8. These QMs are encoded in sequence parameter set (SPS) and picture parameters set (PPS). The compressed method in H.264/AVC for QM signalling is Differential Pulse Code Modulation (DPCM).

In H.264/AVC High Profile, 4×4 block size and 8×8 block size are used. Six QMs for 4×4 block size (i.e., separate matrix for intra/inter coding and Y/Cb/Cr components) and two QMs for 8×8 block size (i.e., separate matrix for intra/inter Y component), so only eight quantization matrices need to be encoded into bitstream.

2.4. Transform and Quantization Design in WC 2.4.1. Transform

HEVC specifies two-dimensional transforms of various sizes from 4×4 to 32×32 that are finite precision approximations to the discrete cosine transform (DCT). In addition, HEVC also specifies an alternate 4×4 integer transform based on the discrete sine transform (DST) for use with 4×4 luma Intra prediction residual blocks. In addition to that, when certain block sizes, transform skip may be also allowed.

The transform matrices cij (i, j=0 . . . nS−1) for nS=4, 8, 16, and 32, DCT-II are defined as follows:

```
nS = 4
{64, 64, 64, 64}
{83, 36, −36, −83}
{64, −64, −64, 64}
{36, −83, 83, −36}
nS = 8
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}
nS = 16
{64 64 64 64 64 64 64 64 64 64 64 64 64 64 64 64}
{90 87 80 70 57 43 25 9 −9 −25 −43 57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36− 36 −83 −83 −36 36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 −89 75 −50 18}
{ 9 −25 43 −57 70 −80 87 −90 90 −87 80 −70 57 −43 25 −9}
nS = 32
{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 −43 −57 −70 −80 −87 −90 −90 −87 −80 −70 −57 −43 −25 −9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90}
{89 75 50 18 −18 −50 −75 −89 −89 −75 −50 −18 18 50 75 89 89 75 50 18 −18 −50 −75 −89 −89 −75 −50 −18 18 50 75 89}
{88 67 31 −13 −54 −82 −90 −78 −46 −4 38 73 90 85 61 22 −22 −61− 85 −90 −73 −38 4 46 78 90 82 54 13 −31 −67 −88}
{87 57 9 −43 −80−90−70 −25 25 70 90 80 43 −9 −57 −87 −87 −57 −9 43 80 90 70 25 −25 −70 −90 −80 −43 9 57 87}
{85 46 −13 −67 −90 −73 −22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 − 80 −9 70 87 25 −57 −90 −43 43 90 57 −25 −87 −70 9 80}
{78 −4 −82 −73 13 85 67 −22 −88 −61 31 90 54 −38− 90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18−89−50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31 −73}
{70 −43 −87 9 90 25 −80 −57 57 80 −25 −90 −9 87 43 −70 −70 43 87 −9 −90 −25 80 57 −57 − 80 25 90 9−87 −43 70}
{67 −54 −78 38 85 −22 −90 4 90 13−88−31 82 46 −73 −61 61 73−46−82 31 88−13−90 −4 90 22 −85 −38 78 54 −67}
{64 −64 −64 64 64 −64 −64 64 64 −64 −64 64 64 −64−64−64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
```

-continued

```
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}
{43 −90 57 25 −87 70 9 −80 80 −9 −70 87 −25 −57 90 −43 −43 90 −57 −25 87 −70 −9 80 −80 9 70 −87 25 57 −90 43}
{38 −88 73 −4 −67 90 −46 −31 85 −78 13 61 −90 54 22 −82 82 −22 −54 90 −61 −13 78 −85 31 46−90 67 4 −73 88 −38}
{36 −83 83 −36 −36 83 −83 36 36 −83 83 −36 −36 83 −83 36 36 −83 83 −36 −36 83 −83 36 36 −83 83 −36 −36 83 −83 36}
{31 −78 90 −61 4 54 −88 82 −38 −22 73 −90 67 −13 −46 85 −85 46 13 −67 90 −73 22 38 −82 88 −54 −4 61 −90 78 −31}
{25 −70 90 −80 43 9 −57 87 −87 57 −9 −43 80 −90 70 −25 −25 70 −90 80 −43 −9 57 −87 87 −57 9 43−80 90−70 25}
{22 −61 85 −90 73 −38 −4 46 −78 90 −82 54 −13 −31 67 −88 88 −67 31 13 −54 82 −90 78 −46 4 38 −73 90 −85 61 −22}
{18 −50 75 −89 89 −75 50 −18 −18 50 −75 89 −89 75 −50 18 18 −50 75 −89 89 −75 50 −18 −18 50 −75 89 −89 75 −50 18}
{13 −38 61 −78 88 −90 85 −73 54 −31 4 22 −46 67 −82 90 −90 82 −67 46 −22 −4 31 −54 73 −85 90 −88 78 −61 38 −13}
{9 −25 43 −57 70 −80 87 −90 90 −87 80 −70 57 −43 25 −9 −9 25 −43 57 −70 80 −87 90 −90 87 −80 70 −57 43 −25 9}
{4 −13 22 −31 38 −46 54 −61 67 −73 78 −82 85 −88 90 −90 90 −90 88 −85 82 −78 73 −67 61 −54 46 −38 31 −22 13 −4}
```

2.4.2. Quantization

The HEVC quantizer design is similar to that of H.264/AVC where a quantization parameter (QP) in the range of 0-51 (for 8-bit video sequences) is mapped to a quantizer step size that doubles each time the QP value increases by 6. A key difference, however, is that the transform basis norm correction factors incorporated into the descaling matrices of H.264/AVC are no longer needed in HEVC simplifying the quantizer design. A QP value can be transmitted (in the form of delta QP) for a quantization group as small as 8×8 samples for rate control and perceptual quantization purposes. The QP predictor used for calculating the delta QP uses a combination of left, above and previous QP values. HEVC also supports frequency-dependent quantization by using quantization matrices for all transform block sizes. Details will be described in section 2.4.3.

The quantized transform coefficients $q_{ij}$ (i, j=0 ... nS−1) are derived from the transform coefficients $d_{ij}$ (i, j=0 ... nS−1) as:

$$q_{ij}=(d_{ij}*f[QP \% 6]+\text{offset})>>(29+QP/6-nS-\text{Bit-Depth}), \text{ with } i,j=0,\ldots,nS-1$$

where $$f[x]=\{26214,23302,20560,18396,16384,14564\}, x=0,\ldots,5$$

$$2^{28+QP/6-nS-BitDepth}<\text{offset}<2^{29+QP/6-nS-BitDepth}$$

QP represents the quantization parameter for one transform unit, and BitDepth represents the bit depth associated with the current color component.

In HEVC, the range of QP is [0, 51].

2.4.3. Quantization Matrix

Quantization matrix (QM) has been adopted in image coding standards such as JPEG and JPEG-2000, as well as in video standards such as MPEG2, MPEG4 and H.264/AVC. QM can improve the subjective quality through frequency weighting on different frequency coefficients. In the HEVC standard, the quantization block sizes can go up to 32×32. QMs with the size of 4×4, 8×8, 16×16, 32×32 could be encoded in the bitstream. For each block size, intra/inter prediction types and Y/Cb/Cr color components need different quantization matrix. In total 24 quantization matrices (separate matrices for 4×4, 8×8, 16×16 and 32×32 four block sizes, intra/inter and Y, U, V components) should be encoded.

The parameters for a quantization matrix may be directly copied from a reference quantization matrix or may be explicitly signaled. When they are explicitly signaled, the first parameter (a.k.a., value of the (0,0) component of the matrix) is directly coded. And the remaining parameters are coded with predictive coding according to the raster scan of the matrix.

Encoding and signalling of scaling matrices in HEVC implies three modes: OFF, DEFAULT, and USER DEFINED. It is noted that: for transform unit sizes larger than 8×8 (i.e., 16×16, 32×32), the scaling matrix is obtained from the 8×8 scaling matrix by upsampling to a bigger size (duplication of elements). An additional direct current (DC) value has to be signalled for scaling matrices of transform blocks (TBs) bigger than 8×8.

The maximum number of coded values for one scaling matrix in HEVC is equal to 64.

The DC value for DEFAULT mode is equal to 16 for all TB sizes.

2.4.3.1. Syntax and Semantics 7.3.2.2 Sequence Parameter Set RBSP Syntax 7.3.2.2.1 General Sequence Parameter Set RBSP Syntax

| seq_parameter_set_rbsp( ) { | Descriptor |
|---|---|
| sps_video_parameter_set_id | u(4) |
| ... | |
| max_transform_hierarchy_depth_intra | ue(v) |
| scaling_list_enabled_flag | u(1) |
| if( scaling_list_enabled_flag ) { | |
| sps_scaling_list_data_present_flag | u(1) |
| if( sps_scaling_list_data_present_flag ) | |
| scaling_list_data( ) | |
| } | |
| amp_enabled_flag | u(1) |
| ... | |
| rbsp_trailing_bits( ) | |
| } | |

7.3.2.3 Picture Parameter Set RBSP Syntax 7.3.2.3.1 General Picture Parameter Set RBSP Syntax

| pic_parameter_set_rbsp( ) { | Descriptor |
|---|---|
| pps_pic_parameter_set_id | ue(v) |
| ... | |
| if( deblocking_filter_control_present_flag ) { | |
| ... | |
| } | |
| pps_scaling_list_data_present flag | u(1) |
| if( pps_scaling_list_data_present_flag ) | |
| scaling_list_data( ) | |
| lists_modification_present_flag | u(1) |
| ... | |
| rbsp_trailing_bits( ) | |
| } | |

7.3.4 Scaling List Data Syntax

| scaling_list_data( ) { | Descriptor |
|---|---|
|   for( sizeId = 0; sizeId < 4; sizeId++ ) | |
|     for( matrixId = 0; matrixId < 6; matrixId += ( sizeId = = 3) ? 3:1) { | |
|       scaling_list_pred_mode_flag[ sizeId ][ matrixId ] | u(1) |
|       if( !scaling_list_pred_mode_flag[ sizeId ][ matrixId ] ) | |
|         scaling_list_pred_matrix_id_delta[ sizeId ][ matrixId ] | ue(v) |
|       else{ | |
|         nextCoef = 8 | |
|         coefNum = Min( 64, ( 1 << ( 4 + ( sizeId << 1 ) ) ) ) | |
|         if( sizeId > 1) { | |
|           scaling_list_dc_coef_minus8[ sizeId − 2 ][ matrixId ] | se(v) |
|           nextCoef = scaling_list_dc_coef_minus8[ sizeId − 2 ][ matrixId ] + 8 | |
|         } | |
|         for( i = 0; i < coefNum, i++ ) { | |
|           scaling_list_detta_coef | se(v) |
|           nextCoef = ( nextCoef + scaling_list_delta_coef + 256) % 256 | |
|           ScalingList[ sizeId ][ matrixId ][ i ] = nextCoef | |
|         } | |
|       } | |
|     } | |
| } | | scaling_list_enabled_flag equal to 1 specifies that a scaling list is used for the scaling process for transform coefficients. scaling_list_enabled_flag equal to 0 specifies that scaling list is not used for the scaling process for transform coefficients.

sps_scaling_list_data_present_flag equal to 1 specifies that the scaling_list_data( ) syntax structure is present in the SPS. sps_scaling_list_data_present_flag equal to 0 specifies that the scaling_list_data( ) syntax structure is not present in the SPS. When not present, the value of sps_scaling_list_data_present_flag is inferred to be equal to 0.

pps_scaling_list_data_present_flag equal to 1 specifies that the scaling list data used for the pictures referring to the PPS are derived based on the scaling lists specified by the active SPS and the scaling lists specified by the PPS. pps_scaling_list_data_present_flag equal to 0 specifies that the scaling list data used for the pictures referring to the PPS are inferred to be equal to those specified by the active SPS. When scaling_list_enabled_flag is equal to 0, the value of pps_scaling_list_data_present_flag shall be equal to 0. When scaling_list_enabled_flag is equal to 1, sps_scaling_list_data_present_flag is equal to 0, and pps_scaling_list_data_present_flag is equal to 0, the default scaling list data are used to derive the array ScalingFactor as described in the scaling list data semantics as specified in clause 7.4.5.

7.4.5 Scaling List Data Semantics scaling_list_pred_mode_flag[sizeId][matrixId] equal to 0 specifies that the values of the scaling list are the same as the values of a reference scaling list. The reference scaling list is specified by scaling_list_pred_matrix_id_delta[sizeId][matrixId].

scaling_list_pred_mode_flag[sizeId][matrixId] equal to 1 specifies that the values of the scaling list are explicitly signalled.

scaling_list_pred_matrix_id_delta[sizeId][matrixId] specifies the reference scaling list used to derive ScalingList[sizeId][matrixId] as follows:

If scaling_list_pred_matrix_id_delta[sizeId][matrixId] is equal to 0, the scaling list is inferred from the default scaling list ScalingList[sizeId][matrixId][i] as specified in Table 7-5 and Table 7-6 for i=0 . . . Min(63, (1<<(4+(sizeId<<1)))−1).

Otherwise, the scaling list is inferred from the reference scaling list as follows:

$$\text{refMatrixId} = \text{matrixId} - \text{scaling\_list\_pred\_matrix\_id\_delta[sizeId][matrixId]} * (\text{sizeId}==3?3:1) \quad (7\text{-}42)$$

$$\text{ScalingList[sizeId][matrixId]}[i] = \text{ScalingList[sizeId][refMatrixId]}[i]$$

with $i=0 \ldots \text{Min}(63, (1<<(4+(\text{sizeId}<<1)))-1)$     (7-43)

If sizeId is less than or equal to 2, the value of scaling_list_pred_matrix_id_delta[sizeId][matrixId] shall be in the range of 0 to matrixId, inclusive. Otherwise (sizeId is equal to 3), the value of scaling_list_pred_matrix_id_delta[sizeId][matrixId] shall be in the range of 0 to matrixId/3, inclusive.

TABLE 7-3

Specification of sizeId

| Size of quantization matrix | sizeId |
|---|---|
| 4 × 4 | 0 |
| 8 × 8 | 1 |
| 16 × 16 | 2 |
| 32 × 32 | 3 |

TABLE 7-4

Specification of matrixId according to sizeId, prediction mode and colour component

| sizeId | CuPredMode | cIdx (colour component) | matrixId |
|---|---|---|---|
| 0, 1, 2, 3 | MODE_INTRA | 0 (Y) | 0 |
| 0, 1, 2, 3 | MODE_INTRA | 1 (Cb) | 1 |
| 0, 1, 2, 3 | MODE_INTRA | 2 (Cr) | 2 |
| 0, 1, 2, 3 | MODE_INTER | 0 (Y) | 3 |
| 0, 1, 2, 3 | MODE_INTER | 1 (Cb) | 4 |
| 0, 1, 2, 3 | MODE_INTER | 2 (Cr) | 5 | scaling_list_dc_coef_minus8[sizeId−2][matrixId] plus 8 specifies the value of the variable ScalingFactor[2][matrixId][0][0] for the scaling list for the 16×16 size when sizeId is equal to 2 and specifies the value of ScalingFactor[3][matrixId][0][0] for the scaling list for the 32×32 size when sizeId is equal to 3. The value of scaling_list_dc_coef_minus8[sizeId−2][matrixId] shall be in the range of −7 to 247, inclusive.

When scaling_list_pred_mode_flag[sizeId][matrixId] is equal to 0, scaling_list_pred_matrix_id_delta[sizeId][matrixId] is equal to 0, and sizeId is greater than 1, the value of scaling_list_dc_coef_minus8[sizeId−2][matrixId] is inferred to be equal to 8.

When scaling_list_pred_matrix_id_delta[sizeId][matrixId] is not equal to 0 and sizeId is greater than 1, the value of scaling_list_dc_coef_minus8[sizeId−2][matrixId] is inferred to be equal to scaling_list_dc_coef_minus8[sizeId−2][refMatrixId], where the value of refMatrixId is given by Equation 7-42.

scaling_list_delta_coef specifies the difference between the current matrix coefficient ScalingList[sizeId][matrixId][i] and the previous matrix coefficient ScalingList[sizeId][matrixId][i−1], when scaling_list_pred_mode_flag[sizeId][matrixId] is equal to 1. The value of scaling_list_delta_coef shall be in the range of −128 to 127, inclusive. The value of ScalingList[sizeId][matrixId][i] shall be greater than 0.

with $i=0\ldots 63$, matrixId$=0\ldots 5$, x=ScanOrder[3][0][i][0], and y=ScanOrder[3][0][i][1]

The elements of the quantization matrix of size 16×16, ScalingFactor[2][matrixId][ ][ ], are derived as follows:

$$\text{ScalingFactor}[2][\text{matrixId}][x*2+k][y*2+j]=\text{ScalingList}[2][\text{matrixId}][i] \quad (7\text{-}46)$$

with $i=0\ldots 63$, $j=0\ldots 1$, $k=0\ldots 1$, matrixId$=0\ldots 5$, x=ScanOrder[3][0][i][0], and y=ScanOrder[3][0][i][1]

$$\text{ScalingFactor}[2][\text{matrixId}][0][0]=\text{scaling\_list\_dc\_coef\_minus8}[0][\text{matrixId}]+8 \quad (7\text{-}47)$$

with matrixId$=0\ldots 5$

The elements of the quantization matrix of size 32×32, ScalingFactor[3][matrixId][ ][ ], are derived as follows:

$$\text{ScalingFactor}[3][\text{matrixId}][x*4+k][y*4+j]=\text{ScalingList}[3][\text{matrixId}][i] \quad (7\text{-}48)$$

with $i=0\ldots 63$, $j=0\ldots 3$, $k=0\ldots 3$, matrixId$=0,3$, x=ScanOrder[3][0][i][0], and y=ScanOrder[3][0][i][1], $$\text{ScalingFactor}[3][\text{matrixId}][0][0]=\text{scaling\_list\_dc\_coef\_minus8}[1][\text{matrixId}]+8 \quad (7\text{-}49)$$

with matrixId$=0, 3$

TABLE 7-5

Specification of default values of ScalingList[ 0 ][ matrixId ][ i ] with i = 0 . . . 15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 0 ][ 0 . . . 5 ][ i ] | 16 | 16 | 16 | 16 | 16 | 16 | 16 | 16 | 16 | 16 | 16 | 16 | 16 | 16 | 16 | 16 |

TABLE 7-6

Specification of default values of ScalingList[ 1 . . . 3 ][ matrixId ][ i ] with i = 0 . . . 63

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| i | | | | | | | | | | | | | | | | |
| ScalingList[ 1 . . . 3 ][ 0 . . . 2 ][ i ] | 16 | 16 | 16 | 16 | 16 | 16 | 16 | 16 | 16 | 16 | 17 | 16 | 17 | 16 | 17 | 18 |
| ScalingList[ 1 . . . 3 ][ 3 . . . 5 ][ i ] | 16 | 16 | 16 | 16 | 16 | 16 | 16 | 16 | 16 | 17 | 17 | 17 | 17 | 17 | | 18 |
| i-16 | | | | | | | | | | | | | | | | |
| ScalingList[ 1 . . . 3 ][ 0 . . . 2 ][ i ] | 17 | 18 | 18 | 17 | 18 | 21 | 19 | 20 | 21 | 20 | 19 | 21 | 24 | 22 | 22 | 24 |
| ScalingList[ 1 . . . 3 ][ 3 . . . 5 ][ i ] | 18 | 18 | 18 | 18 | 18 | 20 | 20 | 20 | 20 | 20 | 20 | 20 | 24 | 24 | 24 | 24 |
| i-32 | | | | | | | | | | | | | | | | |
| ScalingList[ 1 . . . 3 ][ 0 . . . 2 ][ i ] | 24 | 22 | 22 | 24 | 25 | 25 | 27 | 30 | 27 | 25 | 25 | 29 | 31 | 35 | 35 | 31 |
| ScalingList[ 1 . . . 3 ][ 3 . . . 5 ][ i ] | 24 | 24 | 24 | 24 | 25 | 25 | 25 | 25 | 25 | 25 | 25 | 28 | 28 | 28 | 28 | 28 |
| i-48 | | | | | | | | | | | | | | | | |
| ScalingList[ 1 . . . 3 ][ 0 . . . 2 ][ i ] | 29 | 36 | 41 | 44 | 41 | 36 | 47 | 54 | 54 | 47 | 65 | 70 | 65 | 88 | 88 | 115 |
| ScalingList[ 1 . . . 3 ][ 3 . . . 5 ][ i ] | 28 | 33 | 33 | 33 | 33 | 33 | 41 | 41 | 41 | 41 | 54 | 54 | 54 | 71 | 71 | 91 |

The four-dimensional array ScalingFactor[sizeId][matrixId][x][y], with x, y=0 . . . (1<<(2+sizeId))−1, specifies the array of scaling factors according to the variables sizeId specified in Table 7-3 and matrixId specified in Table 7-4

The elements of the quantization matrix of size 4×4, ScalingFactor[0][matrixId][ ][ ], are derived as follows:

$$\text{ScalingFactor}[0][\text{matrixId}][x][y]=\text{ScalingList}[0][\text{matrixId}][i] \quad (7\text{-}44)$$

with $i=0\ldots 15$, matrixId$=0\ldots 5$, x=ScanOrder[2][0][i][0], and y=ScanOrder[2][0][i][1]

The elements of the quantization matrix of size 8×8, ScalingFactor[1][matrixId][ ][ ], are derived as follows:

$$\text{ScalingFactor}[1][\text{matrixId}][x][y]=\text{ScalingList}[1][\text{matrixId}][i] \quad (7\text{-}45)$$

When ChromaArrayType is equal to 3, the elements of the chroma quantization matrix of size 32×32, ScalingFactor[3][matrixId][ ][ ], with matrixId=1, 2, 4, and 5, are derived as follows:

$$\text{ScalingFactor}[3][\text{matrixId}][x*4+k][y*4+j]=\text{ScalingList}[2][\text{matrixId}][i] \quad (7\text{-}50)$$

with $i=0\ldots 63$, $j=0\ldots 3$, $k=0\ldots 3$, x=ScanOrder[3][0][i][0], and y=ScanOrder[3][0][i][1]

$$\text{ScalingFactor}[3][\text{matrixId}][0][0]=\text{scaling\_list\_dc\_coef\_minus8}[0][\text{matrixId}]+8 \quad (7\text{-}51)$$

2.5. Transform and Quantization Design in VVC 2.5.1. Multiple Transform Selection (MTS)

The discrete sinusoidal transform families include the well-known discrete Fourier, cosine, sine, and the Karhunen-Loeve (under first-order Markov condition) transforms. Among all the members, there are 8 types of transforms based on cosine functions and 8 types of transforms based on sine functions, namely DCT-I, II, . . . , VIII, and DST-I, II, . . . , VIII, respectively. These variants of discrete cosine and sine transforms originate from the different symmetry of their corresponding symmetric-periodic sequences [22]. The transform basis functions of selected types of DCT and DST, as utilized in the proposed methods, are formulated in below Table 1.

TABLE 1

Transform basis functions of DCT-II/V/VIII and DSTI/VII for N-point input.

| Transform Type | Basis function $T_i(j)$, $i, j = 0, 1, \ldots, N-1$ |
| --- | --- |
| DCT2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT5 | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\begin{cases} \sqrt{\dfrac{2}{N}} & j = 0 \\ 1 & j \neq 0 \end{cases}$ |
| DCT8 | $T_i(j) = \dfrac{4}{2N+1} \cdot \cos\left(\dfrac{\pi \cdot (2i+1) \cdot (2j+1)}{4N+2}\right)$ |
| DST1 | $T_i(j) = \sqrt{\dfrac{2}{N+1}} \cdot \sin\left(\dfrac{\pi \cdot (i+1) \cdot (j+1)}{N+1}\right)$ |
| DST7 | $T_i(j) = \sqrt{\dfrac{4}{2N+1}} \cdot \sin\left(\dfrac{\pi \cdot (2i+1) \cdot (j+1)}{2N+1}\right)$ |

For one block, either transform skip or DCT2/DST7/DCT8 may be selected. Such a method is called multiple transform selection (MTS).

In order to control MTS scheme, separate enabling flags are specified at SPS level for intra and inter, respectively. When MTS is enabled at SPS, a coding unit (CU) level flag is signalled to indicate whether MTS is applied or not. Here, MTS is applied only for luma. The MTS CU level flag is signalled when the following conditions are satisfied.

Both width and height smaller than or equal to 32 coded block flag (CBF) is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in the table below. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 6

Transform basis functions of DCT-II/V/VIII and DSTI/VII for N-point input.

| | | | Infra/inter | |
| --- | --- | --- | --- | --- |
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same to that for MTS in JEM4, which indicate that transform skip is applicable for a CU when both block width and height are equal to or less than 32.

2.5.1.1. Zeroing-Out of High Frequency

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

2.5.2. Reduced Secondary Transform

Figure 2:
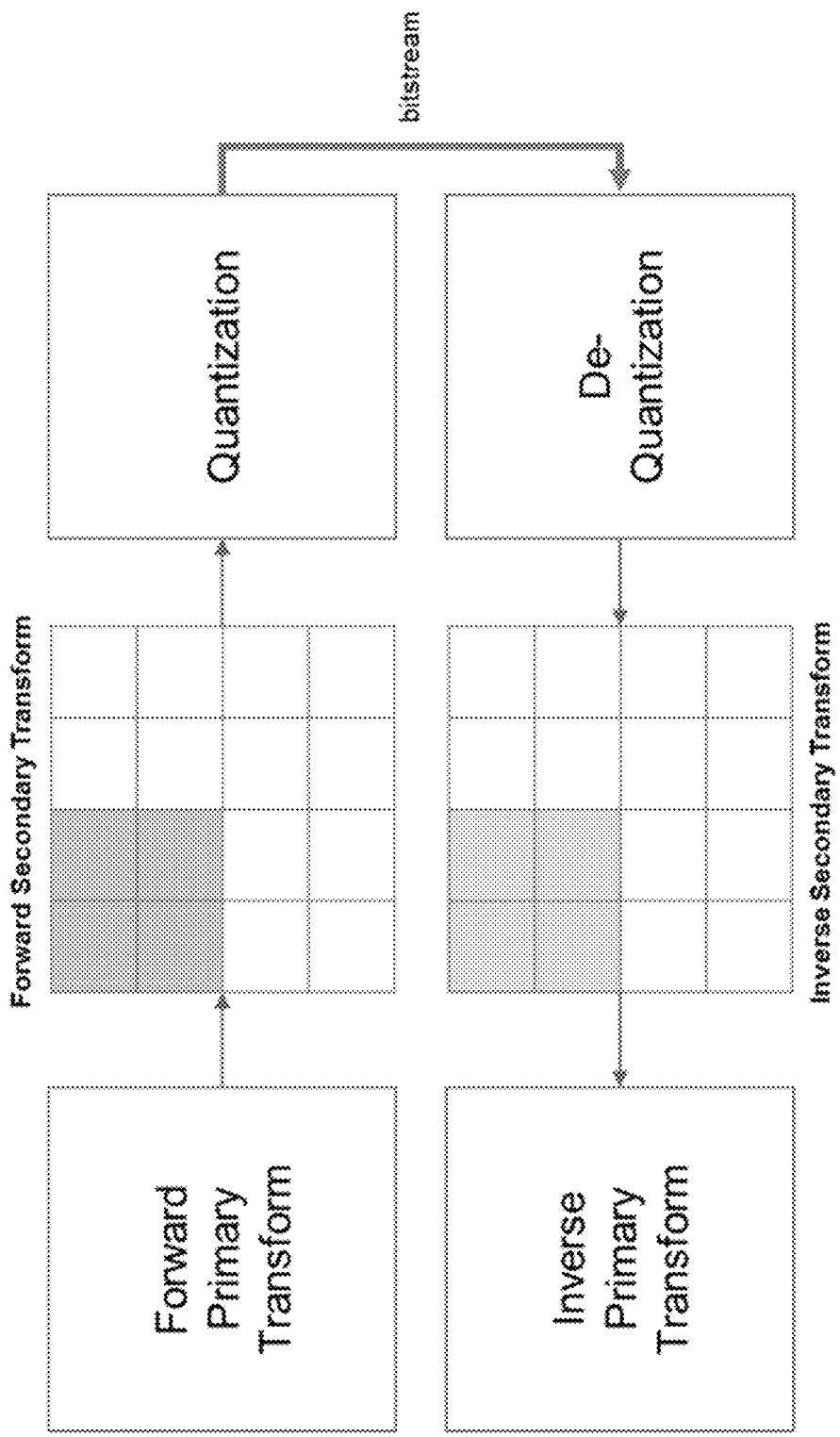
FIG. 2 shows an example of a secondary transform.

In JEM, secondary transform is applied between forward primary transform and quantization (at encoder) and between de-quantization and inverse primary transform (at decoder side). As shown in FIG. 2, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

For the secondary transforms, non-separable transforms are applied, therefore, it is also named as Non-Separable Secondary Transform (NSST). There are totally 35 transform sets and 3 non-separable transform matrices (kernels, each one with 16×16 matrix) per transform set are used.

The Reduced Secondary Transform (RST) was introduced in NET-K0099 and 4 transform sets (instead of 35 transform sets) mapping introduced in NET-L0133 according to intra prediction direction. In this contribution, 16×48 and 16×16 matrices are employed for 8×8 and 4×4 blocks, respectively. For notational convenience, 16×48 transform is denoted as RST8×8 and the 16×16 one as RST4×4. Such a method was recently adopted by VVC.

Figure 3:
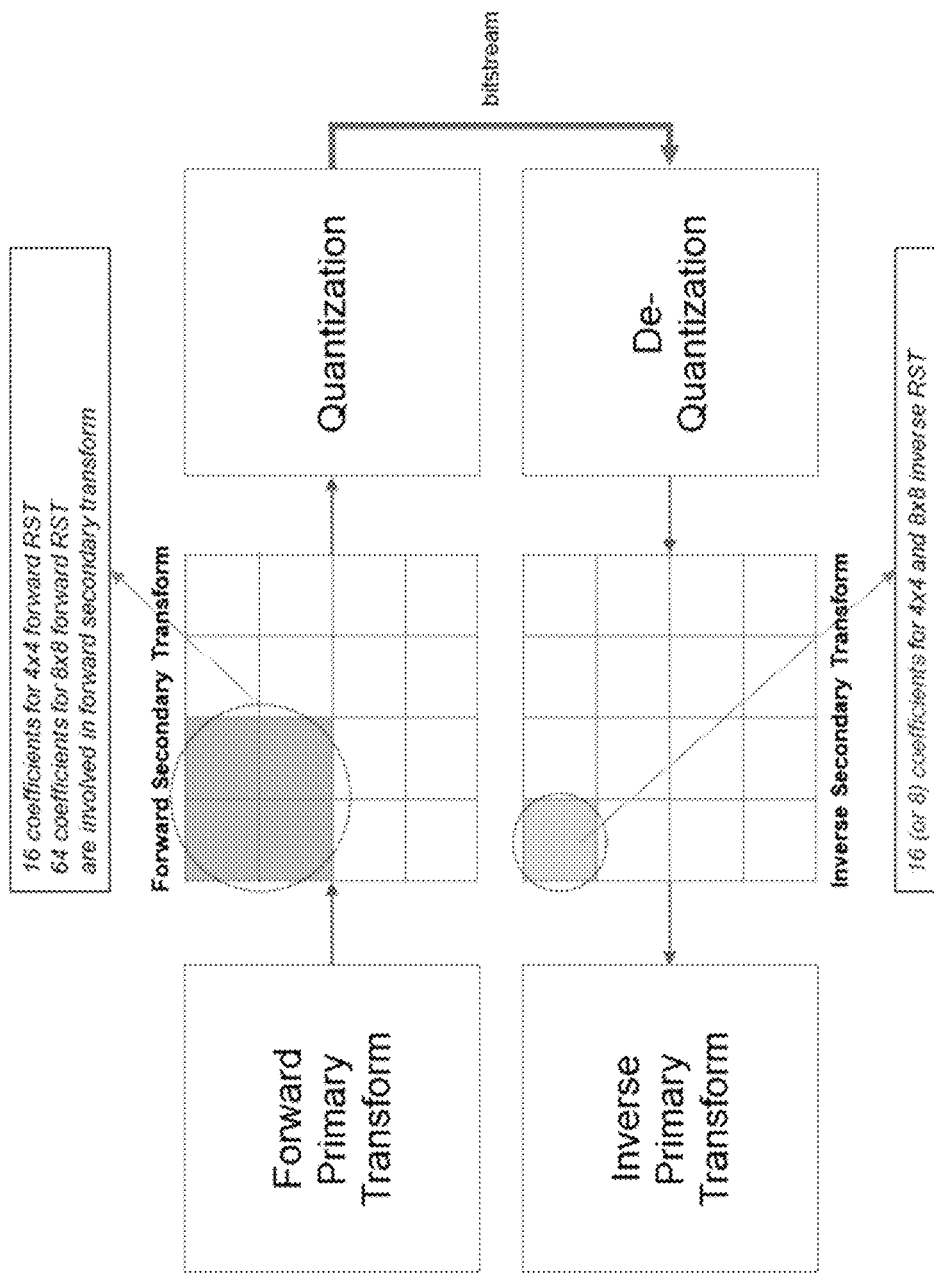
FIG. 3 shows an example of a reduced secondary transform (RST).

FIG. 3 shows an example of a Reduced Secondary Transform (RST).

Secondary forward and inverse transforms are a separate process step from that of primary transforms.

For encoder, the primary forward transform is performed first, then followed by secondary forward transform and quantization, and context-adaptive binary arithmetic coding (CABAC) bit encoding. For decoder, CABAC bit decoding and inverse quantization, then Secondary inverse transform is performed first, then followed by primary inverse transform.

RST applies only to intra coded transform units (TUs).

2.5.3. Quantization

In VTM4, Maximum QP was extended from 51 to 63, and the signaling of initial QP was changed accordingly. The initial value of SliceQpY is modified at the slice segment layer when a non-zero value of slice_qp_delta is coded. Specifically, the value of init_qp_minus26 is modified to be in the range of −(26+QpBdOffsetY) to +37.

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 4:
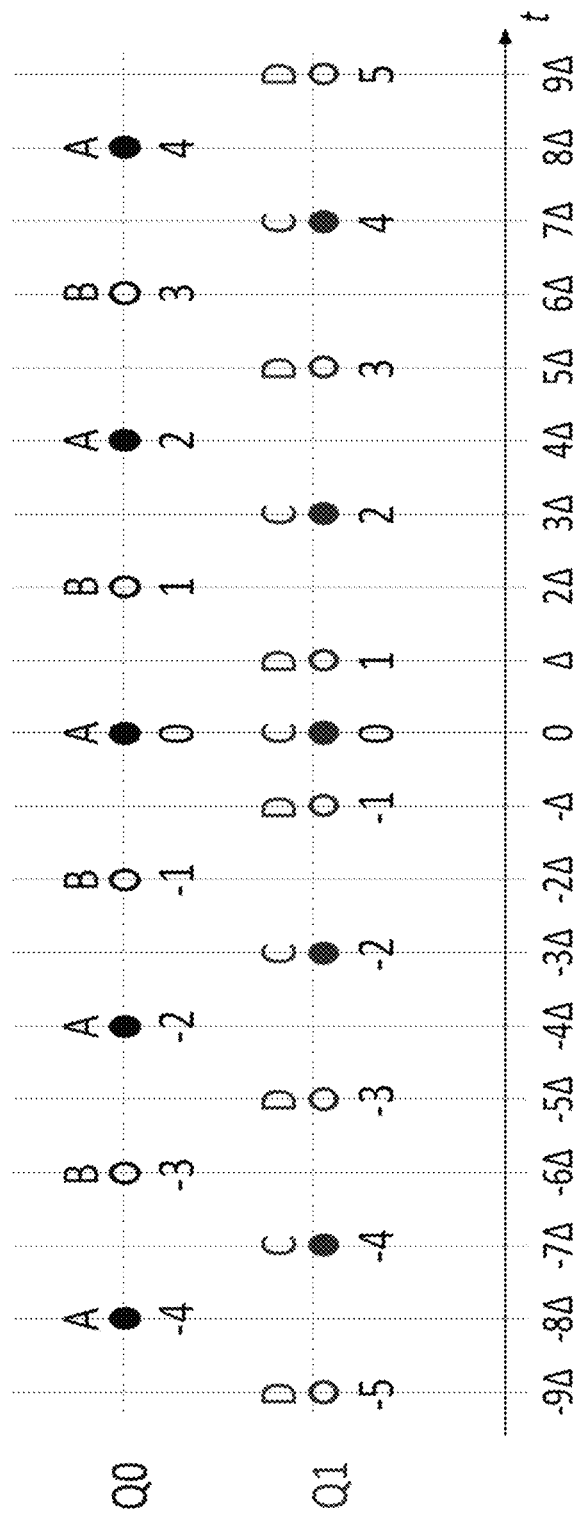
FIG. 4 is an illustration of the two scalar quantizers used in the proposed approach of dependent quantization.

FIG. 4 is an illustration of the two scalar quantizers used in the proposed approach of dependent quantization.

The two scalar quantizers used, denoted by Q0 and Q1, are illustrated in FIG. 4. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 5:
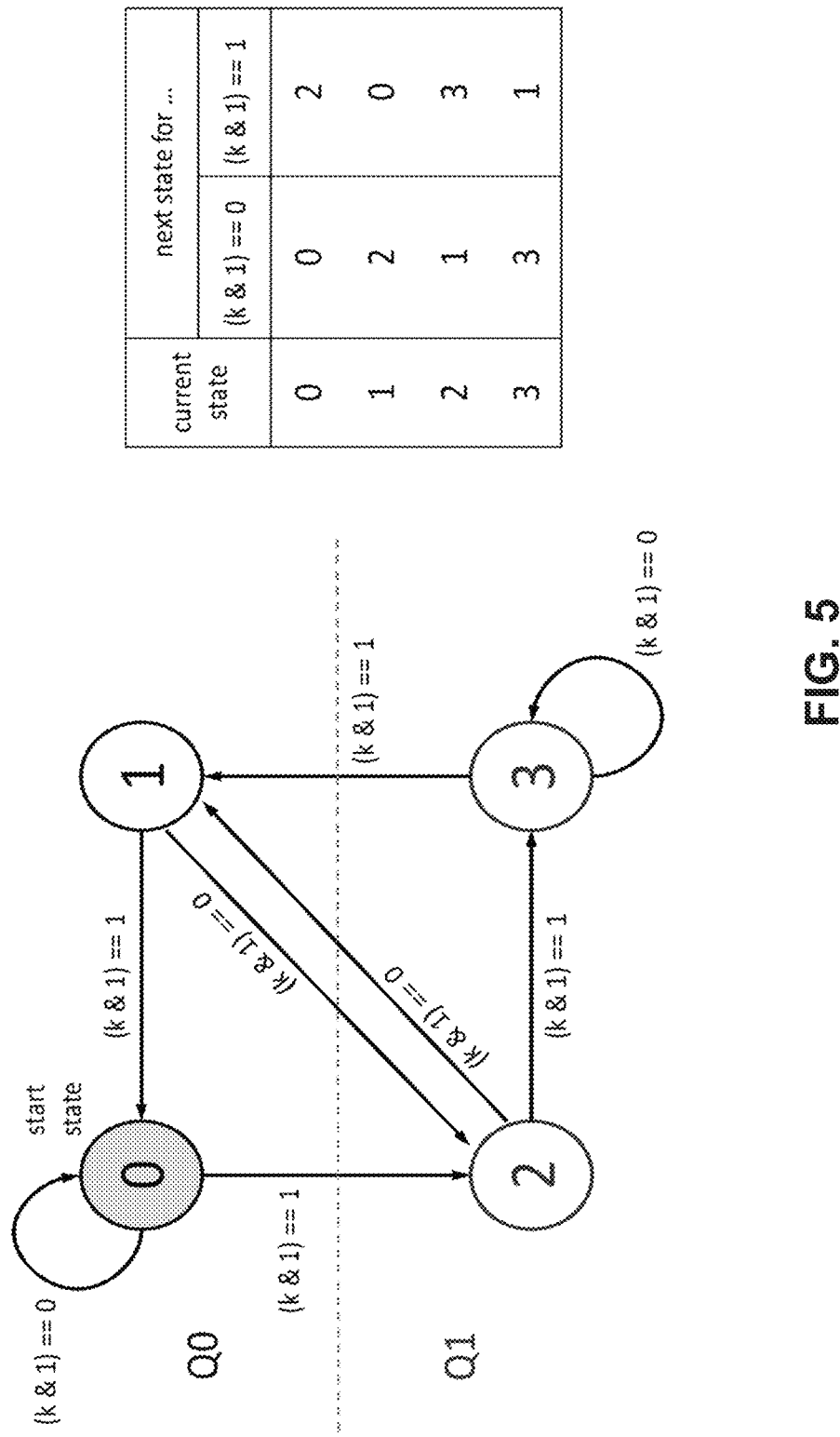
FIG. 5 shows an example of state transition and quantizer selection for the proposed dependent quantization.

As illustrated in FIG. 5, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 5, where k denotes the value of the transform coefficient level.

2.5.4. User-Defined Quantization Matrix in JVET-N0847

In this contribution, it is proposed to add support for signalling the default and user-defined scaling matrices on top of VTM4.0. The proposal is conforming to the bigger size range for the blocks (from 4×4 to 64×64 for luma, from 2×2 to 32×32 for chroma), rectangular TBs, dependent quantization, multiple transform selection (MTS), large transform with zeroing-out high frequency coefficients (aligned to the one-step definition procedure of scaling matrices for TBs), intra subblock partitioning (ISP), and intra block copy (IBC, also known as current picture referencing, CPR).

It is proposed to add syntax to support signaling of default and user-defined scaling matrices on top of VTM4.0 conforming to following:
- three modes for scaling matrices: OFF, DEFAULT, and USER DEFINED
- bigger size range for the blocks (from 4×4 to 64×64 for luma, 2×2 to 32×32 for chroma)
- rectangular transform blocks (TBs)
- dependent quantization
- multiple transform selection (MTS)
- large transforms with zeroing-out high frequency coefficients
- intra sub-block partitioning (ISP)
- intra block copy (IBC, also known as current picture referencing, CPR), share the same QMs as Intra coded blocks
- DEFAULT scaling matrices are flat for all TB sizes, with the default value 16
- Scaling matrices shall NOT be applied for
  - TS for all TB sizes
  - secondary transform (a.k.a., RST)

2.5.4.1. Signaling of QM for Square Transform Sizes

2.5.4.1.1. Scanning Order of Elements in a Scaling Matrix

The elements are coded in a scanning order which is the same as that used for coefficient coding, i.e., diagonal scan order. An example of the diagonal scan order is depicted in FIGS. 6A-6B.

Figure 6B:
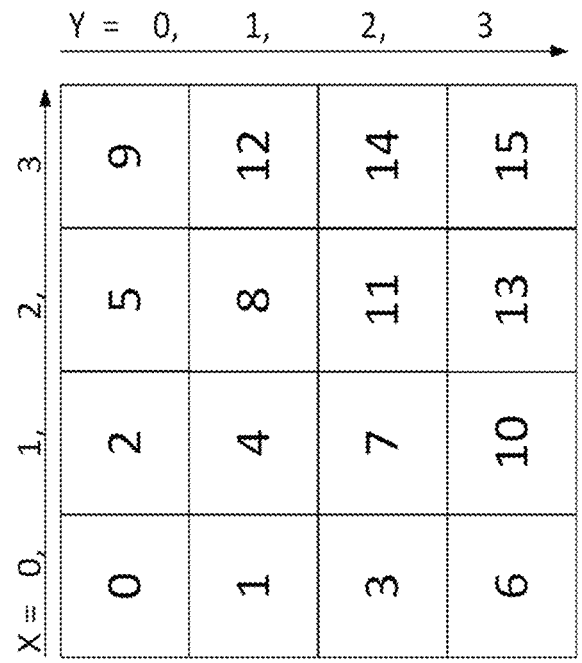
FIGS. 6A-6B show examples of diagonal scan orders.
Figure 6A:
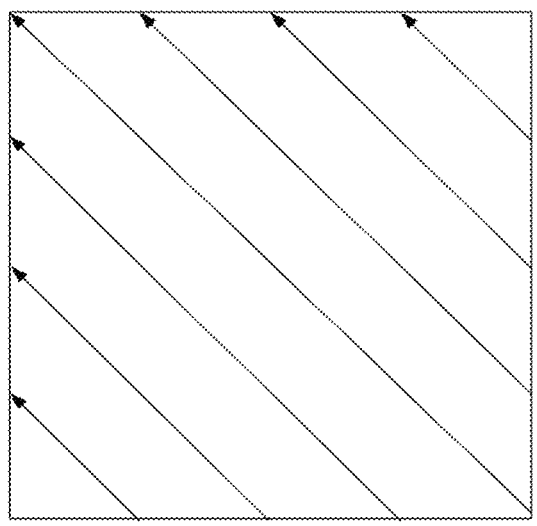

FIGS. 6A-6B show examples of diagonal scan orders. FIG. 6A shows scanning direction example. FIG. 6B shows coordinates and scan order index for each element.

The corresponding specification for this order is defined as follows.

6.5.2 Up-Right Diagonal Scan Order Array Initialization Process

Input to this process is a block width blkWidth and a block size height blkHeight.

Output of this process is the array diagScan[sPos][sComp]. The array index sPos specify the scan position ranging from 0 to (blkWidth*blkHeight)−1. The array index sComp equal to 0 specifies the horizontal component and the array index sComp equal to 1 specifies the vertical component. Depending on the value of blkWidth and blkHeight, the array diagScan is derived as follows:

```
i = 0
x = 0
y = 0
stopLoop = FALSE
while( !stopLoop ) {
    while( y >= 0 ) {
        if( x < blkWidth && y < blkHeight ) {                    (6-11)
            diagScan[ i ][ 0 ] = x
            diagScan[ i ][ 1 ] = y
            i++
        }
        y- -
        x++
    }
    y = x
    x = 0
    if( i >= blkWidth * blkHeight )
        stopLoop = TRUE
}
```

2.5.4.1.2. Coding of Selective Elements

The DC values (i.e., element located at scanning index equal to 0, top-left of the matrix) are separately coded for following scaling matrices: 16×16, 32×32, and 64×64.

For TBs (N×N) of Size Smaller than or Equal to 8×8 (N<=8)

For TBs of size smaller than or equal to 8×8, all elements in one scaling matrix are signaled.

For TBs (N×N) of Size Greater than 8×8 (N>8)

If the TBs have size greater than 8×8, only 64 elements in one 8×8 scaling matrix are signaled as a base scaling matrix. The 64 elements are corresponding to coordinates (m*X, m*Y) wherein m=N/8 and X, Y being [0 . . . 7]. In other words, one N×N block is split to multiple m*m non-overlapped regions, and for each region, they share the same element, and this shared element is signaled.

For obtaining square matrices of size greater than 8×8, the 8×8 base scaling matrix is up-sampled (by duplication of elements) to the corresponding square size (i.e., 16×16, 32×32, 64×64).

Taking 32×32 and 64×64 as examples, the selected positions for elements to be signaled marked with circle. Each square represents one element.

Figure 7:
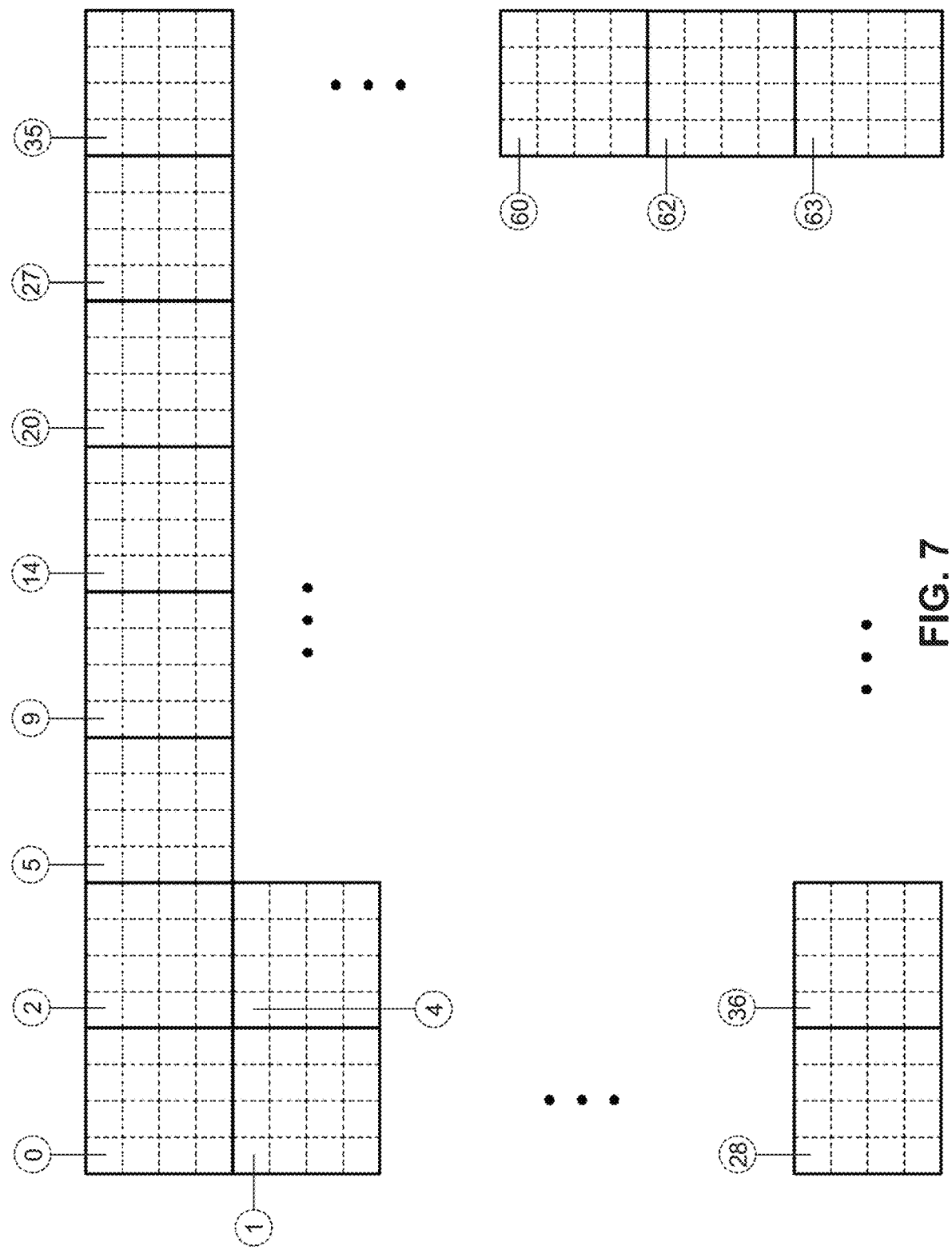
FIG. 7 shows an example of selected positions for quantization matrix (QM) signaling (32×32 transform size).

FIG. 7 shows an example of selected positions for QM signaling (32×32 transform size).

Figure 8:
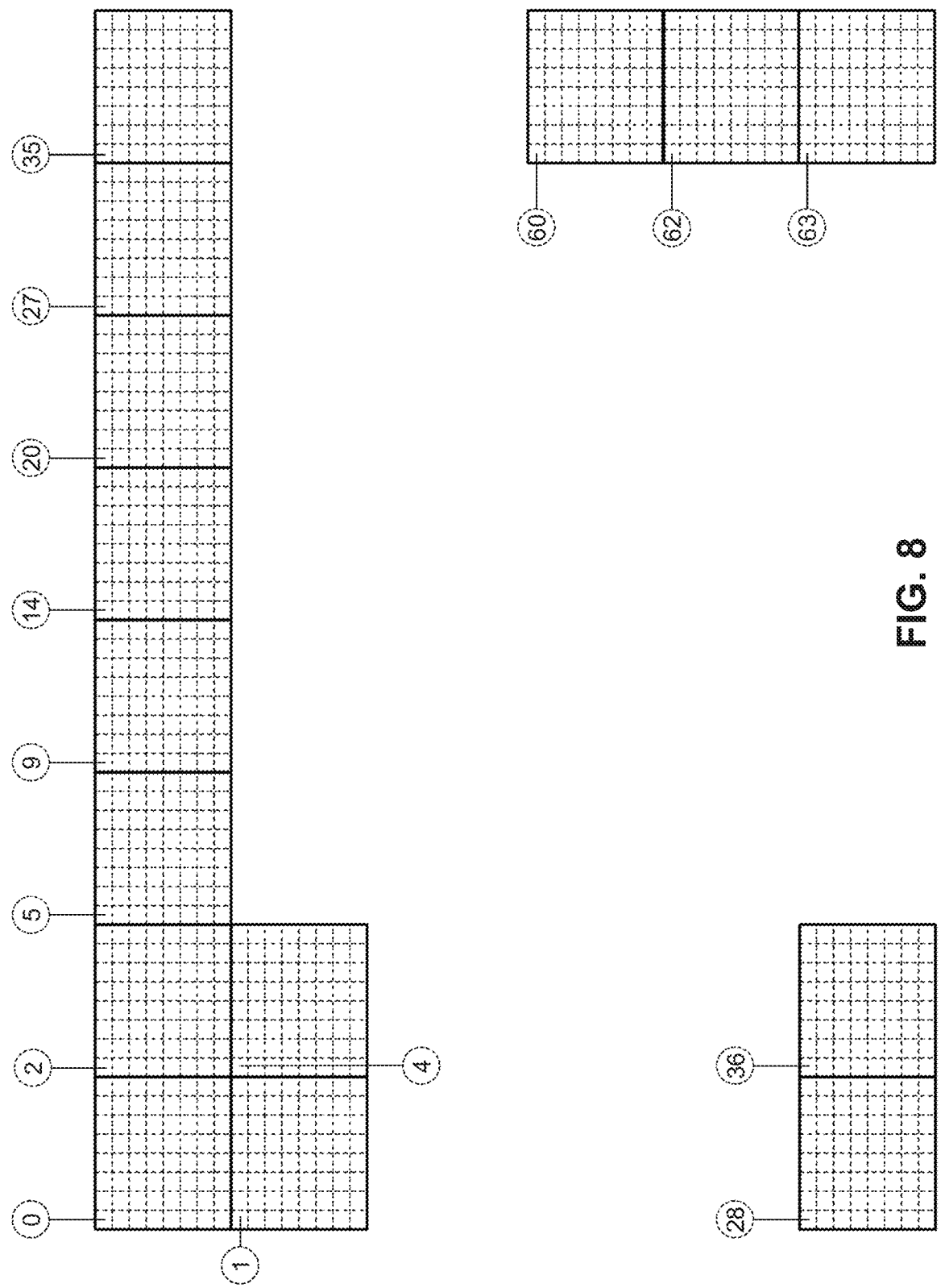
FIG. 8 shows an example of selected positions for QM signaling (64×64 transform size).

FIG. 8 shows an example of selected positions for QM signaling (64×64 transform size).

2.5.4.2. Derivation of QMs for Non-Square Transform Sizes

There is no additional signaling of QMs for non-square transform sizes. Instead, the QM for the non-square transform sizes is derived from that for square transform sizes. Examples are depicted in FIG. 7.

More specifically, when generating a scaling matrix for rectangular TBs, two cases are considered:

1. Height of the rectangular matrix H is greater than width W, then scaling matrix ScalingMatrix for rectangular TB of size W×H is defined from the reference scaling matrix of size baseL×baseL as follows, where baseL is equal to min (log 2(H), 3):

$$ScalingMatrix(i, j) = ScalingList\left[baseL \cdot int\left(\frac{j}{ratioH}\right) + int\left(\frac{i \cdot ratioHW}{ratioH}\right)\right] \quad (1)$$

for $i = 0:W-1, j = 0:H-1$ and $$ratioH = \frac{H}{baseL}, ratioHW = \frac{H}{W}.$$

2. Height of the rectangular matrix H is less than width W, then scaling matrix ScalingMatrix for rectangular TB of size W×H is defined from the reference scaling matrix of size baseL x baseL as follows, where baseL is equal to min (log 2(W), 3):

$$ScalingMatrix(i, j) = ScalingList\left[baseL \cdot int\left(\frac{j \cdot ratioWH}{ratioW}\right) + int(W)\right] \quad (2)$$

for $i = 0:W-1, j = 0:H-1$, and $$ratioW = \frac{W}{baseL},$$

$$ratioWH = \frac{W}{H}.$$

Here int(x) is modifying value of x by truncating the fractional part.

FIG. 8 shows examples of QM derivation for non-square blocks from square blocks. (a) QM of 2×8 block derived from the 8×8 block, (b) QM of 8×2 block derived from that 8×8 block,

2.5.4.3. Signaling of QM for Transform Blocks with Zeroing-Out

Figure 9:
FIG. 9 shows an example of applying zeroing out to coefficients.
Figure 9:
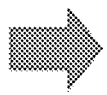

In addition, when the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero, as shown in FIG. 9. For this, a check is performed when obtaining rectangular matrices according to equations (1) and (2) and corresponding elements in ScalingMatrix(i, j) are assigned to 0.

2.5.4.4. Syntax, Semantics for Quantization Matrix

The same syntax elements as that in HEVC are added to SPS and PPS. However, the signaling of scaling list data syntax is changed:

7.3.2.11 Scaling List Data Syntax

| scaling_list_data( ) { | Descriptor |
|---|---|
|   for( sizeId = 1; sizeId < 7; sizeId++ ) | |
|     for( matrixId = 0; matrixId < 6; matrixId ++) { | |
|       if( ! ( (( sizeId == 1 ) && ( matrixId % 3 == 0 ) ) || (( sizeId == 6 ) && ( matrixId % 3 != 0 ) )) ) { | |
|         scaling_list_pred_mode_flag[ sizeId ][ matrixId ] | u(1) |
|         if( !scaling_list_pred_mode_flag[ sizeId ][ matrixId ] ) | |
|           scaling_list_pred_matrix_id_delta[ sizeId ][ matrixId ] | ue(v) |
|         else{ | |
|           nextCoef = 8 | |
|           coefNum = Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i =0; i < coef Num; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !(sizeId==6 && x>=4 && y>=4) ) { | |
|               scaling_list_delta_coef | se(v) |
|               nextCoef = ( nextCoef + scaling_list_delta_coef + 256) % 256 | |
|               ScalingList[ sizeId ][ matrixId ][ i ] = nextCoef | |

-continued

```
scaling_list_data( ) {                                                    Descriptor
               }
             }
           }
         }
       }
     }
}
```

7.4.3.11 Scaling List Data Semantics
scaling_list_pred_mode_flag[sizeId][matrixId] equal to 0 specifies that the values of the scaling list are the same as the values of a reference scaling list. The reference scaling list is specified by scaling_list_pred_matrix_id_delta[sizeId][matrixId]. scaling_list_pred_mode_flag[sizeId][matrixId] equal to 1 specifies that the values of the scaling list are explicitly signalled.
scaling_list_pred_matrix_id_delta[sizeId][matrixId] specifies the reference scaling list used to derive ScalingList[sizeId][matrixId], the derivation of ScalingList[sizeId][matrixId] is based on scaling_list_pred_matrix_id_delta[sizeId][matrixId] as follows:
  If scaling_list_pred_matrix_id_delta[sizeId][matrixId] is equal to 0, the scaling list is inferred from the default scaling list ScalingList[sizeId][matrixId][i] as specified in Table 7-15, Table 7-16, Table 7-17, Table 7-18 for i=0 . . . Min(63, (1<<(sizeId<<1))−1).
  Otherwise, the scaling list is inferred from the reference scaling list as follows:
  For sizeId=1 . . . 6, refMatrixId=matrixId−scaling_list_pred_matrix_id_delta[sizeId][matrixId]*(sizeId==6?3:1)    (7-XX)

If sizeId is equal to 1, the value of refMatrixId shall not be equal to 0 or 3. Otherwise, if sizeId is less than or equal to 5, the value of scaling_list_pred_matrix_id_delta[sizeId][matrixId] shall be in the range of 0 to matrixId, inclusive. Otherwise (sizeId is equal to 6), the value of scaling_list_pred_matrix_id_delta[sizeId][matrixId] shall be in the range of 0 to matrixId/3, inclusive.

TABLE 7-13

Specification of sizeId

| Size of quantization matrix | sizeId |
| --- | --- |
| 1 × 1 | 0 |
| 2 × 2 | 1 |
| 4 × 4 | 2 |
| 8 × 8 | 3 |
| 16 × 16 | 4 |
| 32 × 32 | 5 |
| 64 × 64 | 6 |

TABLE 7-14

Specification of matrixId according to sizeId, prediction mode and colour component

| sizeId | CuPredMode | cIdx (Colour component) | matrixId |
| --- | --- | --- | --- |
| 2, 3, 4, 5, 6 | MODE_INTRA | 0 (Y) | 0 |
| 1, 2, 3, 4, 5 | MODE_INTRA | 1 (Cb) | 1 |
| 1, 2, 3, 4, 5 | MODE_INTRA | 2 (Cr) | 2 |

TABLE 7-14-continued

Specification of matrixId according to sizeId, prediction mode and colour component

| sizeId | CuPredMode | cIdx (Colour component) | matrixId |
| --- | --- | --- | --- |
| 2, 3, 4, 5, 6 | MODE_INTER | 0 (Y) | 3 |
| 1, 2, 3, 4, 5 | MODE_INTER | 1 (Cb) | 4 |
| 1, 2, 3, 4, 5 | MODE_INTER | 2 (Cr) | 5 |
| 2, 3, 4, 5, 6 | MODE_IBC | 0 (Y) | 0 |
| 1, 2, 3, 4, 5 | MODE_IBC | 1 (Cb) | 1 |
| 1, 2, 3, 4, 5 | MODE_IBC | 2 (Cr) | 2 | scaling_list_dc_coef_minus8[sizeId][matrixId] plus 8 specifies the value of the variable ScalingFactor[4][matrixId][0][0] for the scaling list for the 16×16 size when sizeId is equal to 4 and specifies the value of ScalingFactor[5][matrixId][0][0] for the scaling list for the 32×32 size when sizeId is equal to 5, and specifies the value of ScalingFactor[6][matrixId][0][0] for the scaling list for the 64×64 size when sizeId is equal to 6. The value of scaling_list_dc_coef_minus8[sizeId][matrixId] shall be in the range of −7 to 247, inclusive.

When scaling_list_pred_mode_flag[sizeId][matrixId] is equal to 0, scaling_list_pred_matrix_id_delta[sizeId][matrixId] is equal to 0 and sizeId is greater than 3, the value of scaling_list_dc_coef_minus8[sizeId][matrixId] is inferred to be equal to 8.

When scaling_list_pred_matrix_id_delta[sizeId][matrixId] is not equal to 0 and sizeId is greater than 3, the value of scaling_list_dc_coef_minus8[sizeId][matrixId] is inferred to be equal to scaling_list_dc_coef_minus8[sizeId][refMatrixId], where the value of refMatrixId is given by Equation 7-XX.

scaling_list_delta_coef specifies the difference between the current matrix coefficient ScalingList[sizeId][matrixId][i] and the previous matrix coefficient ScalingList[sizeId][matrixId][i−1], when scaling_list_pred_mode_flag[sizeId][matrixId] is equal to 1. The value of scaling_list_delta_coef shall be in the range of −128 to 127, inclusive. The value of ScalingList[sizeId][matrixId][i] shall be greater than 0. When scaling_list_pred_mode_flag[sizeId][matrixId] is equal to 1 and scaling_list_delta_coef is not present, the value of ScalingList[sizeId][matrixId][i] is inferred to be 0.

TABLE 7-15

Specification of default values of ScalingList[ 1 ][ matrixId ][ i ] with i = 0..3

| i | 0 | 1 | 2 | 3 |
| --- | --- | --- | --- | --- |
| ScalingList[ 1 ][ 1, 2, 4, 5 ][ i ] | 1 6 | 1 6 | 1 6 | 1 6 |

TABLE 7-16

Specification of default values of ScalingList[ 2 ][ matrixId ][ i ] with i = 0 . . . 15

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 2 ][ 0 . . . 5 ][ i ] | 16 | 16 | 16 | 16 | 16 | 16 | 16 | 16 | 16 | 16 | 16 | 16 | 16 | 16 | 16 | 16 |

TABLE 7-17

Specification of default values of ScalingList[ 3 . . . 6 ][ matrixId ][ i ] with i = 0 . . . 63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-16 | | | | | | | | | | | | | | | | |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-32 | | | | | | | | | | | | | | | | |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |
| i-48 | | | | | | | | | | | | | | | | |
| ScalingList[ 3 . . . 5 ][ 0 . . . 5 ][ i ] | 16 | 16 | 16 | 16 | 16 | 16 | 16 | 16 | 16 | 16 | 16 | 16 | 16 | 16 | 16 | 16 |

TABLE 7-18

Specification of default values of ScalingList[ 6 ][ matrixId ][ i ] with i = 0 . . . 63

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-16 | | | | | | | | | | | | | | | | |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-32 | | | | | | | | | | | | | | | | |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |
| i-48 | | | | | | | | | | | | | | | | |
| ScalingList[ 6 ][ 0, 3 ][ i ] | 16 | 16 | 16 | 16 | 16 | 16 | 16 | 16 | 16 | 16 | 16 | 16 | 16 | 16 | 16 | 16 |

The five-dimensional array ScalingFactor[sizeId][sizeId][matrixId][x][y], with x, y=0 . . . (1<<sizeId)−1, specifies the array of scaling factors according to the variables sizeId specified in Table 7-13 and matrixId specified in Table 7-14. The elements of the quantization matrix of size 2×2, ScalingFactor[1][matrixId][ ][ ], are derived as follows:

$$\text{ScalingFactor}[1][1][\text{matrixId}][x][y] = \text{ScalingList}[1][\text{matrixId}][i] \quad (7\text{-XX})$$

with i=0 . . . 3, matrixId=1, 2, 4, 5, x=DiagScanOrder[1][1][i][0], and y=DiagScanOrder[1][1][i][1]

The elements of the quantization matrix of size 4×4, ScalingFactor[2][matrixId][ ][ ], are derived as follows:

$$\text{ScalingFactor}[2][2][\text{matrixId}][x][y] = \text{ScalingList}[2][\text{matrixId}][i] \quad (7\text{-XX})$$

with i=0 . . . 15, matrixId=0 . . . 5, x=DiagScanOrder[2][2][i][0], and y=DiagScanOrder[2][2][i][1]

The elements of the quantization matrix of size 8×8, ScalingFactor[3][matrixId][ ][ ], are derived as follows:

$$\text{ScalingFactor}[3][3][\text{matrixId}][x][y] = \text{ScalingList}[3][\text{matrixId}][i] \quad (7\text{-XX})$$

with i=0 . . . 63, matrixId=0 . . . 5, x=DiagScanOrder[3][3][i][0], and y=DiagScanOrder[3][3][i][1]

The elements of the quantization matrix of size 16×16, ScalingFactor[4][matrixId][ ][ ], are derived as follows:

$$\text{ScalingFactor}[4][4][\text{matrixId}][x*2+k][y*2+j] = \text{ScalingList}[4][\text{matrixId}][i] \quad (7\text{-XX})$$

with i=0 . . . 63, j=0 . . . 1, k=0 . . . 1, matrixId=0 . . . 5, x=DiagScanOrder[3][3][i][0], and y=DiagScanOrder[3][3][i][1]

$$\text{ScalingFactor}[4][4][\text{matrixId}][0][0] = \text{scaling\_list\_dc\_coef\_minus8}[0][\text{matrixId}] + 8 \quad (7\text{-XX})$$

with matrixId=0 . . . 5

The elements of the quantization matrix of size 32×32, ScalingFactor[5][matrixId][ ][ ], are derived as follows:

$$\text{ScalingFactor}[5][5][\text{matrixId}][x*4+k][y*4+j] = \text{ScalingList}[5][\text{matrixId}][i] \quad (7\text{-XX})$$

with i=0 . . . 63, j=0 . . . 3, k=0 . . . 3, matrixId=0 . . . 5, x=DiagScanOrder[3][3][i][0], and y=DiagScanOrder[3][3][i][1]

$$\text{ScalingFactor}[5][5][\text{matrixId}][0][0] = \text{scaling\_list\_dc\_coef\_minus8}[1][\text{matrixId}] + 8 \quad (7\text{-XX})$$

with matrixId=0 . . . 5

The elements of the quantization matrix of size 64×64, ScalingFactor[6][matrixId][ ][ ], are derived as follows:

ScalingFactor[6][6][matrixId][*x*8+*k*][*y*8+*j*]=ScalingList[6][matrixId][*i*]  (7-XX)

with i=0 . . . 63, j=0 . . . 7, k=0 . . . 7, matrixId=0, 3, x=DiagScanOrder[3][3][i][0], and y=DiagScanOrder[3][3][i][1]

ScalingFactor[6][6][matrixId][0][0]=scaling_list_dc_coef_minus8[2][matrixId]+8  (7-XX)

with matrixId=0, 3
When ChromaArrayType is equal to 3, the elements of the chroma quantization matrix of size 64×64, ScalingFactor[6][6][matrixId][ ][ ], with matrixId=1, 2, 4 and 5 are derived as follows:

ScalingFactor[6][6][matrixId][*x*8+*k*][*y*8+*j*]=ScalingList[5][matrixId][*i*]  (7-XX)

with i=0 . . . 63, j=0 . . . 7, k=0 . . . 7, x=DiagScanOrder[3][3][i][0], and y=DiagScanOrder[3][3][i][1]

ScalingFactor[6][6][matrixId][0][0]=scaling_list_dc_coef_minus8[1][matrixId]+8  (7-XX)

//non-square cases
For a quantization matrix with rectangular size,
The five-dimensional array ScalingFactor[sizeIdW][sizeIdH][matrixId][x][y], with x=0 . . . (1<<sizeIdW)−1, y=0 . . . (1<<sizeIdH)−1, sizeIdW!=sizeIdH, specifies the array of scaling factors according to the variables sizeIdW and sizeIdH specified in Table 7-19, are derived as follows:
ScalingFactor[sizeIdW][sizeIdH][matrixId][x][y] can be generated by ScalingList[sizeLId][matrixId][i]
with sizeLId=max(sizeIdW, sizeIdH), sizeIdW=0, 1 . . . 6, sizeIdH=0, 1 . . . 6, matrixId=0 . . . 5, x=0 . . . (1<<sizeIdW)−1, y=0 . . . (1<<sizeIdH)−1, x=DiagScanOrder[k][k][i][0], and y=DiagScanOrder[k][k][i][1], k=min (sizeLId, 3), and ratioW=(1<<sizeIdW)/(1<<k), ratioH=(1<<sizeIdH)/(1<<k), and ratioWH=(1<<abs(sizeIdW−sizeIdH)), as the following rules:
If (sizeIdW>sizeIdH)

ScalingFactor[sizeId*W*][sizeId*H*][matrixId][x][y]=
ScalingList[sizeLId][matrixId][Raster2Diag
[(1<<k)*((y*ratio*WH*)/ratio*WH*)+x/ratio*W*]]

else

ScalingFactor[sizeId*W*][sizeId*H*][matrixId][x][y]=
ScalingList[sizeLId][matrixId][Raster2Diag
[(1<<k)*(y/ratio*H*)+(x*ratio*WH*)/ratio*H*]], Where Raster2Diag[ ] is the function converting raster scan position in one 8×8 block to diagonal scan position
//zeroing-out cases
A quantization matrix with rectangular size shall be zeroed out for the samples satisfying to the following conditions
  x>32
  y>32
  the decoded tu is not coded by default transform mode, (1<<sizeIdW)==32 and x>16
  the decoded tu is not coded by default transform mode, (1<<sizeIdH)==32 and y>16

TABLE 7-19

Specification of sizeIdW and sizeIdH

| Size of quantization matrix | sizeIdW | sizeIdH |
|---|---|---|
| 1 | 0 | 0 |
| 2 | 1 | 1 |
| 4 | 2 | 2 |

TABLE 7-19-continued

Specification of sizeIdW and sizeIdH

| Size of quantization matrix | sizeIdW | sizeIdH |
|---|---|---|
| 8 | 3 | 3 |
| 16 | 4 | 4 |
| 32 | 5 | 5 |
| 64 | 6 | 6 |

2.6 Quantized Residual Block Differential Pulse-Code Modulation

In NET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, \ 0 \leq j \leq (N-1) \\ Q(r_{i,j}) - Q(r_{(i-1),j}), & 1 \leq i \leq (M-1), \ 0 \leq j \leq (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \leq i \leq (M-1), \ j=0 \\ Q(r_{i,j}) - Q(r_{i,(j-1)}), & 0 \leq i \leq (M-1), \ 1 \leq j \leq (N-1) \end{cases} \quad (2\text{-}7\text{-}2)$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \Sigma_{k=0}^{j} \tilde{r}_{i,k}, 0 \leq i \leq (M-1), 0 \leq j \leq (N-1) \quad (2\text{-}7\text{-}3)$$

For horizontal case, $$Q(r_{i,j}) = \Sigma_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

The draft text changes of QR-BDPCM are shown as follows.

7.3.6.5 Coding Unit Syntax

| coding_unit( x0, y0, cbWidth, cbHeight, treeType ) { | Descriptor |
|---|---|
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) | |
| && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( pred_mode_flag = = MODE_INTRA && ( cIdx = = 0 ) && | |
|       ( cbWidth <= 32) && ( CbHeight <= 32 )) { | |
|       bdpcm_flag[ x0 ][ y0 ] | ae(v) |
|       if( bdpcm_flag[ x0 ][ y0 ]) { | |
|         bdpcm_dir_flag[ x0 ][ y0 ] | ae(v) |
|       } | |
|     else{ | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ]) { | |
|       while( !byte_aligned( ) ) | |
|         pcm_alignment_zero_bit | f(1) |
|       pcm_sample( cbWidth, cbHeight, treeType) | |
|     }else { | |
|     if( treeType = = SINGLE_TREE \|\| treeType = = DUAL_TREE_LUMA ) | |
| { | |
|       if( ( y0 % CtbSizeY ) > 0 ) | |
|         intra_luma_ref_idx[ x0 ][ y0 ] | ae(v) |
|       if (intra_luma_ref_idx[ x0 ][ y0 ] = = 0 && | |
|         (cbWidth <= MaxTbSizeY \|\| cbHeight <= MaxTbSizeY ) && | |
|         (cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && | |
|         intra_subpartitions_mode_flag[ x0 ][ y0 ] = = 0 ) | |
|         intra_luma_mpm_flag[ x0 ][ y0 ] ) | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|   } | |
|     if( treeType = = SINGLE_TREE \|\| treeType = = | |
| DUAL_TREE_CHROMA) | |
|       intra_chroma_pred_mode[ x0 ][ y0 ] | ae(v) |
|   } | |
|   }else if( treeType != DUAL_TREE_CHROMA ) { /*MODE_INTER or MODE_IBC */ | |
| ... | |
| } | | bdpcm_flag[x0][y0] equal to 1 specifies that a bdpcm_dir_flag is present in the coding unit including the luma coding block at the location (x0, y0) bdpcm_dir_flag[x0][y0] equal to 0 specifies that the prediction direction to be used in a bdpcm block is horizontal, otherwise it is vertical.

3. Example Technical Problems Solved by Embodiments and Techniques

The current VVC design has the following problems in terms of quantization matrices:
1. For QR-BDPCM and BDPCM-blocks, transform is not applied. Therefore, applying scaling matrix to such blocks in a similar way as other transform-applied blocks is not optimal.
2. IBC and intra coding modes share the same scaling matrices. However, IBC is more likely an inter coding tool. Such a design seems to be not reasonable.
3. For larger blocks with zeroing-out, several elements are signaled, but reset to zero in the decoding process which wastes bits.
4. In some frameworks, quantization is performed as always applying quantization matrices. Thus, quantization matrices for small block may lead to frequent matrices changed.

4. A Listing of Embodiments and Techniques

The detailed embodiments below should be considered as examples to explain general concepts. These embodiments should not be interpreted in a narrow way. Furthermore, these embodiments can be combined in any manner.

Figure 10:
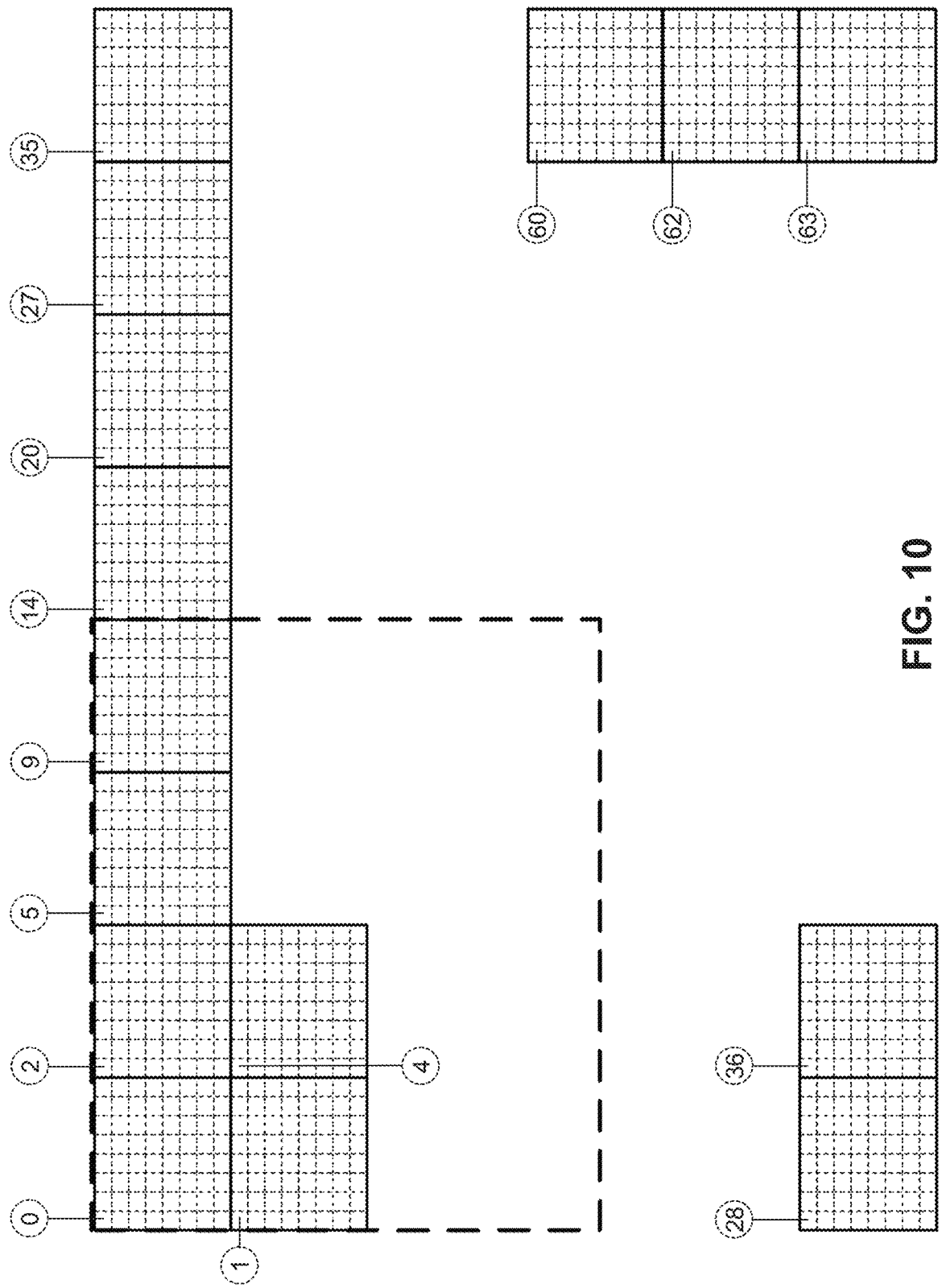
FIG. 10 shows an example of only selected elements in the dashed region (e.g., the M×N region) are signaled.

1. When the transform skip (TS) flag is not signaled in the bit stream, how to set the value of this flag may depend on coded mode information.
    a. In one example, for BDPCM/QR-BDPCM coded blocks, the TS flag is inferred to be 1.
    b. In one example, for non-BDPCM/QR-BDPCM coded blocks, the TS flag is inferred to be 0.
2. It is proposed that scaling matrix may be applied on BDPCM/QR-BDPCM coded blocks.
    a. Alternatively, it is proposed to disallow scaling matrix for BDPCM/QR-BDPCM coded blocks.
    b. In one example, how to select scaling matrix for BDPCM/QR-BDPCM coded blocks may be performed in the same way as transform skip coded blocks.
    c. In one example, how to select the scaling matrix for a BDPCM/QR-BDPCM coded block may depend on whether one or multiple transforms are applied to the block.
        i. In one example, if one or multiple transforms are applied to a BDPCM/QR-BDPCM coded block, the scaling matrix may be allowed.
        ii. In one example, if one or multiple transforms are applied to a BDPCM/QR-BDPCM coded block, how to select the scaling matrix for BDPCM/QR-BDPCM coded blocks may be performed in the same way as an intra coded block.
3. Whether to and/or how to filter samples/edges between two adjacent blocks in in-loop filters (de-blocking filters) and/or other post-reconstruction filters may depend on whether any or both two adjacent blocks are coded with transform skip (TS) mode.
    a. Whether to and/or how to filter samples/edges between two adjacent blocks in in-loop filters (de-blocking filters) and/or other post-reconstruction filters may depend on whether two adjacent blocks coded with TS, BDPCM, QR-BDPCM, palette mode.
    b. In one example, the derivation of boundary filtering strength may depend on the TS mode flag(s) of one or both of the two adjacent blocks.
    c. In one example, for the samples located at the TS-coded blocks, deblocking filter/Sample adaptive Offset/adaptive loop filter/other kinds of in-loop filters/other post-reconstruction filters may be disabled.
        i. In one example, if two adjacent blocks are both coded with transform skipped mode, there is no need to filter such an edge between these two.
        ii. In one example, if one of two adjacent blocks is coded with transform skipped mode and the other one is not, there is no need to filter samples located at the TS-coded block.
    d. Alternatively, for the samples located at the TS-coded blocks, a different filter (e.g., smoother filter) may be allowed.
    e. During the process of in-loop filters (e.g., de-blocking filters) and/or other post-reconstruction filters (e.g., bilateral filter, diffusion filter), a block coded with PCM/BDPCM/QR-BDPCM and/or other kinds of modes which transform are not applied on, may be treated in the same way as coded with TS mode, such as mentioned above.
4. Blocks coded with IBC and inter coding modes may share the same scaling matrices.
5. Scaling matrix selection may depend on the transform matrix type.
    a. In one example, selection of scaling matrices may depend on whether the block uses a default transform such as DCT2 or not.
    b. In one example, scaling matrices may be signaled for multiple transform matrix types separately.
6. Scaling matrix selection may depend on the motion information of a block.
    a. In one example, scaling matrix selection may depend on whether the block is coded with a sub-block coding mode (such as affine mode) or not.
    b. In one example, scaling matrices may be signaled for affine and non-affine modes separately.
    c. In one example, scaling matrix selection may depend on the block is coded with affine intra prediction mode or not.
7. Instead of disabling scaling matrices for secondary transform coded blocks, it is proposed to enable scaling matrices. Suppose the transform block size is denoted by K×L, and secondary transform is applied to the top-left M×N block.
    a. Scaling matrices may be signaled in tile group header/slice header/PPS/VPS/SPS for secondary transform or/and reduced secondary transform or/and rotation transform.
    b. In one example, scaling matrices may be selected according to whether secondary transform is applied or not.
        i. In one example, elements of a scaling matrix for the top-left M×N block may be signaled separately for the secondary transform is applied or not.
    c. Alternatively, furthermore, scaling matrices may be only applicable to regions which secondary transform is not applied.
    d. In one example, the remaining part except the top-left M×N region could still apply scaling matrices.
    e. Alternatively, scaling matrices may be only applicable to regions where secondary transform is applied.
8. Instead of deriving scaling matrices for non-square blocks from square blocks, it is proposed to signal scaling matrices for non-square blocks.
    a. In one example, scaling matrices for non-square blocks may be coded with prediction from square blocks may be enabled.
9. It is proposed to disable usage of scaling matrix for some positions and enable usage of scaling matrix for remaining positions within a block.
    a. For example, for a block contains more than M*N positions, only the top-left M*N region may use scaling matrices.
    b. For example, for a block contains more than M*N positions, only the top M*N positions may use scaling matrices.
    c. For example, for a block contains more than M*N positions, only the left M*N positions may use scaling matrices.
10. How many elements in a scaling matrix to be signaled may be dependent on whether zeroing-out is applied.
    a. In one example, for the 64×64 transform, suppose only the top-left M×N transform coefficients are kept and all the remaining coefficients are zeroing-out. Then the number of elements to be signaled may be derived as M/8*N/8.
11. For transforms with zeroing-out, it is proposed to disable signaling of elements in a scaling matrix located at the zeroing-out region. Suppose for the K×L transform, only the top-left M×N transform coefficients are kept and all the remaining coefficients are zeroing-out.
   a. In one example, K=L=64, and M=N=32.
   b. In one example, signaling of the elements in a scaling matrix corresponding to locations outside of the top-left M×N region are skipped.
   FIG. 10 shows an example of only selected elements in the dashed region (e.g., the M×N region) are signaled.
   c. In one example, the sub-sampling ratio for selecting elements in a scaling matrix may be determined by K and/or L.
      i. For example, the transform block is split to multiple sub-regions and each sub-region size is Uw*Uh. One element located within each sub-region of the top-left M×N region may be signaled.
      ii. Alternatively, furthermore, how many elements to be coded may depend on the M and/or N.
         1) In one example, how many elements to be coded for such K×L transforms with zeroing-out is different from that for a M×N transform block without zeroing-out.
   d. In one example, the sub-sampling ratio for selecting elements in a scaling matrix may be determined by M and/or N instead of K and L.
      i. For example, the M×N region is split to multiple sub-regions. One element within each (M/Uw, N/Uh) region may be signaled.
      ii. Alternatively, furthermore, how many elements to be coded for such K×L transforms with zeroing-out is the same as that for a M×N transform block without zeroing-out.
   e. In one example, K=L=64, M=N=32, Uw=Uh=8.
12. It is proposed to use only one quantization matrix for certain block sizes, such as for small size blocks.
   a. In one example, all blocks smaller than W×H, regardless of block type, may not be allowed to use two or more quantization matrices.
   b. In one example, all blocks with width smaller than a threshold, may not be allowed to use two or more quantization matrices.
   c. In one example, all blocks with height smaller than a threshold, may not be allowed to use two or more quantization matrices.
   d. In one example, quantization matrix may be not applied for small size blocks.
13. The above bullets may be applicable to other coding methods that do not apply transform (or do not apply Identity transform).
   a. In one example, the above bullets may be applicable to palette mode coded blocks by replacing 'TS/BDPCM/QR-BDPCM' by 'Palette'.

5. Embodiments 5.1. Embodiment #1 on Deblocking Filter

The changes on top of VVC working draft version 5 are highlighted in bold italicized text. One or multiple of highlighted conditions may be added.

8.8.2 Deblocking Filter Process 8.8.2.1 General

Inputs to this process are the reconstructed picture prior to deblocking, i.e., the array $recPicture_L$ and, when ChromaArrayType is not equal to 0, the arrays $recPicture_{Cb}$ and $recPicture_{Cr}$.

Outputs of this process are the modified reconstructed picture after deblocking, i.e., the array $recPicture_L$ and, when ChromaArrayType is not equal to 0, the arrays $recPicture_{Cb}$ and $recPicture_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding sub-block edges and transform block edges of a picture, except the following types of edges:

Edges that are at the boundary of the picture,

Edges that coincide with the virtual boundaries of the picture when pps_loop_filter_across_virtual_boundaries_disabled_flag is equal to 1, Edges that coincide with brick boundaries when loop_filter_across_bricks_enabled_flag is equal to 0, Edges that coincide with upper or left boundaries of slices with slice_loop_filter_across_slices_enabled_flag equal to 0 or slice_deblocking_filter_disabled_flag equal to 1, Edges within slices with slice_deblocking_filter_disabled_flag equal to 1, Edges that do not correspond to 8×8 sample grid boundaries of the considered component, Edges within chroma components for which both sides of the edge use inter prediction, Edges of chroma transform blocks that are not edges of the associated transform unit.

Edges across the luma transform blocks of a coding unit that has an IntraSubPartitionsSplit value not equal to ISP_NO_SPLIT.

Edges is between two transform skip coded blocks.

Edges is between one transform skip coded block and one PCM coded block.

Edges is between one transform skip coded block and one QR-BDPCM coded block.

Edges is between one transform skip coded block and one BDPCM coded block.

Edges is between one PCM coded block and one QR-BDPCM coded block.

5.2. Embodiment #2 on Scaling Matrix

This section provides an example of bullet 11.d in section 4.

The changes on top of JVET-N0847 are highlighted in bold italicized text and removed text are marked with ~~strikethrough~~. One or multiple of highlighted conditions may be added.

The elements of the quantization matrix of size 64×64, ScalingFactor[6][matrixId][ ][ ], are derived as follows:

ScalingFactor[6][6][matrixId][x*~~4~~ *8* +k][y*~~4~~ *8* +j]= ScalingList[6][matrixId][i]     (7-XX)

with i=0 ... 63, j=0 ... 3~~7~~, k=0 ... 3~~7~~, matrixId=0, 3, x=DiagScanOrder[3][3][i][0], and y=DiagScanOrder[3][3][i][1]

In addition,

ScalingFactor[6][6][matrixId][x][y]=0     (7-xx)

with x>=32||y>=32

ScalingFactor[6][6][matrixId][0][0]=scaling_list_dc_coef_minus8[2][matrixId]+8     (7-XX)

with matrixId=0, 3

//zeroing-out cases

A quantization matrix with rectangular size shall be zeroed out for the samples satisfying to the following conditions ~~x>32~~ ~~y>32~~ the decoded tu is not coded by default transform mode, (1<<sizeIdW)==32 and x>16 the decoded tu is not coded by default transform mode, (1<<sizeIdH)==32 and y>16

5.3. Embodiment #3 on Scaling Matrix

This section provides an example of bullets 9, 11.c in section 4.

The changes on top of JVET-N0847 are highlighted in bold italicized text and removed text are marked with ~~strikethrough~~. One or multiple of highlighted conditions may be added.

7.3.2.11 Scaling List Data Syntax

The elements of the quantization matrix of size 64×64, ScalingFactor[6][matrixId][ ][ ], are derived as follows:

ScalingFactor[6][6][matrixId][x*8+k][y*8+j]=ScalingList[6][matrixId][i]     (7-XX)

with i=0 ... 16 ~~63~~, j=0 ... 7, k=0 ... 7, matrixId=0, 3, x=DiagScanOrder[3][3][i][1] and y=DiagScanOrder[3][3][i][1]

In addition,

ScalingFactor[6][6][matrixId][x][y]=0     (7-xx)

with x>=32||y>=32

ScalingFactor[6][6][matrixId][0][0]=scaling_list_dc_coef_minus8[2][matrixId]+8     (7-XX)

with matrixId=0, 3

//zeroing-out cases

A quantization matrix with rectangular size shall be zeroed out for the samples satisfying to the following conditions ~~x>32~~ ~~y>32~~ the decoded tu is not coded by default transform mode, (1<<sizeIdW)==32 and x>16 the decoded tu is not coded by default transform mode, (1<<sizeIdH)==32 and y>16

5.4. Embodiment #4 on Scaling Matrix

This section provides an example of disallowing scaling matrix for QR-BDPCM coded blocks.

The changes on top of NET-N0847 are highlighted in bold italicized text and removed text are marked with ~~strikethrough~~. One or multiple of highlighted conditions may be added.

8.7.3 Scaling Process for Transform Coefficients

Inputs to this process are:

- a luma location (xTbY, yTbY) specifying the top-left sample of the current luma transform block relative to the top-left luma sample of the current picture,
- a variable nTbW specifying the transform block width,
- a variable nTbH specifying the transform block height,

| scaling_list_data( ) { | Descriptor |
|---|---|
|   for( sizeId = 1; sizeId < 7; sizeId++ ) | |
|     for( matrixId = 0; matrixId < 6; matrixId ++ ) { | |
|       if( ! ( ( ( sizeId == 1) && ( matrixId % 3 == 0 ) ) || ( ( sizeId == 6 ) && (matrixId % 3 != 0 ) ) ) ) { | |
|         scaling_list_pred_mode_flag[ sizeId ][ matrixId ] | u(1) |
|         if( !scaling_list_pred_mode_flag[ sizeId ][ matrixId ]) | |
|           scaling_list_pred_matrix_id_delta[ sizeId ][ matrixId ] | ue(v) |
|         else{ | |
|           nextCoef = 8 | |
|           coefNum = 6 ? 16: Min( 64, ( 1 << ( sizeId << 1 ) ) ) | |
|           if( sizeId > 3 ) { | |
|             scaling_list_dc_coef_minus8[ sizeId − 4 ][ matrixId ] | se(v) |
|             nextCoef = scaling_list_dc_coef_minus8[ sizeId − 4 ][ matrixId ] + 8 | |
|           } | |
|           for( i = 0; i < coefNum; i++ ) { | |
|             x = DiagScanOrder[ 3 ][ 3 ][ i ][ 0 ] | |
|             y = DiagScanOrder[ 3 ][ 3 ][ i ][ 1 ] | |
|             if ( !(sizeId==6 && x>=4 && y>=4) ) { | |
|               scaling_list_delta_coef | se(v) |
|               nextCoef = ( nextCoef + scaling_list_delta_coef + 256) % 256 | |
|               ScalingList[ sizeId ][ matrixId ][ i ] = nextCoef | |
|             } | |
|           } | |
|         } | |
|       } | |
|     } | |
|   } | |
| } | | a variable cIdx specifying the colour component of the current block, a variable bitDepth specifying the bit depth of the current colour component.

Output of this process is the (nTbW)×(nTbH) array d of scaled transform coefficients with elements d[x][y].

The quantization parameter qP is derived as follows:—

If cIdx is equal to 0, the following applies:

$$qP=Qp'_Y \qquad (8\text{-}1019)$$

Otherwise, if cIdx is equal to 1, the following applies:

$$qP=Qp'_{Cb} \qquad (8\text{-}1020)$$

Otherwise (cIdx is equal to 2), the following applies:

$$qP=Qp'_{Cr} \qquad (8\text{-}1021)$$

The variable rectNonTsFlag is derived as follows:

$$rectNonTsFlag=(((Log\ 2(nTbW)+Log\ 2(nTbH))\& \\ 1)==1\ \&\&\ transform\_skip\_flag[xTbY][yTbY]==0) \qquad (8\text{-}1022)$$

The variables bdShift, rectNorm and bdOffset are derived as follows:

$$bdShift=bitDepth+((rectNonTsFlag?8:0)+(Log\ 2(nTbW)+Log\ 2(nTbH))/2)-5+dep\_quant\_enabled\_flag \qquad (8\text{-}1023)$$

$$rectNorm=rectNonTsFlag?181:1 \qquad (8\text{-}1024)$$

$$bdOffset=(1<<bdShift)>>1 \qquad (8\text{-}1025)$$

The list levelScale[ ] is specified as levelScale[k]={40, 45, 51, 57, 64, 72} with k=0 . . . 5.

For the derivation of the scaled transform coefficients d[x][y] with x=0 . . . nTbW−1, y=0 . . . nTbH−1, the following applies:

The intermediate scaling factor m[x][y] is derived as follows:

If one or more of the following conditions are true, m[x][y] is set equal to 16:
scaling_list_enabled_flag is equal to 0.
transform_skip_flag[xTbY][yTbY] is equal to 1.
bdpcm_flag[xTbY][yTbY] is equal to 1.

Otherwise, the following applies:

$$m[x][y]=ScalingFactor[sizeIdW][sizeIdH][matrixId][x][y] \qquad (8\text{-}XXX)$$

Where sizeIdW is set equal to Log 2(nTbW), sizeIdH is set equal to Log 2(nTbH) and matrixId is specified in Table 7-14.

The scaling factor ls[x][y] is derived as follows:

If dep_quant_enabled_flag is equal to 1, the following applies:

$$ls[x][y]=(m[x][y]*levelScale[(qP+1)\%\ 6])<<((qP+1)/6) \qquad (8\text{-}1026)$$

Otherwise (dep_quant_enabled_flag is equal to 0), the following applies:

$$ls[x][y]=(m[x][y]*levelScale[qP\%\ 6])<<(qP/6) \qquad (8\text{-}1027)$$

The value dnc[x][y] is derived as follows:

$$dnc[x][y]=(TransCoeffLevel[xTbY][yTbY][cIdx][x][y]*ls[x][y]*rectNorm+bdOffset)>>bdShift \qquad (8\text{-}1028)$$

The scaled transform coefficient d[x][y] is derived as follows:

$$d[x][y]=Clip3(CoeffMin,CoeffMax,dnc[x][y]) \qquad (8\text{-}1029)$$

5.5. Embodiment #5 on Semantics of Transform Skip Flag transform_skip_flag[x0][y0] specifies whether a transform is applied to the luma transform block or not. The array indices x0, y0 specify the location (x0, y0) of the top-left luma sample of the considered transform block relative to the top-left luma sample of the picture. transform_skip_flag[x0][y0] equal to 1 specifies that no transform is applied to the luma transform block. transform_skip_flag[x0][y0] equal to 0 specifies that the decision whether transform is applied to the luma transform block or not depends on other syntax elements. When transform_skip_flag[x0][y0] is not present and bdpcm_flag[x0][y0] is equal to 0, it is inferred to be equal to 0. When transform_skip_flag[x0][y0] is not present and bdpcm_flag[x0][y0] is equal to 1, it is inferred to be equal to 0.

Figure 11:
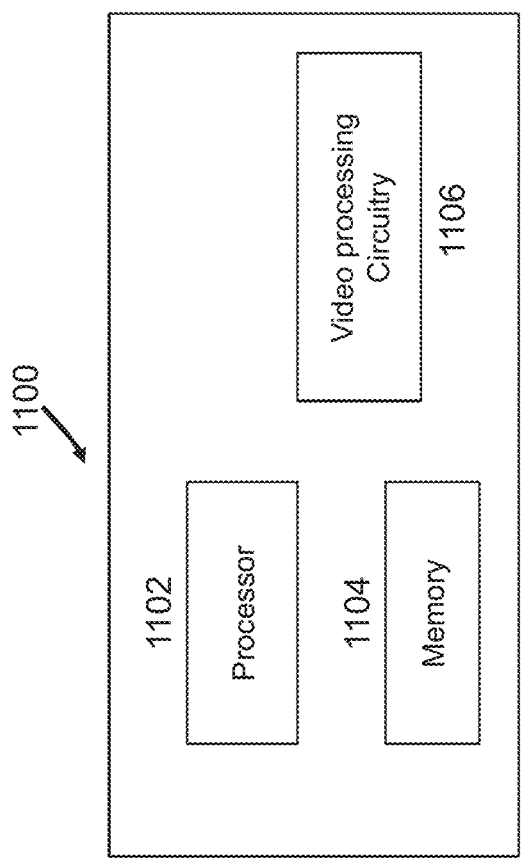
FIG. 11 is a block diagram of an example of a video processing hardware platform.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present disclosure. The memory (memories) 1104 may be used for storing data and code used for implementing the methods and techniques described herein. The video processing hardware 1106 may be used to implement, in hardware circuitry, some techniques described in the present disclosure.

The following solutions may be implemented as preferred solutions in some embodiments.

The following solutions may be implemented together with additional techniques described in items listed in the previous section (e.g., item 1).

Figure 12:
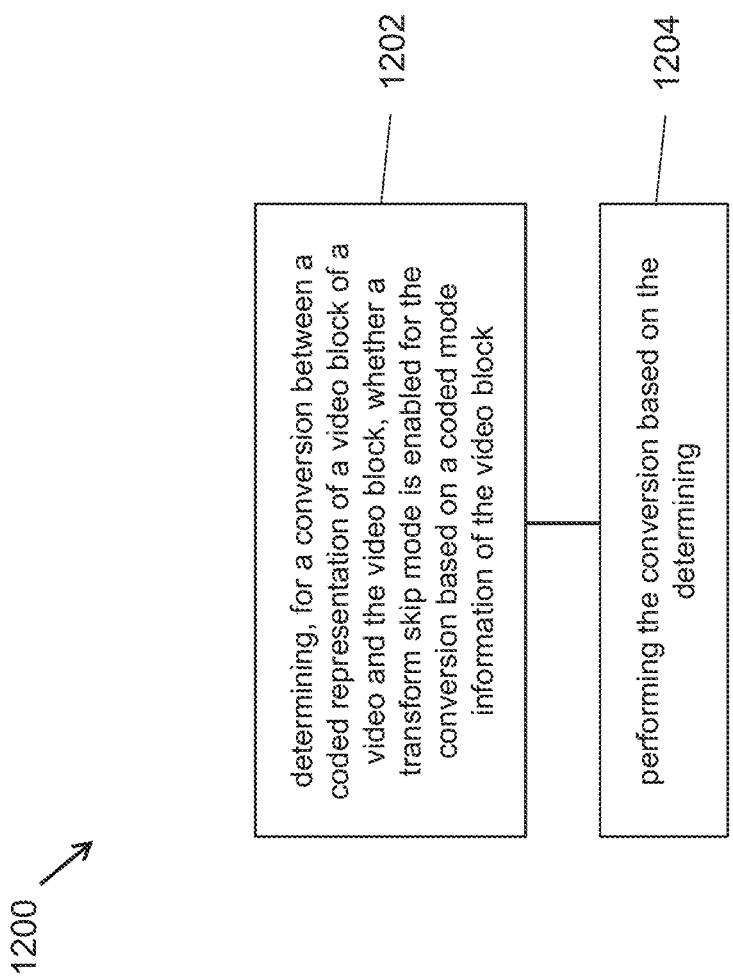
FIG. 12 is a flowchart of an example method of video processing.

1. A method of video processing (e.g., method 1200 depicted in FIG. 12), comprising: determining (1202), for a conversion between a coded representation of a video block of a video and the video block, based on a coded mode information, whether a transform skip mode is enabled for the conversion; and performing (1204) the conversion based on the determining; wherein, in the transform skip mode, application of a transform to at least some coefficients representing the video block is skipped during the conversion.

2. The method of solution 1, wherein the transform skip mode is determined to be enabled due to the coded mode information indicating a block differential pulse code modulation (BDPCM) or a quantized residual BDPCM (QR-BDPCM) mode.

3. The method of solution 1, wherein a flag in the coded representation indicating the transform skip mode is not parsed.

4. The method of solution 1, wherein a flag in the coded representation indicating the transform skip mode is skipped from parsing.

The following solutions may be implemented together with additional techniques described in items listed in the previous section (e.g., item 2).

5. A method of video processing, comprising: determining to use a scaling matrix for a conversion between a coded representation of a video block and the video block due to a use of a block differential pulse code modulation (BDPCM) or a quantized residual BDPCM (QR-BDPCM) mode for the conversion; and performing the conversion using the scaling matrix; wherein the scaling matrix is used to scale at least some coefficients representing the video block during the conversion.

6. The method of solution 5, wherein the conversion includes applying the scaling matrix according to a mode that is dependent on a number of transforms applied to the coefficients during the conversion.

7. A method of video processing, comprising: determining to disable use of a scaling matrix for a conversion between a coded representation of a video block and the video block due to a use of a block differential pulse code modulation (BDPCM) or a quantized residual BDPCM (QR-BDPCM) mode for the conversion; and performing the conversion using the scaling matrix; wherein the scaling matrix is used to scale at least some coefficients representing the video block during the conversion.

The following solutions may be implemented together with additional techniques described in items listed in the previous section (e.g., item 3).

8. A method of video processing, comprising: determining, for a conversion between a coded representation of a video block of a video and the video block, an applicability of an in-loop filter depending on whether a transform skip mode is enabled for the conversion; and performing the conversion based on the applicability of the in-loop filter; wherein, in the transform skip mode, application of a transform to at least some coefficients representing the video block is skipped during the conversion.

9. The method of solution 8, wherein the in-loop filter comprises a de-blocking filter.

10. The method of any of solutions 8-9, further including, determining a strength of the in-loop filter based on the transform skip mode of the video block and another transform skip mode of a neighboring block.

11. The method of any of solutions 8-9, wherein the determining includes determining that the in-loop filter is not applicable due to the transform skip mode being disabled for the video block.

The following solutions may be implemented together with additional techniques described in items listed in the previous section (e.g., items 4 and 5).

12. A method of video processing, comprising: selecting a scaling matrix for a conversion between video blocks of a video and a coded representation of the video blocks such that a same scaling matrix is selected for inter coding and intra block copy coding based conversion, and performing the conversion using the selected scaling matrix, wherein the scaling matrix is used to scale at least some coefficients of the video blocks.

The following solutions may be implemented together with additional techniques described in items listed in the previous section (e.g., item 6).

13. A method of video processing, comprising: selecting a scaling matrix for a conversion between video blocks of a video and a coded representation of the video blocks based on a transform matrix selected for the conversion, and performing the conversion using the selected scaling matrix, wherein the scaling matrix is used to scale at least some coefficients of the video blocks and wherein the transform matrix is used to transform at least some coefficients of the video block during the conversion.

14. The method of solution 13, wherein the selecting the scaling matrix is based on whether the conversion of the video block uses a sub-block coding mode.

15. The method of solution 14, wherein the sub-block coding mode is an affine coding mode.

16. The method of solution 15, wherein the scaling matrix for the affine coding mode is different for another scaling matrix for another video block whose conversion does not use the affine coding mode.

The following solutions may be implemented together with additional techniques described in items listed in the previous section (e.g., item 7).

17. A method of video processing, comprising: selecting a scaling matrix for a conversion between video blocks of a video and a coded representation of the video blocks based on a secondary transform matrix selected for the conversion, and performing the conversion using the selected scaling matrix, wherein the scaling matrix is used to scale at least some coefficients of the video blocks and wherein the secondary transform matrix is used to transform at least some residual coefficients of the video block during the conversion.

18. The method of solution 17, wherein the secondary transform matrix is applied to an M×N top left portion of the video block, and wherein the scaling matrix is applied to more than the M×N top left portion of the video block.

19. The method of solution 17, wherein the secondary transform matrix is applied to an M×N top left portion of the video block, and wherein the scaling matrix is applied only to the M×N top left portion of the video block.

20. The method of any of solution 17-19, wherein a syntax element in the coded representation indicates the scaling matrix.

The following solutions may be implemented together with additional techniques described in items listed in the previous section (e.g., item 8).

21. A method of video processing, comprising: determining, for a video block that has a non-square shape, a scaling matrix for use in a conversion between the video block and a coded representation of the video block, wherein a syntax element in the coded representation signals the scaling matrix; and performing the conversion based on the scaling matrix, wherein the scaling matrix is used to scale at least some coefficients of the video blocks during the conversion.

22. The method of solution 21, wherein the syntax element predictively codes the scaling matrix from a previous square block's scaling matrix.

The following solutions may be implemented together with additional techniques described in items listed in the previous section (e.g., item 9).

23. A method of video processing, comprising: determining that a scaling matrix is to be applied partially during a conversion between a coded representation of a video block and the video block; and performing the conversion based by partially applying the scaling matrix such that the scaling matrix is applied in a first set of positions and disabled at remaining positions in the video block.

24. The method of solution 23, wherein the first set of positions comprises top-left M*N positions of the video block.

25. The method of solution 23, wherein the first set of positions comprises top M*N positions of the video block.

26. The method of solution 23, wherein the first set of positions comprises left M*N positions of the video block.

The following solutions may be implemented together with additional techniques described in items listed in the previous section (e.g., items 10 and 11).

27. A method of video processing, comprising: determining that a scaling matrix is to be applied during a conversion between a coded representation of a video block and the video block; and performing the conversion based on the scaling matrix; wherein the coded representation signals a number of elements of the scaling matrix, wherein the number depends on application of coefficient zeroing out in the conversion.

28. The method of solution 27, wherein the conversion includes zeroing out all but top-left M×N positions of the video block, and wherein the number is M/8*N/8.

The following solutions may be implemented together with additional techniques described in items listed in the previous section (e.g., item 11).

29. The method of solutions 27-28, wherein the number depends on a transform matrix used during the conversion.

30. The method of solution 29, wherein the transform matrix is of size K×L and wherein only top M×N coefficients are not zeroed out.

31. The method of any of solutions 27-30, wherein the scaling matrix is applied by sub-sampling by a factor determined from K or L.

The following solutions may be implemented together with additional techniques described in items listed in the previous section (e.g., item 12).

32. A method of video processing, comprising: determining, during a conversion between a video block and a coded representation of the video block, a single quantization matrix to use based on a size of the video block being of a specific type; and performing the conversion using the quantization matrix.

33. The method of solution 32, wherein the size of the video block is smaller than W×H, where W and H are integers.

34. The method of any of solutions 32-33, wherein a width of the video block is smaller than a threshold.

35. The method of any of solutions 32-33, wherein a height of the video block is smaller than a threshold.

36. The method of solution 32, wherein the quantization matrix is an identity quantization matrix that does not affect quantized values.

37. The method of any of solutions 1 to 36, wherein the conversion comprises encoding the video into the coded representation.

38. The method of any of solutions 1 to 36, wherein the conversion comprises decoding the coded representation to generate pixel values of the video.

39. A video decoding apparatus comprising a processor configured to implement a method recited in one or more of solutions 1 to 38.

40. A video encoding apparatus comprising a processor configured to implement a method recited in one or more of solutions 1 to 38.

41. A computer program product having computer code stored thereon, the code, when executed by a processor, causes the processor to implement a method recited in any of solutions 1 to 38.

42. A method, apparatus or system described in the present disclosure.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 15:
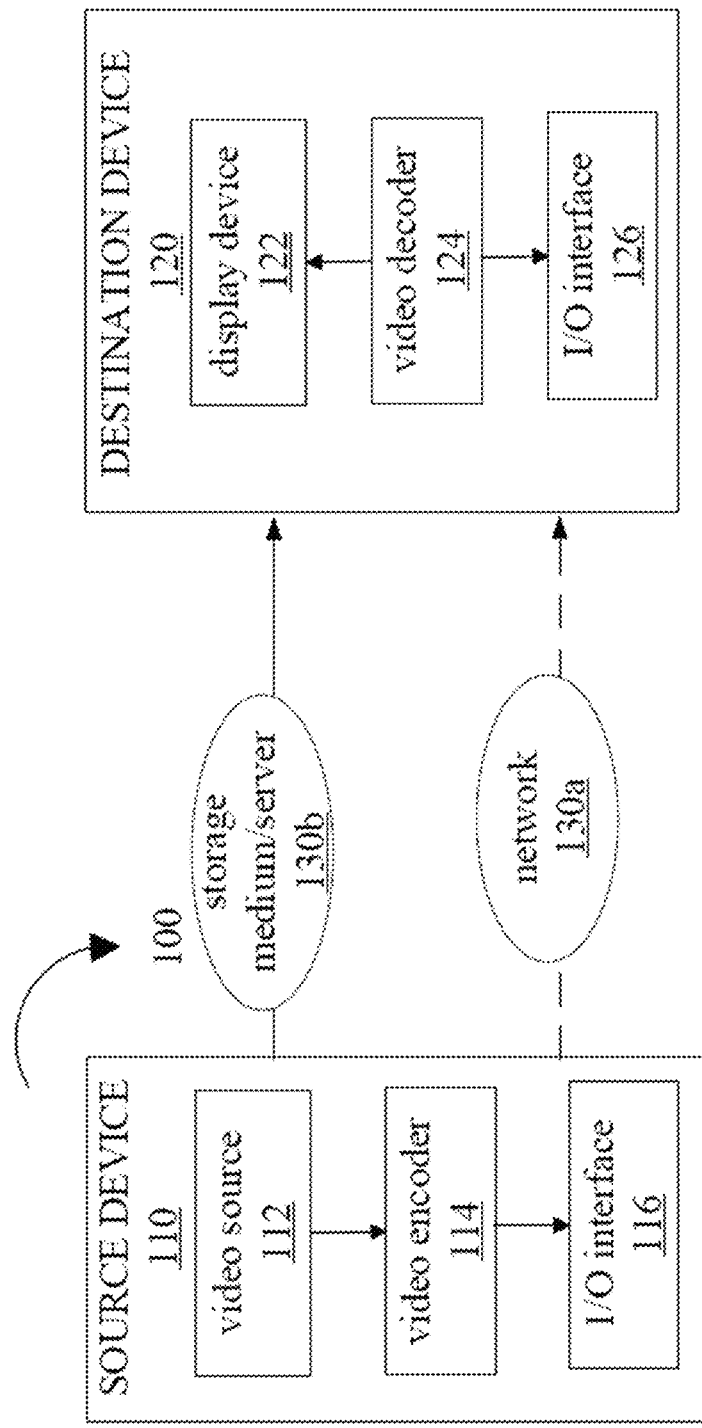
FIG. 15 is a block diagram that illustrates an example video coding system that may utilize the techniques of this disclosure.

FIG. 15 is a block diagram that illustrates an example video coding system 100 that may utilize the techniques of this disclosure. As shown in FIG. 15, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 16:
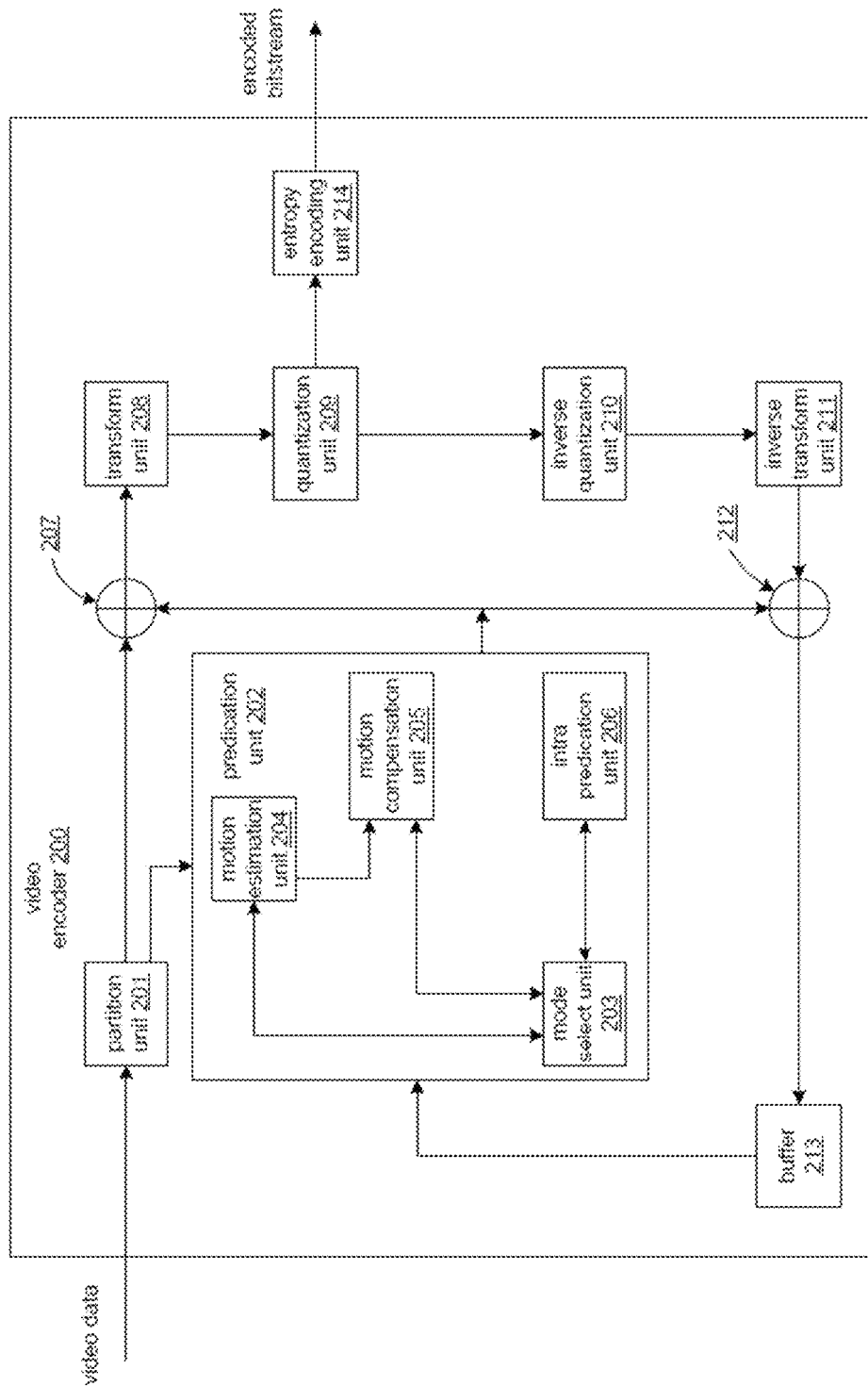
FIG. 16 is a block diagram illustrating an example of video encoder.

FIG. 16 is a block diagram illustrating an example of video encoder 200, which may be video encoder 114 in the system 100 illustrated in FIG. 15.

Video encoder 200 may be configured to perform any or all of the techniques of this disclosure. In the example of FIG. 16, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 16 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 13:
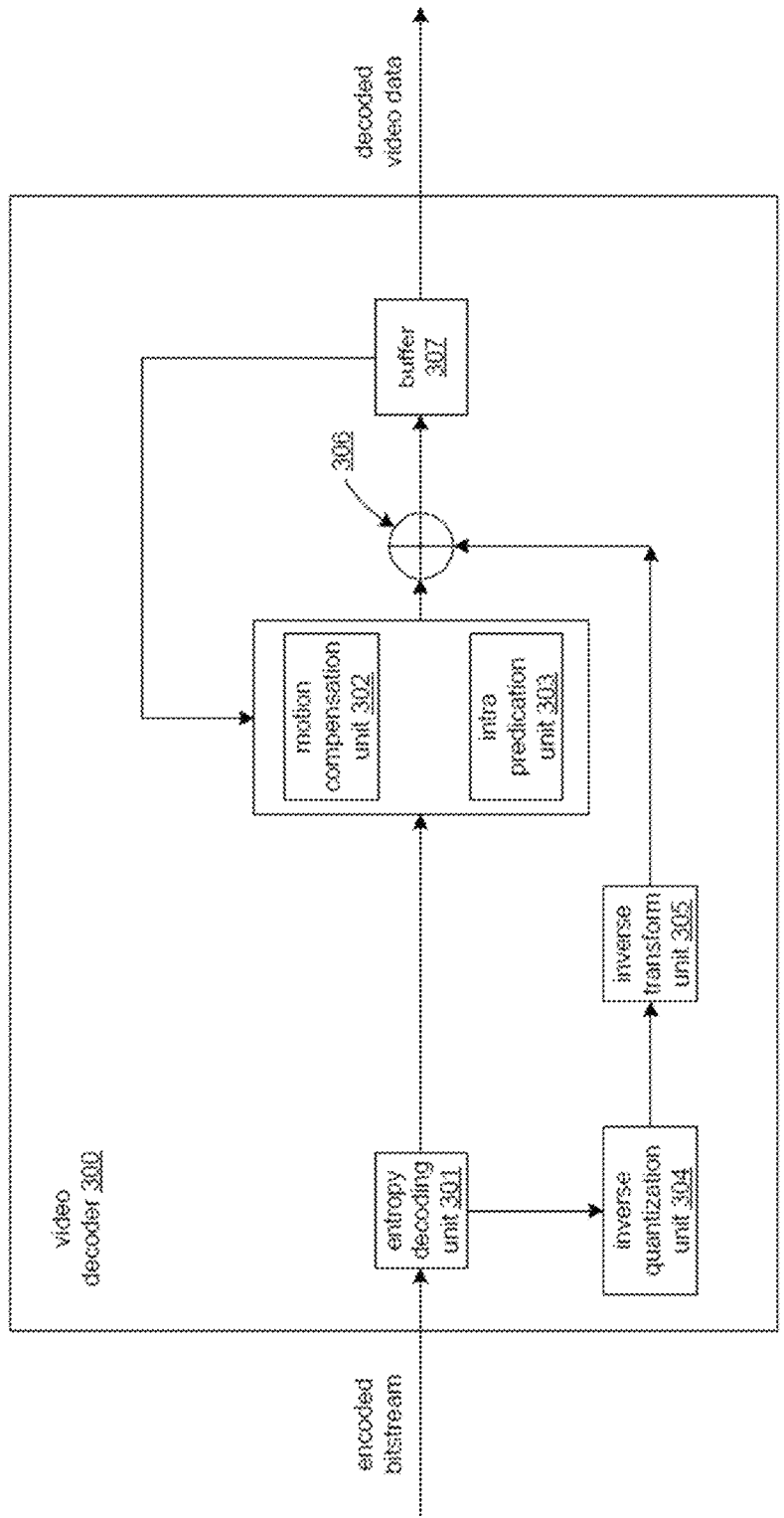
FIG. 13 is a block diagram illustrating an example of video decoder.

FIG. 13 is a block diagram illustrating an example of video decoder 300 which may be video decoder 114 in the system 100 illustrated in FIG. 15.

The video decoder 300 may be configured to perform any or all of the techniques of this disclosure. In the example of FIG. 13, the video decoder 300 includes a plurality of functional components. The techniques described in this disclosure may be shared among the various components of the video decoder 300. In some examples, a processor may be configured to perform any or all of the techniques described in this disclosure.

In the example of FIG. 13, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 16).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation, or coded representation, of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Figure 14:
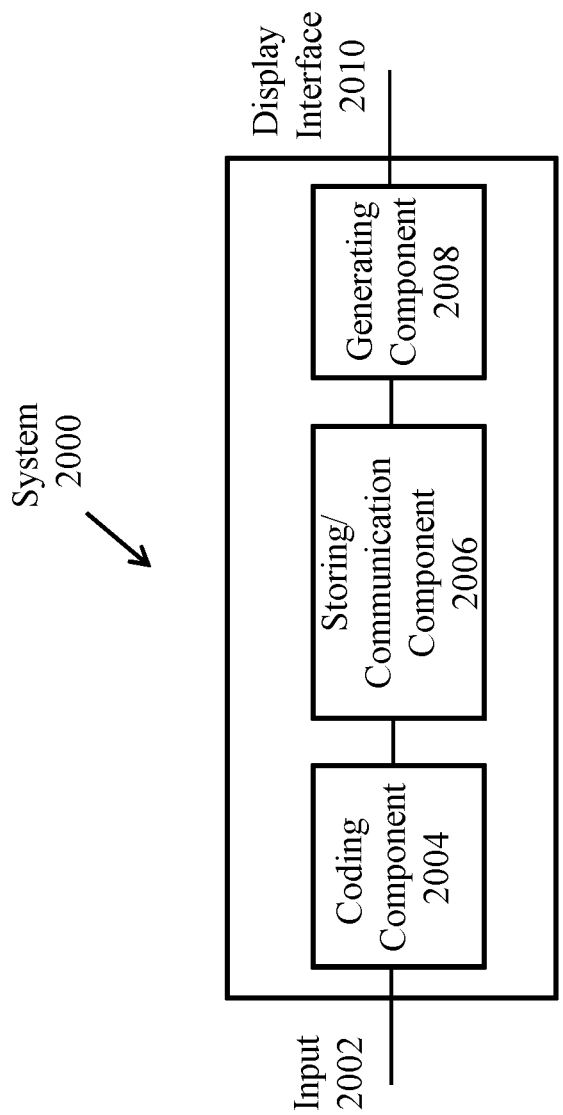
FIG. 14 is a block diagram showing an example video processing system in which various techniques disclosed herein may be implemented.

FIG. 14 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2000 may include a coding component 2004 that may implement the various coding or encoding methods described in the present disclosure. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 17:
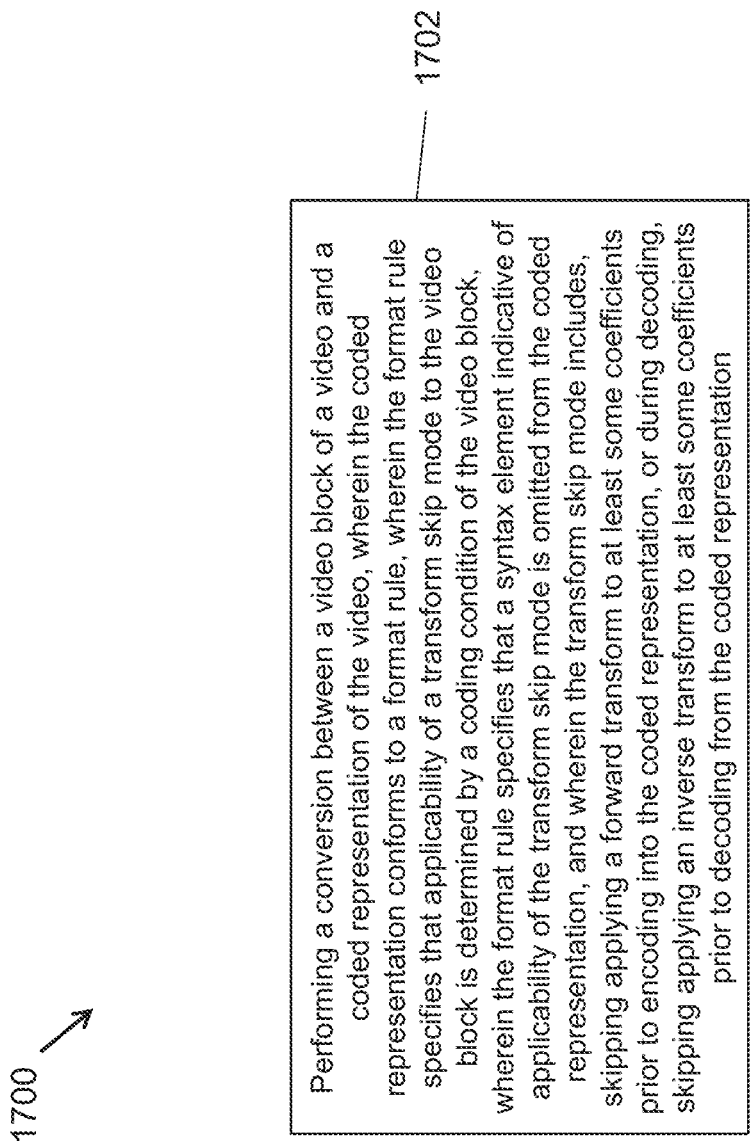
FIGS. 17-27 are flowcharts of example methods of video processing.

FIG. 17 is a flowchart of an example method 1700 of video processing. The method 1700 comprises performing (1702) a conversion between a video block of a video and a coded representation of the video, wherein the coded representation conforms to a format rule, wherein the format rule specifies that applicability of a transform skip mode to the video block is determined by a coding condition of the video block, wherein the format rule specifies that a syntax element indicative of applicability of the transform skip mode is omitted from the coded representation, and wherein the transform skip mode includes, skipping applying a forward transform to at least some coefficients prior to encoding into the coded representation, or during decoding, skipping applying an inverse transform to at least some coefficients prior to decoding from the coded representation.

Figure 18:
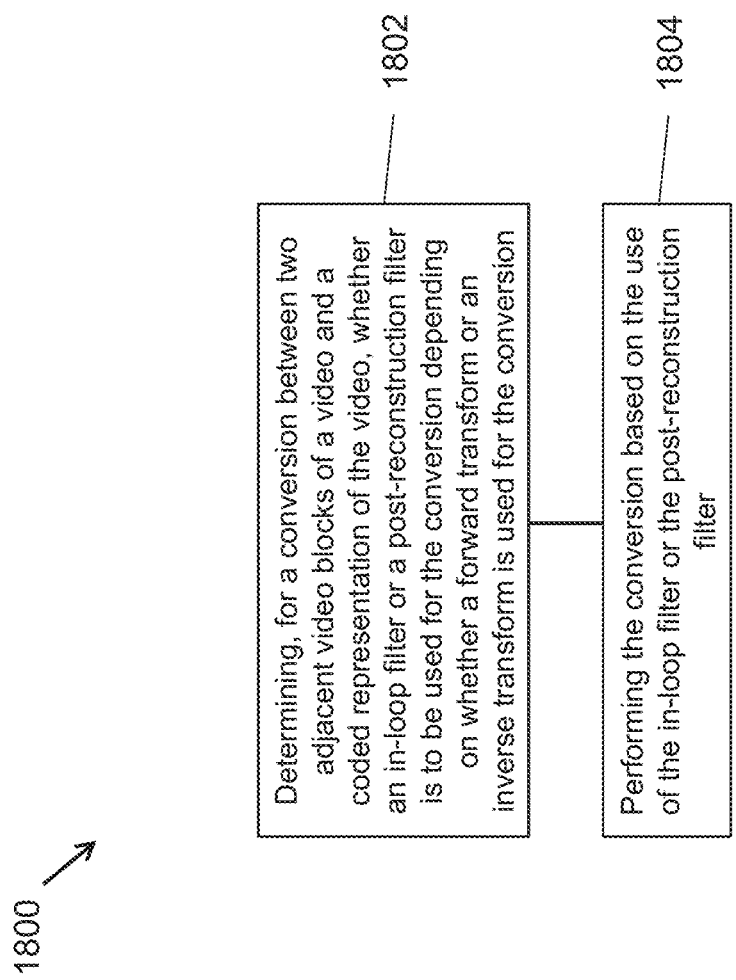

FIG. 18 is a flowchart of an example method 1800 of video processing. The method 1800 comprises determining (1802), for a conversion between two adjacent video blocks of a video and a coded representation of the video, whether an in-loop filter or a post-reconstruction filter is to be used for the conversion depending on whether a forward transform or an inverse transform is used for the conversion, wherein the forward transform includes, skipping applying the forward transform to at least some coefficients prior to encoding into the coded representation, or during decoding, skipping applying the inverse transform to at least some coefficients prior to decoding from the coded representation; and performing (1804) the conversion based on the use of the in-loop filter or the post-reconstruction filter.

Figure 19:
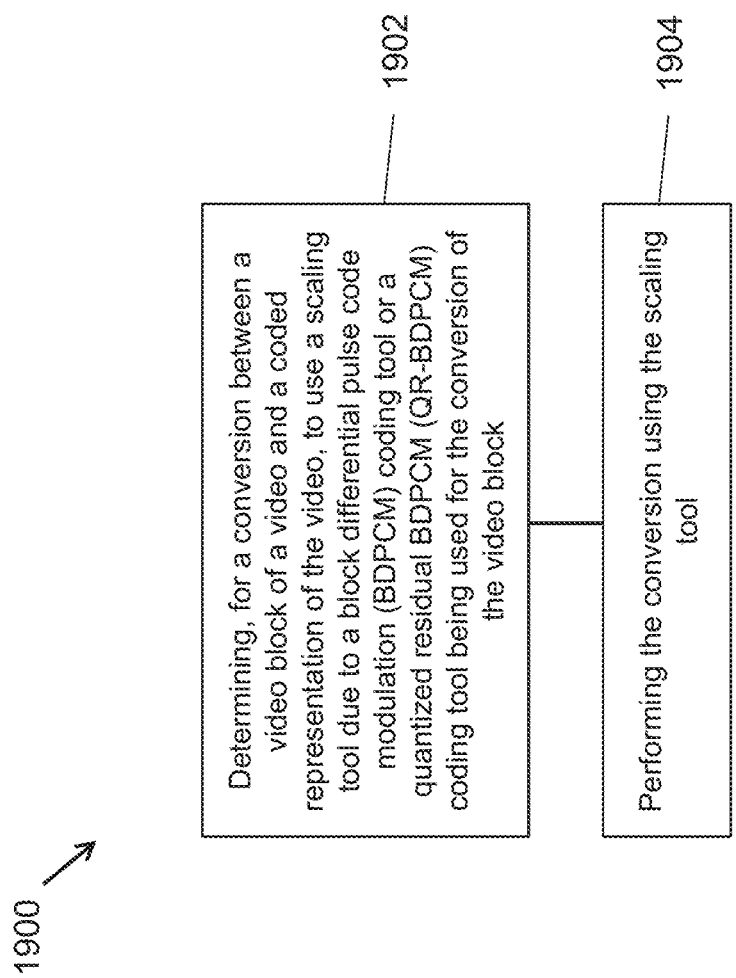

FIG. 19 is a flowchart of an example method 1900 of video processing. The method 1900 comprises determining (1902), for a conversion between a video block of a video and a coded representation of the video, to use a scaling tool due to a block differential pulse code modulation (BDPCM) coding tool or a quantized residual BDPCM (QR-BDPCM) coding tool being used for the conversion of the video block; and performing (1904) the conversion using the scaling tool, wherein a syntax element in the coded representation indicates use of the scaling tool, and wherein the use of the scaling tool comprises: scaling at least some coefficients representing the video block during encoding or descaling at least some coefficients from the coded representation during decoding.

Figure 20:
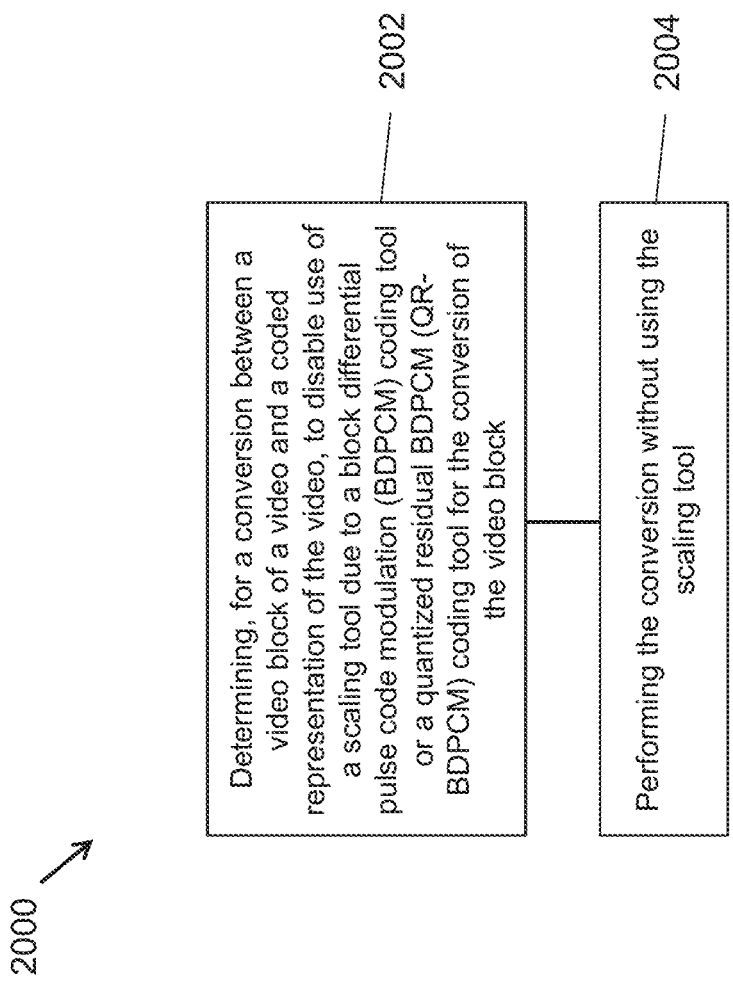

FIG. 20 is a flowchart of an example method 2000 of video processing. The method 2000 comprises determining (2002), for a conversion between a video block of a video and a coded representation of the video, to disable use of a scaling tool due to a block differential pulse code modulation (BDPCM) coding tool or a quantized residual BDPCM (QR-BDPCM) coding tool for the conversion of the video block; and performing (2004) the conversion without using the scaling tool, wherein the use of the scaling tool comprises: scaling at least some coefficients representing the video block during encoding or descaling at least some coefficients from the coded representation during decoding.

Figure 21:
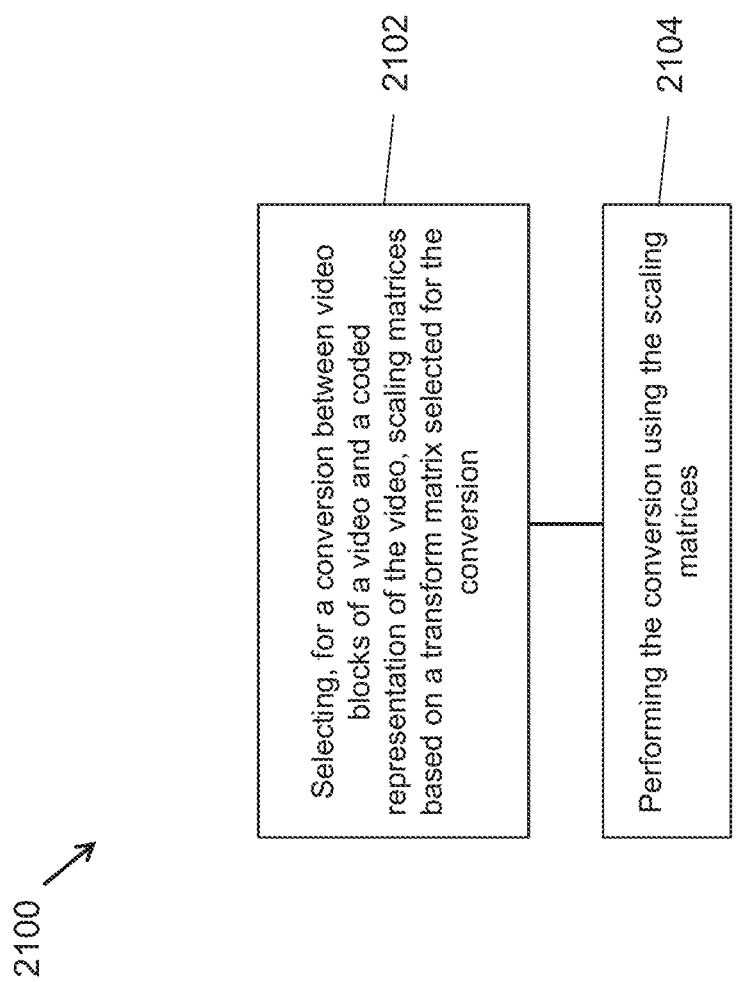

FIG. 21 is a flowchart of an example method 2100 of video processing. The method 2100 comprises selecting (2102), for a conversion between video blocks of a video and a coded representation of the video, scaling matrices based on a transform matrix selected for the conversion, wherein the scaling matrices are used to scale at least some coefficients of the video blocks, and wherein the transform matrices are used to transform the at least some coefficients of the video blocks during the conversion; and performing (2104) the conversion using the scaling matrices.

Figure 22:
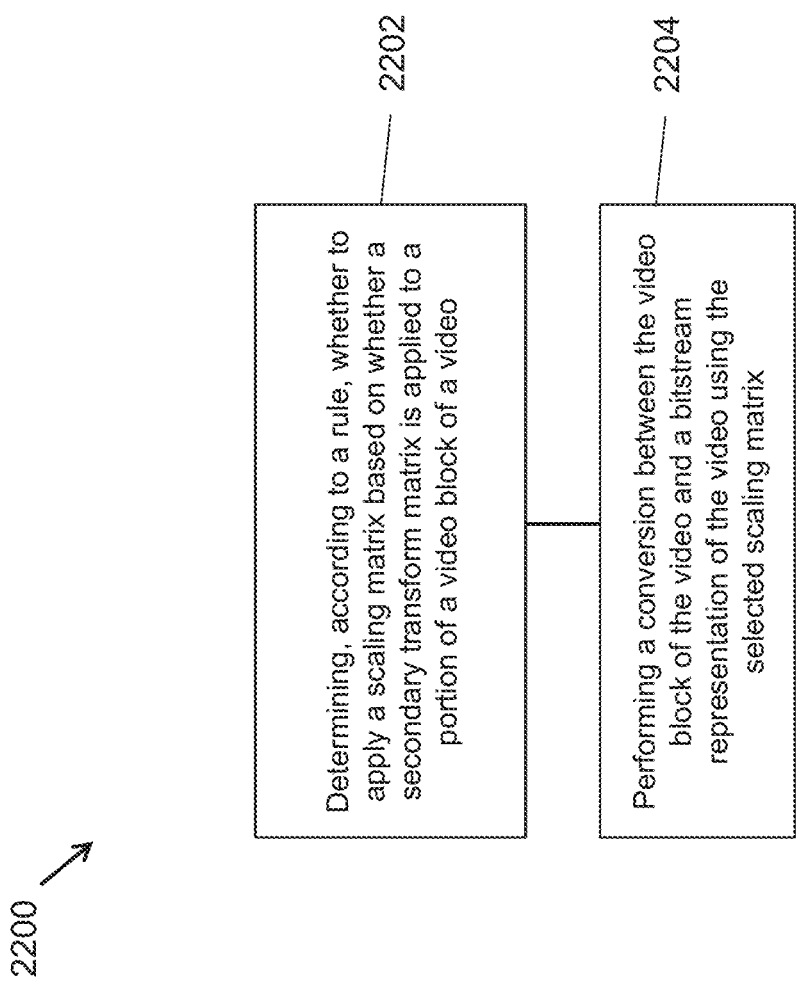

FIG. 22 is a flowchart of an example method 2200 of video processing. The method 2200 comprises determining (2202), according to a rule, whether to apply a scaling matrix based on whether a secondary transform matrix is applied to a portion of a video block of a video, wherein the scaling matrix is used to scale at least some coefficients of the video block, and wherein the secondary transform matrix is used to transform at least some residual coefficients of the portion of the video block during the conversion; and performing (2204) a conversion between the video block of the video and a bitstream representation of the video using the selected scaling matrix.

Figure 23:
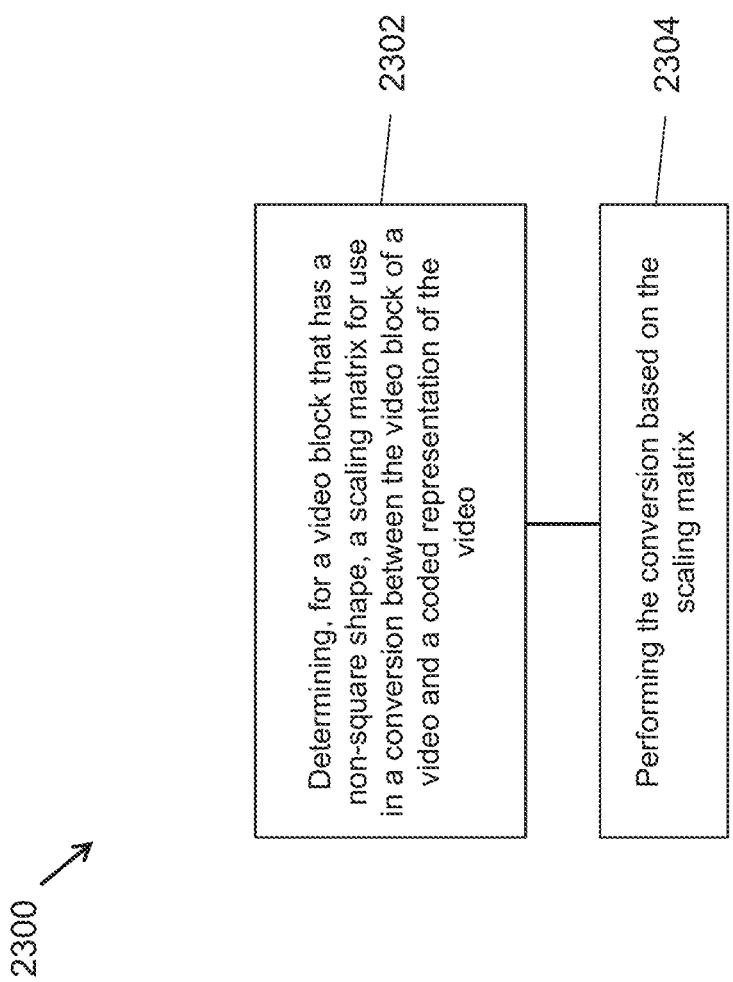

FIG. 23 is a flowchart of an example method 2300 of video processing. The method 2300 comprises determining (2302), for a video block that has a non-square shape, a scaling matrix for use in a conversion between the video block of a video and a coded representation of the video, wherein a syntax element in the coded representation signals the scaling matrix, and wherein the scaling matrix is used to scale at least some coefficients of the video blocks during the conversion; and performing (2304) the conversion based on the scaling matrix.

Figure 24:
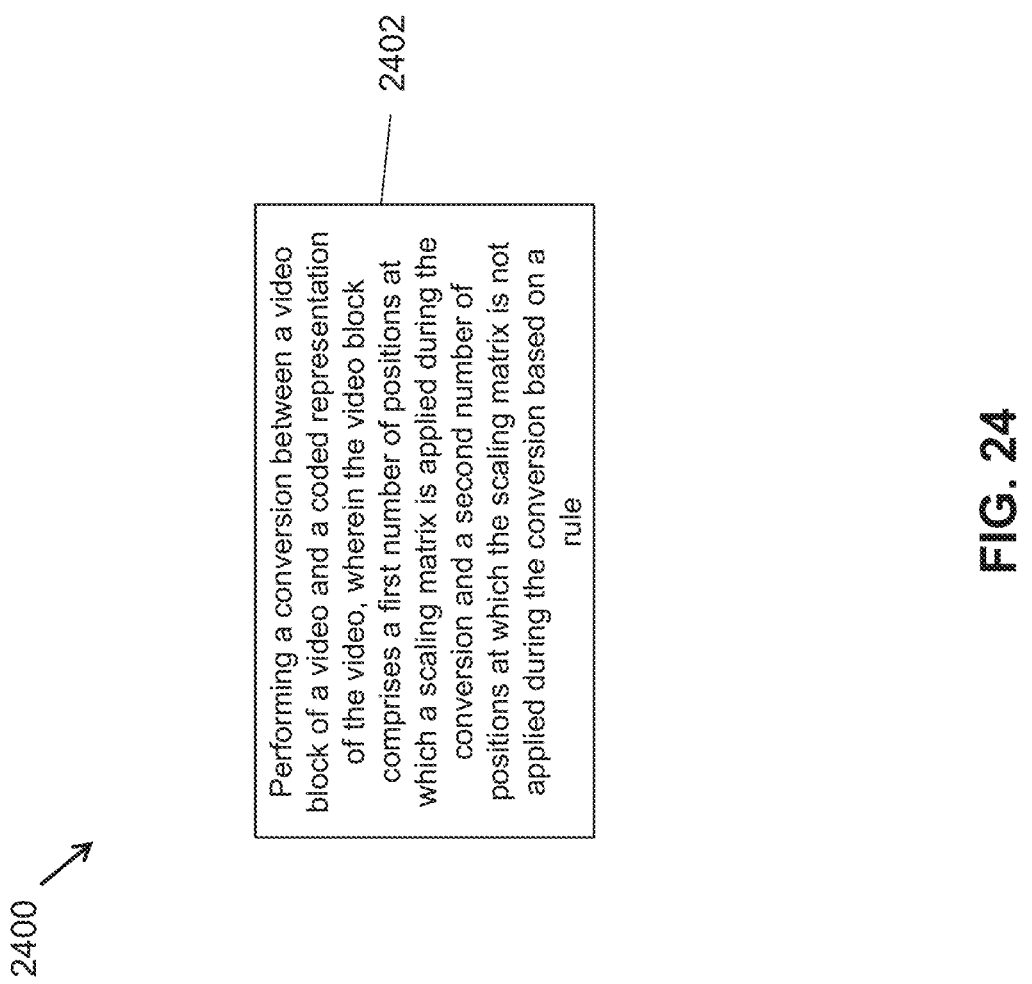

FIG. 24 is a flowchart of an example method 2400 of video processing. The method 2400 comprises performing (2402) a conversion between a video block of a video and a coded representation of the video, wherein the video block comprises a first number of positions at which a scaling matrix is applied during the conversion and a second number of positions at which the scaling matrix is not applied during the conversion based on a rule.

Figure 25:
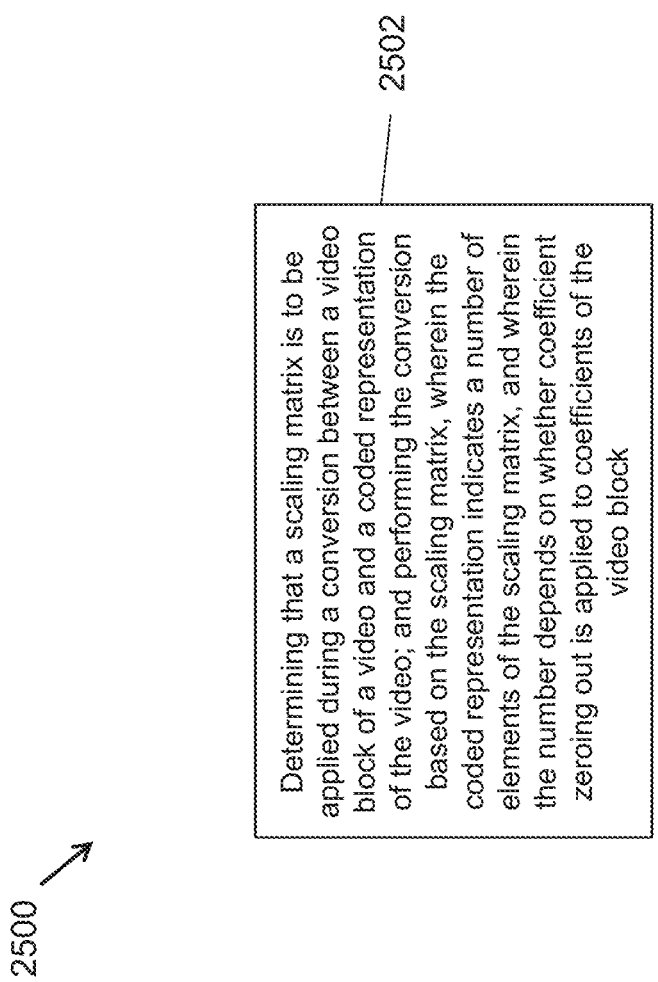

FIG. 25 is a flowchart of an example method 2500 of video processing. The method 2500 comprises determining (2502) that a scaling matrix is to be applied during a conversion between a video block of a video and a coded representation of the video; and performing the conversion based on the scaling matrix, wherein the coded representation indicates a number of elements of the scaling matrix, and wherein the number depends on whether coefficient zeroing out is applied to coefficients of the video block.

Figure 26:
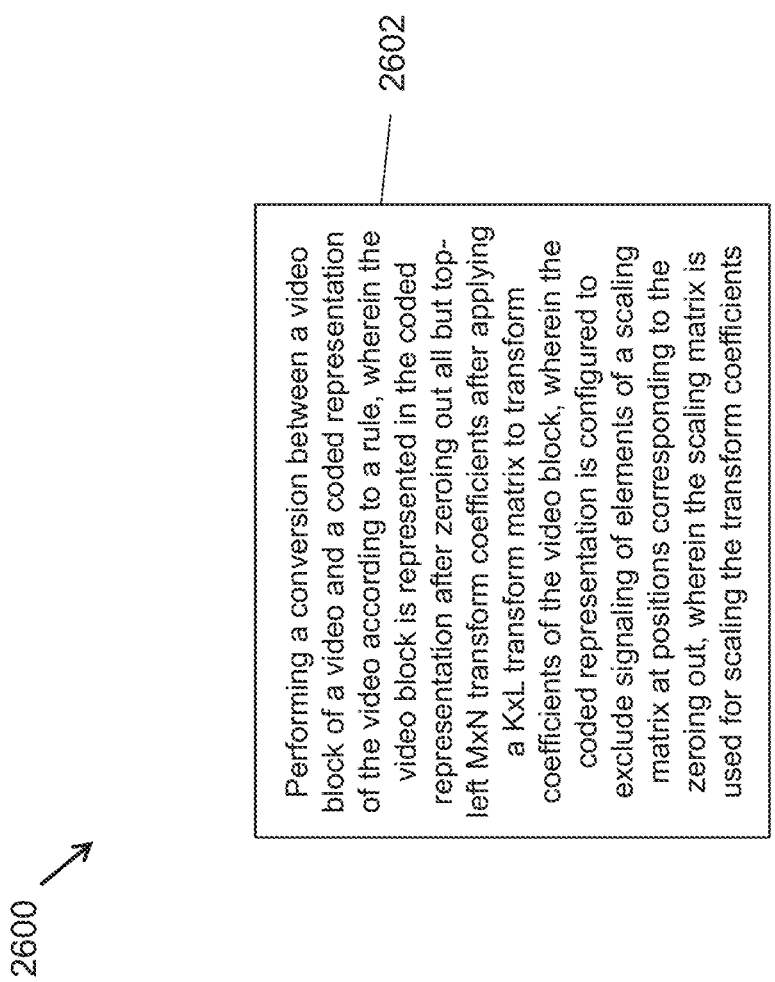

FIG. 26 is a flowchart of an example method 2600 of video processing. The method 2600 comprises performing (2602) a conversion between a video block of a video and a coded representation of the video according to a rule, wherein the video block is represented in the coded representation after zeroing out all but top-left M×N transform coefficients after applying a K×L transform matrix to transform coefficients of the video block, wherein the coded representation is configured to exclude signaling of elements of a scaling matrix at positions corresponding to the zeroing out, wherein the scaling matrix is used for scaling the transform coefficients.

Figure 27:
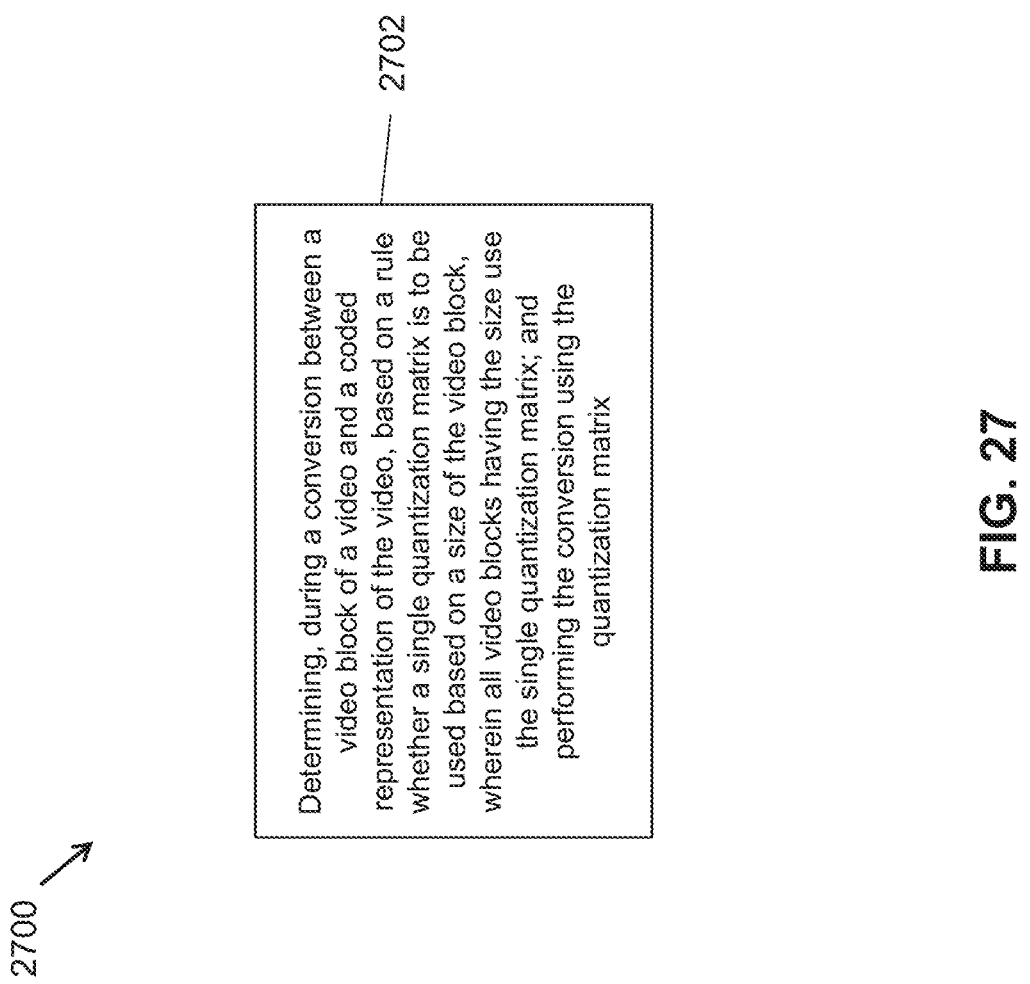

FIG. 27 is a flowchart of an example method 2700 of video processing. The method 2700 comprises determining (2702), during a conversion between a video block of a video and a coded representation of the video, based on a rule whether a single quantization matrix is to be used based on a size of the video block, wherein all video blocks having the size use the single quantization matrix; and performing the conversion using the quantization matrix.

The following three section describes example video processing techniques that are numbered.

Section A

1. A method of video processing, comprising: performing a conversion between a video block of a video and a coded representation of the video, wherein the coded representation conforms to a format rule, wherein the format rule specifies that applicability of a transform skip mode to the video block is determined by a coding condition of the video block, wherein the format rule specifies that a syntax element indicative of applicability of the transform skip mode is omitted from the coded representation, and wherein the transform skip mode includes, skipping applying a forward transform to at least some coefficients prior to encoding into the coded representation, or during decoding, skipping applying an inverse transform to at least some coefficients prior to decoding from the coded representation.

2. The method of example 1, wherein the transform skip mode is determined to be enabled due to the coding condition of the video block indicating that a block differential pulse code modulation (BDPCM) or a quantized residual BDPCM (QR-BDPCM) is used on the video block.

3. The method of example 1, wherein the transform skip mode is determined to be disabled due to the coding condition of the video block indicating that a non-block differential pulse code modulation (non-BDPCM) or a non-quantized residual BDPCM (non-QR-BDPCM) is used on the video block.

4. A method of video processing, comprising: determining, for a conversion between two adjacent video blocks of a video and a coded representation of the video, whether an in-loop filter or a post-reconstruction filter is to be used for the conversion depending on whether a forward transform or an inverse transform is used for the conversion, wherein the forward transform includes, skipping applying the forward transform to at least some coefficients prior to encoding into the coded representation, or during decoding, skipping applying the inverse transform to at least some coefficients prior to decoding from the coded representation; and performing the conversion based on the use of the in-loop filter or the post-reconstruction filter.

5. The method of example 4, wherein the forward transform or inverse transform include a transform skip mode or a block differential pulse code modulation (BDPCM) or a quantized residual BDPCM (QR-BDPCM) or a palette mode, and wherein the use of the in-loop filter or the post-reconstruction filter to the two adjacent video blocks is based on whether the transform skip mode or a block differential pulse code modulation (BDPCM) or a quantized residual BDPCM (QR-BDPCM) or a palette mode is used on the two adjacent video blocks.

6. The method of example 4, wherein the forward transform or inverse transform include a transform skip mode, and wherein a derivation of a boundary filtering strength depends on one or more syntax elements that indicates whether the transform skip mode is enabled for one or both of the two adjacent video blocks.

7. The method of example 4, wherein the forward transform or inverse transform include a transform skip mode, and wherein a deblocking filter, a sample adaptive offset, an adaptive loop filter, or the post-reconstruction filter are disabled in response to the samples located at the two adjacent video blocks being coded with the transform skip mode.

8. The method of example 7, wherein the forward transform or inverse transform include a transform skip mode, and wherein the in-loop filter and the post-reconstruction filter are not applied to the edge between the two adjacent video blocks in response to the transform skip mode being enabled for the two adjacent video blocks.

9. The method of example 7, wherein the forward transform or inverse transform include a transform skip mode, and wherein the in-loop filter and the post-reconstruction filter are not applied to the samples between the two adjacent video blocks in response to the transform skip mode being enabled for one of the two adjacent video blocks.

10. The method of example 4, wherein the forward transform or inverse transform include a transform skip mode, and wherein the samples are filtered using a filter other than the in-loop filter or the post-reconstruction filter in response to the transform skip mode being enabled for the two adjacent video blocks.

11. The method of example 10, wherein the filter comprises a smoother filter.

12. The method of example 4, wherein the video comprises a video block that is coded with a pulse code modulation (PCM) or a block differential pulse code modulation (BDPCM) or a quantized residual BDPCM (QR-BDPCM) or another type of mode in which the forward transform or the inverse transform is not applied to the video block, and wherein whether the in-loop filter or the post-reconstruction filter are used for the conversion of the video block is determined in a same way as that for the two adjacent video blocks when a transform skip mode is enabled for the two adjacent video blocks.

13. The method of any of examples 4-12, wherein the in-loop filter comprises a de-blocking filter.

14. The method of any of examples 4-12, wherein the post-reconstruction filter comprises a bilateral filter or a diffusion filter.

15. The method of any of examples 1 to 14, wherein the conversion comprises encoding the video block into the coded representation.

16. The method of any of examples 1 to 14, wherein the conversion comprises decoding the coded representation to generate pixel values of the video block.

17. A video decoding apparatus comprising a processor configured to implement a method recited in one or more of examples 1 to 16.

18. A computer program product having computer code stored thereon, the code, when executed by a processor, causes the processor to implement a method recited in any of examples 1 to 17.

Section B

1. A method of video processing, comprising: determining, for a conversion between a video block of a video and a coded representation of the video, factors of a scaling tool based on a coding mode of the video block; and performing the conversion using the scaling tool, wherein the use of the scaling tool comprises: scaling at least some coefficients representing the video block during encoding or descaling at least some coefficients from the coded representation during decoding.

2. The method of example 1, further comprising: determining the factors of the scaling tool based on a predefined value in response to a block differential pulse code modulation (BDPCM) coding tool or a quantized residual BDPCM (QR-BDPCM) coding tool being used for the conversion of the video block.

3. The method of example 2, wherein the factors of the scaling tool used for the video block on which the BDPCM coding tool or the QR-BDPCM coding tool is applied are same as that used for the video block on which a transform skip mode is applied, and wherein the transform skip mode includes, skipping applying a forward transform to the at least some coefficients prior to encoding into the coded representation, or during decoding, skipping applying an inverse transform to the at least some coefficients prior to decoding from the coded representation.

4. The method of example 2, wherein the conversion includes determining the factors of the scaling tool based on one or more transforms applied to the at least some coefficients of the video block during the conversion.

5. The method of example 4, wherein the scaling tool is allowed for the conversion in response to the one or more transforms being applied to the at least some coefficients of the video block.

6. The method of example 4, wherein a technique for determining the factors of the scaling tool is the same as that used for an intra coded block in response to the one or more transforms being applied to the at least some coefficients of the video block.

7. The method of example 1, wherein the factors of the scaling matrix are determined in a same way for video blocks of the video that are coded using an intra block copy mode and an inter mode.

8. A method of video processing, comprising: determining, for a conversion between a video block of a video and a coded representation of the video, to disable use of a scaling tool due to a block differential pulse code modulation (BDPCM) coding tool or a quantized residual BDPCM (QR-BDPCM) coding tool for the conversion of the video block; and performing the conversion without using the scaling tool, wherein the use of the scaling tool comprises: scaling at least some coefficients representing the video block during encoding or descaling at least some coefficients from the coded representation during decoding.

9. A method of video processing, comprising: selecting, for a conversion between video blocks of a video and a coded representation of the video, scaling matrices based on a transform matrix selected for the conversion, wherein the scaling matrices are used to scale at least some coefficients of the video blocks, and wherein the transform matrices are used to transform the at least some coefficients of the video blocks during the conversion; and performing the conversion using the scaling matrices.

10. The method of example 9, wherein the selecting the scaling matrices is based on whether the conversion of the video blocks uses a default transform mode.

11. The method of example 10, wherein the default transform mode includes a discrete cosine transform 2 (DCT2).

12. The method of example 9, wherein the scaling matrices are separately signaled for multiple transform matrices.

13. The method of example 9, wherein the selecting the scaling matrices is based on motion information of the video blocks.

15. The method of example 13, wherein the selecting the scaling matrices is based on whether the conversion of the video blocks uses a sub-block coding mode.

15. The method of example 14, wherein the sub-block coding mode includes an affine coding mode.

16. The method of example 15, wherein a scaling matrix for the affine coding mode is signaled differently than that for another video block whose conversion uses a non-affine coding mode.

17. The method of example 13, wherein the selecting the scaling matrices is based on whether the video blocks are coded with affine intra prediction mode.

18. The method of any of examples 1 to 17, wherein the conversion comprises encoding the video block or the video blocks into the coded representation.

19. The method of any of examples 1 to 17, wherein the conversion comprises decoding the coded representation to generate pixel values of the video block or of the video blocks.

20. A video decoding apparatus comprising a processor configured to implement a method recited in one or more of examples 1 to 19.

21. A video encoding apparatus comprising a processor configured to implement a method recited in one or more of examples 1 to 19.

22. A computer program product having computer code stored thereon, the code, when executed by a processor, causes the processor to implement a method recited in any of examples 1 to 19.

Section C

1. A method of video processing, comprising: determining, according to a rule, whether to apply a scaling matrix based on whether a secondary transform matrix is applied to a portion of a video block of a video, wherein the scaling matrix is used to scale at least some coefficients of the video block, and wherein the secondary transform matrix is used to transform at least some residual coefficients of the portion of the video block during the conversion; and performing a conversion between the video block of the video and a bitstream representation of the video using the selected scaling matrix.

2. The method of example 1, wherein the rule specifies that the scaling matrix is applied to an M×N top left portion of the video block in response to the secondary transform matrix being applied to the M×N top left portion of the video block that includes a K×L transform block size.

3. The method of example 1, wherein the scaling matrix is signaled in the bitstream representation.

4. The method of example 3, wherein the scaling matrix is signaled in a tile group header, a slide header, a picture parameter set (PPS), a video parameter set (VPS), a sequence parameter set (SPS) for the secondary transform matrix or for a reduced secondary transform or a rotation transform.

5. The method of example 1, wherein the bitstream representation includes a first syntax element that indicates whether the scaling matrix is applied, and wherein the bitstream representation includes a second syntax element that indicates whether the secondary transform matrix is applied.

6. The method of example 1, wherein the rule specifies that the scaling matrix is only applied to portions of the video block in which the secondary transform matrix is not applied.

7. The method of example 1, wherein the rule specifies that the scaling matrix is applied to portions except a M×N top left portion of the video block on which the secondary transform matrix is applied.

8. The method of example 1, wherein the rule specifies that the scaling matrix is applied only to portions of the video block on which the secondary transform matrix is applied.

9. A method of video processing, comprising: determining, for a video block that has a non-square shape, a scaling matrix for use in a conversion between the video block of a video and a coded representation of the video, wherein a syntax element in the coded representation signals the scaling matrix, and wherein the scaling matrix is used to scale at least some coefficients of the video blocks during the conversion; and performing the conversion based on the scaling matrix.

10. The method of example 9, wherein the syntax element predictively codes the scaling matrix from another scaling matrix of a previous square block of the video.

11. A method of video processing, comprising: performing a conversion between a video block of a video and a coded representation of the video, wherein the video block comprises a first number of positions at which a scaling matrix is applied during the conversion and a second number of positions at which the scaling matrix is not applied during the conversion based on a rule.

12. The method of example 11, wherein the first number of positions comprises top-left M*N positions of the video block, and wherein the video block comprises more than M*N positions.

13. The method of example 11, wherein the first number of positions comprises top M*N positions of the video block, and wherein the video block comprises more than M*N positions.

14. The method of example 11, wherein the first number of positions comprises left M*N positions of the video block, and wherein the video block comprises more than M*N positions.

15. A method of video processing, comprising: determining that a scaling matrix is to be applied during a conversion between a video block of a video and a coded representation of the video; and performing the conversion based on the scaling matrix, wherein the coded representation indicates a number of elements of the scaling matrix, and wherein the number depends on whether coefficient zeroing out is applied to coefficients of the video block.

16. The method of example 15, wherein for a 64×64 transform, the conversion includes zeroing out all but top-left M×N positions of the video block, and wherein the number of elements of the scaling matrix is M/8*N/8.

17. A method of video processing, comprising: performing a conversion between a video block of a video and a coded representation of the video according to a rule, wherein the video block is represented in the coded representation after zeroing out all but top-left M×N transform coefficients after applying a K×L transform matrix to transform coefficients of the video block, wherein the coded representation is configured to exclude signaling of elements of a scaling matrix at positions corresponding to the zeroing out, wherein the scaling matrix is used for scaling the transform coefficients.

18. The method of example 17, wherein the signaling of elements of the scaling matrix located in regions outside of the top-left M×N coefficients is skipped.

19. The method of example 17, wherein the scaling matrix is applied by sub-sampling by a ratio determined from the K and/or the L.

20. The method of example 19, wherein the video block is split into multiple sub-regions, and wherein a size of each sub-region is Uw*Uh, and wherein one element of the scaling matrix located within each sub-region of a region comprising a top-left M×N coefficients of the video block is signaled in the coded representation.

21. The method of example 19, wherein a number of the elements of the scaling matrix indicated in the coded representation is based on the M and/or the N.

22. The method of example 19, wherein a first number of the elements of the scaling matrix indicated in the coded representation for the K×L transform matrix is different from a second number of the elements of the scaling matrix indicated in the coded representation for the top-left M×N coefficients without zeroing out.

23. The method of example 17, wherein the scaling matrix is applied by sub-sampling by a ratio determined from the M and/or the N.

24. The method of example 23, wherein a region comprising the top-left M×N coefficients is split into multiple sub-regions, wherein a size of each sub-region is Uw*Uh, and wherein one element within each sub-region is signaled in the coded representation.

25. The method of example 23, wherein a number of the elements of the scaling matrix indicated in the coded representation for the K×L transform matrix is same as that indicated in the coded representation for the top-left M×N coefficients without zeroing out.

26. The method of any of example 17 to 25, wherein K=L=64, and wherein M=N=32.

27. The method of any of example 20 or 24, wherein K=L=64, wherein M=N=32, and wherein Uw=Uh=8.

28. A method of video processing, comprising: determining, during a conversion between a video block of a video and a coded representation of the video, based on a rule whether a single quantization matrix is to be used based on a size of the video block, wherein all video blocks having the size use the single quantization matrix; and performing the conversion using the quantization matrix.

29. The method of example 28, wherein the rule specifies that only the single quantization matrix is allowed in response to the size of the video block being smaller than W×H, where W and H are integers.

30. The method of example 28, wherein the rule specifies that only the single quantization matrix is allowed in response to a width of the video block is smaller than a threshold.

31. The method of example 28, wherein the rule specifies that only the single quantization matrix is allowed in response to a height of the video block is smaller than a threshold.

32. The method of example 28, wherein the rule specifies that the single quantization matrix is not applied to the video block having the size associated with a small size video block.

33. The method of any of examples 1 to 32, wherein a palette mode is applied to the video block.

34. The method of any of examples 1 to 33, wherein the conversion comprises encoding the video into the coded representation.

35. The method of any of examples 1 to 33, wherein the conversion comprises decoding the coded representation to generate pixel values of the video block.

36. A video decoding apparatus comprising a processor configured to implement a method recited in one or more of examples 1 to 35.

37. A video encoding apparatus comprising a processor configured to implement a method recited in one or more of examples 1 to 35.

38. A computer program product having computer code stored thereon, the code, when executed by a processor, causes the processor to implement a method recited in any of examples 1 to 35.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:
1. A method of processing video data, comprising:
    performing a first conversion between a first video block of a video and a bitstream of the video,
    wherein the bitstream conforms to a format rule,
    wherein the format rule specifies that whether to apply a transform skip mode to the first video block is determined by a coding condition of the first video block,
    wherein the format rule specifies that when a syntax element indicative of applicability of the transform skip mode is omitted from the bitstream, the transform skip mode is determined to be enabled due to the coding condition of the first video block indicating that a differential coding mode is used on the first video block;

wherein the transform skip mode includes, skipping applying a forward transform to at least one coefficient prior to encoding into the bitstream, or during decoding, skipping applying an inverse transform to at least one coefficient prior to decoding from the bitstream, wherein the method further comprises: performing a second conversion between a video transform block of a video with a K×L transform block size and a bitstream of the video, wherein, in response to the K×L video transform block containing more than 32×32 positions, only matrix elements of a scaling matrix within a top-left 32×32 region of the K×L video transform block are kept and remaining matrix elements of the scaling matrix are zeroing-out, wherein the second conversion is performed using the scaling matrix, wherein the scaling matrix is used to scale at least one coefficient of the K×L video transform block, and wherein a secondary transform matrix is applied to an S×T top left portion of the K×L video transform block and a flat scaling matrix or an explicit scaling matrix is applied to the K×L video transform block as the scaling matrix, wherein S, T, K and L are integers and K is greater than or equal to S, L is greater than or equal to T, and wherein matrix element values of the default scaling matrix are equal to 16.

2. The method of claim 1, wherein when the syntax element is omitted from the bitstream, the transform skip mode is determined to be disabled due to the coding condition of the first video block indicating that the differential coding mode is not used on the first video block.

3. The method of claim 1, wherein the differential coding mode includes a block differential pulse code modulation mode or a quantized residual block differential pulse code modulation mode.

4. The method of claim 1, wherein an explicit scaling matrix for a scaling tool is disabled in response to the differential coding mode being used on the first video block, and wherein the scaling tool comprises:
scaling at least one coefficient representing the first video block during encoding; or
descaling at least one coefficient from the bitstream during decoding.

5. The method of claim 4, wherein a flat scaling matrix is used in the scaling tool for the first conversion of the first video block; and
wherein intermediate scaling factors of the flat scaling matrix are equal to 16.

6. The method of claim 4, wherein factors of the explicit scaling matrix are determined in a same way for a second video block that is coded using an intra block copy mode and a third video block that is coded using an inter mode.

7. The method of claim 4, wherein a second video block in a video region coded using an intra block copy mode and a third video block in the video region coded using an inter mode share same sets of explicit scaling matrices.

8. The method of claim 7, wherein the sets of explicit scaling matrices are derived from a scaling list data syntax structure in the bitstream, and
wherein the scaling list data syntax structure includes at least one of a first syntax element indicating whether values of a scaling list are predicted from a reference scaling list, a second syntax element indicating the reference scaling list, a third syntax element indicating values of DC positions of the explicit scaling matrices, or a fourth syntax element indicating difference between a current matrix coefficient and a previous matrix coefficient.

9. The method of claim 1, wherein the scaling matrix is effectively applied only to the S×T top left portion of the K×L video transform block.

10. The method of claim 1, wherein when K is equal to 64, only left 32 column matrix elements of the scaling matrix are kept, when L is equal to 64, only top 32 row matrix elements of the scaling matrix are kept, and remaining matrix elements are zeroing-out.

11. The method of claim 1, wherein the first conversion includes encoding the first video block into the bitstream.

12. The method of claim 1, wherein the first conversion includes decoding the first video block from the bitstream.

13. An apparatus for processing video data comprising a processor and a non-transitory memory with instructions thereon, wherein the instructions upon execution by the processor, cause the processor to:

perform a first conversion between a first video block of a video and a bitstream of the video,
wherein the bitstream conforms to a format rule,
wherein the format rule specifies that whether to apply a transform skip mode to the first video block is determined by a coding condition of the first video block,
wherein the format rule specifies that when a syntax element indicative of applicability of the transform skip mode is omitted from the bitstream, the transform skip mode is determined to be enabled due to the coding condition of the first video block indicating that a differential coding mode is used on the first video block,
wherein the transform skip mode includes, skipping applying a forward transform to at least one coefficient prior to encoding into the bitstream, or during decoding, skipping applying an inverse transform to at least one coefficient prior to decoding from the bitstream,
wherein the processor is further caused to: perform a second conversion between a video transform block of a video with a K×L transform block size and a bitstream of the video, wherein, in response to the K×L video transform block containing more than 32×32 positions, only matrix elements of a scaling matrix within a top-left 32×32 region of the K×L video transform block are kept and remaining matrix elements of the scaling matrix are zeroing-out,
wherein the second conversion is performed using the scaling matrix, wherein the scaling matrix is used to scale at least one coefficient of the K×L video transform block, and
wherein a secondary transform matrix is applied to an S×T top left portion of the K×L video transform block and a flat scaling matrix or an explicit scaling matrix is applied to the K×L video transform block as the scaling matrix, wherein S, T, K and L are integers and K is greater than or equal to S, L is greater than or equal to T, and wherein matrix element values of the default scaling matrix are equal to 16.

14. The apparatus of claim 13, wherein when the syntax element is omitted from the bitstream, the transform skip mode is determined to be disabled due to the coding condition of the first video block indicating that the differential coding mode is not used on the first video block, wherein the differential coding mode includes a block differential pulse code modulation mode or a quantized residual block differential pulse code modulation mode, wherein an explicit scaling matrix for a scaling tool is disabled in response to the differential coding mode being used on the first video block, wherein the scaling tool comprises: scaling at least one coefficient representing the first video block during encoding, or descaling at least one coefficient from the bitstream during decoding, wherein a flat scaling matrix is used in the scaling tool for the first conversion of the first video block, wherein intermediate scaling factors of the flat scaling matrix are equal to 16, wherein factors of the explicit scaling matrix are determined in a same way for a second video block that is coded using an intra block copy mode and a third video block that is coded using an inter mode, wherein the second video block in a video region coded using the intra block copy mode and the third video block in the video region coded using an inter mode share same sets of explicit scaling matrices, wherein the sets of explicit scaling matrices are derived from a scaling list data syntax structure in the bitstream, and wherein the scaling list data syntax structure includes at least one of a first syntax element indicating whether values of a scaling list are predicted from a reference scaling list, a second syntax element indicating the reference scaling list, a third syntax element indicating values of DC positions of the explicit scaling matrices, or a fourth syntax element indicating difference between a current matrix coefficient and a previous matrix coefficient.

15. The apparatus of claim 13, wherein the scaling matrix is effectively applied only to the S×T top left portion of the K×L video transform block, and wherein when K is equal to 64, only left 32 column matrix elements of the scaling matrix are kept, when L is equal to 64, only top 32 row matrix elements of the scaling matrix are kept, and remaining matrix elements are zeroing-out.

16. A non-transitory computer-readable storage medium storing instructions that cause a processor to:

perform a first conversion between a first video block of a video and a bitstream of the video, wherein the bitstream conforms to a format rule, wherein the format rule specifies that whether to apply a transform skip mode to the first video block is determined by a coding condition of the first video block, wherein the format rule specifies that when a syntax element indicative of applicability of the transform skip mode is omitted from the bitstream, the transform skip mode is determined to be enabled due to the coding condition of the first video block indicating that a differential coding mode is used on the first video block, and wherein the transform skip mode includes skipping applying a forward transform to at least one coefficient prior to encoding into the bitstream, or during decoding, skipping applying an inverse transform to at least one coefficient prior to decoding from the bitstream, wherein the processor is further caused to: perform a second conversion between a video transform block of a video with a K×L transform block size and a bitstream of the video, wherein, in response to the K×L video transform block containing more than 32×32 positions, only matrix elements of a scaling matrix within a top-left 32×32 region of the K×L video transform block are kept and remaining matrix elements of the scaling matrix are zeroing-out, wherein the second conversion is performed using the scaling matrix, wherein the scaling matrix is used to scale at least one coefficient of the K×L video transform block, and wherein a secondary transform matrix is applied to an S×T top left portion of the K×L video transform block and a flat scaling matrix or an explicit scaling matrix is applied to the K×L video transform block as the scaling matrix, wherein S, T, K and L are integers and K is greater than or equal to S, L is greater than or equal to T, and wherein matrix element values of the default scaling matrix are equal to 16.

17. The non-transitory computer-readable storage medium of claim 16, wherein when the syntax element is omitted from the bitstream, the transform skip mode is determined to be disabled due to the coding condition of the first video block indicating that the differential coding mode is not used on the first video block, wherein the differential coding mode includes a block differential pulse code modulation mode or a quantized residual block differential pulse code modulation mode, wherein an explicit scaling matrix for a scaling tool is disabled in response to the differential coding mode being used on the first video block, wherein the scaling tool comprises: scaling at least one coefficient representing the first video block during encoding, or descaling at least one coefficient from the bitstream during decoding, wherein a flat scaling matrix is used in the scaling tool for the first conversion of the first video block, wherein intermediate scaling factors of the flat scaling matrix are equal to 16, wherein factors of the explicit scaling matrix are determined in a same way for a second video block that is coded using an intra block copy mode and a third video block that is coded using an inter mode, wherein the second video block in a video region coded using the intra block copy mode and the third video block in the video region coded using an inter mode share same sets of explicit scaling matrices, wherein the sets of explicit scaling matrices are derived from a scaling list data syntax structure in the bitstream, wherein the scaling list data syntax structure includes at least one of a first syntax element indicating whether values of the scaling list are predicted from a reference scaling list, a second syntax element indicating the reference scaling list, a third syntax element indicating values of DC positions of the explicit scaling matrices, or a fourth syntax element indicating difference between a current matrix coefficient and a previous matrix coefficient;

wherein the scaling matrix is effectively applied only to the S×T top left portion of the video transform block, and wherein when K is equal to 64, only left 32 column matrix elements of the scaling matrix are kept, when L is equal to 64, only top 32 row matrix elements of the scaling matrix are kept, and remaining matrix elements are zeroing-out.

18. A method for storing a bitstream of a video, comprising:
  generating the bitstream for a first video block of the video; and
  storing the bitstream in a non-transitory computer-readable recording medium,
  wherein the bitstream conforms to a format rule,
  wherein the format rule specifies that whether to apply a transform skip mode to a first video block of the video is determined by a coding condition of the first video block,
  wherein the format rule specifies that when a syntax element indicative of applicability of the transform skip mode is omitted from the bitstream, the transform skip mode is determined to be enabled due to the coding condition of the first video block indicating that a differential coding mode is used on the first video block, and
  wherein the transform skip mode includes, skipping applying a forward transform to at least one coefficient prior to encoding into the bitstream, or during decoding, skipping applying an inverse transform to at least one coefficient prior to decoding from the bitstream,
  wherein the method further comprises: generating the bitstream for a video transform block of the video with a K×L transform block size, wherein, in response to the K×L video transform block containing more than 32×32 positions, only matrix elements of a scaling matrix within a top-left 32×32 region of the K×L video transform block are kept and remaining matrix elements of the scaling matrix are zeroing-out,
  wherein the second conversion is performed using the scaling matrix, wherein the scaling matrix is used to scale at least one coefficient of the K×L video transform block, and
  wherein a secondary transform matrix is applied to an S×T top left portion of the K×L video transform block and a flat scaling matrix or an explicit scaling matrix is applied to the K×L video transform block as the scaling matrix, wherein S, T, K and L are integers and K is greater than or equal to S, L is greater than or equal to T, and wherein matrix element values of the default scaling matrix are equal to 16.

19. The method of claim 18, wherein when the syntax element is omitted from the bitstream, the transform skip mode is determined to be disabled due to the coding condition of the first video block indicating that the differential coding mode is not used on the first video block,
  wherein the differential coding mode includes a block differential pulse code modulation mode or a quantized residual block differential pulse code modulation mode,
  wherein an explicit scaling matrix for a scaling tool is disabled in response to the differential coding mode being used on the first video block,
  wherein the scaling tool comprises: scaling at least one coefficient representing the first video block during encoding, or descaling at least one coefficient from the bitstream during decoding,
  wherein a flat scaling matrix is used in the scaling tool for conversion of the first video block,
  wherein intermediate scaling factors of the flat scaling matrix are equal to 16,
  wherein factors of the explicit scaling matrix are determined in a same way for a second video block that is coded using an intra block copy mode and a third video block that is coded using an inter mode,
  wherein the second video block in a video region coded using the intra block copy mode and the third video block in the video region coded using an inter mode share same sets of explicit scaling matrices,
  wherein the sets of explicit scaling matrices are derived from a scaling list data syntax structure in the bitstream,
  wherein the scaling list data syntax structure includes at least one of a first syntax element indicating whether values of the scaling list are predicted from a reference scaling list, a second syntax element indicating the reference scaling list, a third syntax element indicating values of DC positions of the explicit scaling matrices, or a fourth syntax element indicating difference between a current matrix coefficient and a previous matrix coefficient,
  wherein the scaling matrix is effectively applied only to the S×T top left portion of the video transform block, and
  wherein when K is equal to 64, only left 32 column matrix elements of the scaling matrix are kept, when L is equal to 64, only top 32 row matrix elements of the scaling matrix are kept, and remaining matrix elements are zeroing-out.

* * * * *